United States Patent
Sharp et al.

(10) Patent No.: US 7,496,689 B2
(45) Date of Patent: Feb. 24, 2009

(54) TCP/IP OFFLOAD DEVICE

(75) Inventors: Colin C. Sharp, Santa Cruz, CA (US);
Clive M. Philbrick, San Jose, CA (US);
Daryl D. Starr, Milpitas, CA (US);
Stephen E. J. Blightman, San Jose, CA (US)

(73) Assignee: Alacritech, Inc., San Jose, CA (US)

( * ) Notice: Subject to any disclaimer, the term of this patent is extended or adjusted under 35 U.S.C. 154(b) by 939 days.

(21) Appl. No.: 10/420,364

(22) Filed: Apr. 22, 2003

(65) Prior Publication Data

US 2004/0062245 A1    Apr. 1, 2004

Related U.S. Application Data

(60) Provisional application No. 60/374,788, filed on Apr. 22, 2002.

(51) Int. Cl.
*G06F 15/173* (2006.01)
*G06F 15/16* (2006.01)
*G06F 12/00* (2006.01)
*H04L 15/00* (2006.01)

(52) U.S. Cl. .................. 709/250; 709/238; 711/108; 370/463

(58) Field of Classification Search ............. 709/238, 709/250; 711/108; 370/463; 375/219
See application file for complete search history.

(56) References Cited

U.S. PATENT DOCUMENTS

4,366,538 A    12/1982   Johnson et al. ............. 364/200

(Continued)

FOREIGN PATENT DOCUMENTS

WO    WO 98/19412    5/1998

(Continued)

OTHER PUBLICATIONS

Internet pages entitled "Hardware Assisted Protocol Processing", (which Eugene Feinber is working on), 1 page, printed Nov. 25, 1998.

(Continued)

*Primary Examiner*—Ario Etienne
*Assistant Examiner*—Philip J Chea
(74) *Attorney, Agent, or Firm*—Mark Lauer; Silicon Edge Law Group LLP

(57) ABSTRACT

A TCP/IP offload network interface device (NID) is integrated with a processing device that executes a stack. The TCP/IP offload NID can either be a full TCP/IP offload device or a partial TCP/IP offload device. Common types of packets are processed by the NID in a fast-path such that the stack is offloaded of TCP and IP protocol processing tasks. A hash is made from the packet header and is pushed onto a queue. The hash is later popped off the queue and is used to identify an associated TCB number from a hash table. A mechanism caches hash buckets in SRAM and stores other hash buckets in DRAM. An "IN SRAM CAM" is used to determine whether the TCB associated with the identified TCB number is cached in SRAM or whether it must be moved from DRAM into the SRAM cache. A lock table and a "lock table CAM" mechanism is disclosed that facilitates multiple processors working on the protocol processing of a single packet.

21 Claims, 72 Drawing Sheets

U.S. PATENT DOCUMENTS

| | | | | |
|---|---|---|---|---|
| 4,589,063 A | 5/1986 | Shah et al. ................ 710/8 |
| 4,700,185 A | 10/1987 | Balph et al. .............. 370/451 |
| 4,991,133 A | 2/1991 | Davis et al. ............... 364/900 |
| 5,056,058 A | 10/1991 | Hirata et al. ............. 709/230 |
| 5,058,110 A | 10/1991 | Beach et al. ............. 370/85.6 |
| 5,097,442 A | 3/1992 | Ward et al. ................. 365/78 |
| 5,163,131 A | 11/1992 | Row et al. .................. 395/200 |
| 5,212,778 A | 5/1993 | Dally et al. ................ 395/400 |
| 5,280,477 A | 1/1994 | Trapp ....................... 370/85.1 |
| 5,289,580 A | 2/1994 | Latif et al. ................. 395/275 |
| 5,303,344 A | 4/1994 | Yokoyama et al. ........ 395/200 |
| 5,412,782 A | 5/1995 | Hausman et al. ........... 395/250 |
| 5,418,912 A | 5/1995 | Christenson ............... 709/234 |
| 5,448,566 A | 9/1995 | Richter et al. ............ 370/94.1 |
| 5,485,455 A | 1/1996 | Dobbins et al. ............ 370/255 |
| 5,485,460 A | 1/1996 | Schrier et al. .............. 703/227 |
| 5,485,579 A | 1/1996 | Hitz et al. .............. 395/200.12 |
| 5,506,966 A | 4/1996 | Ban ............................ 395/250 |
| 5,511,169 A | 4/1996 | Suda ........................... 395/280 |
| 5,517,668 A | 5/1996 | Szwerinski et al. ......... 395/800 |
| 5,524,250 A | 6/1996 | Chesson et al. ............. 395/775 |
| 5,535,375 A | 7/1996 | Eshel ........................... 703/27 |
| 5,548,730 A | 8/1996 | Young et al. ................ 395/280 |
| 5,566,170 A | 10/1996 | Bakke et al. .................. 370/60 |
| 5,574,919 A | 11/1996 | Netravali et al. ............ 712/220 |
| 5,588,121 A | 12/1996 | Reddin et al. .......... 395/200.15 |
| 5,590,328 A | 12/1996 | Seno et al. ................... 395/675 |
| 5,592,622 A | 1/1997 | Isfeld et al. ............. 395/200.02 |
| 5,598,410 A | 1/1997 | Stone ........................... 370/469 |
| 5,619,650 A | 4/1997 | Bach et al. .............. 395/200.01 |
| 5,629,933 A | 5/1997 | Delp et al. ................... 370/411 |
| 5,633,780 A | 5/1997 | Cronin ......................... 361/220 |
| 5,634,099 A | 5/1997 | Andrews et al. ....... 395/200.07 |
| 5,634,127 A | 5/1997 | Cloud et al. ................. 395/680 |
| 5,642,482 A | 6/1997 | Pardillos .................. 395/200.2 |
| 5,664,114 A | 9/1997 | Krech, Jr. et al. ...... 395/200.64 |
| 5,671,355 A | 9/1997 | Collins .................... 395/200.2 |
| 5,678,060 A | 10/1997 | Yokoyama et al. .......... 709/212 |
| 5,682,534 A | 10/1997 | Kapoor et al. ............... 709/203 |
| 5,692,130 A | 11/1997 | Shobu et al. ........... 395/200.12 |
| 5,699,317 A | 12/1997 | Sartore et al. .......... 395/230.06 |
| 5,699,350 A | 12/1997 | Kraslavsky ................. 370/254 |
| 5,701,434 A | 12/1997 | Nakagawa .................. 395/484 |
| 5,701,516 A | 12/1997 | Cheng et al. ................ 395/842 |
| 5,727,142 A | 3/1998 | Chen ........................... 395/181 |
| 5,742,765 A | 4/1998 | Wong et al. ................. 709/230 |
| 5,749,095 A | 5/1998 | Hagersten ................... 711/141 |
| 5,751,715 A | 5/1998 | Chan et al. .................. 370/455 |
| 5,752,078 A | 5/1998 | Delp et al. ................... 395/827 |
| 5,758,084 A | 5/1998 | Silverstein et al. ...... 395/200.58 |
| 5,758,089 A | 5/1998 | Gentry et al. ........... 395/200.64 |
| 5,758,186 A | 5/1998 | Hamilton et al. ............ 395/831 |
| 5,758,194 A | 5/1998 | Kuzma ........................ 395/886 |
| 5,768,618 A | 6/1998 | Erickson et al. ................ 710/9 |
| 5,771,349 A | 6/1998 | Picazo, Jr. et al. ...... 395/188.01 |
| 5,774,660 A | 6/1998 | Brendel et al. .......... 395/200.31 |
| 5,778,013 A | 7/1998 | Jedwab ....................... 714/807 |
| 5,778,419 A | 7/1998 | Hansen et al. .............. 711/112 |
| 5,790,804 A | 8/1998 | Osborne ...................... 709/245 |
| 5,794,061 A | 8/1998 | Hansen et al. ......... 395/800.01 |
| 5,802,258 A | 9/1998 | Chen ....................... 395/182.08 |
| 5,802,580 A | 9/1998 | McAlpice .................... 711/149 |
| 5,809,328 A | 9/1998 | Nogales et al. ............. 395/825 |
| 5,809,527 A | 9/1998 | Cooper et al. ............... 711/133 |
| 5,812,775 A | 9/1998 | Van Seeters et al. ... 395/200.43 |
| 5,815,646 A | 9/1998 | Purcell et al. ............... 395/163 |
| 5,828,835 A | 10/1998 | Isfeld et al. .................. 709/200 |
| 5,848,293 A | 12/1998 | Gentry ........................... 710/5 |
| 5,872,919 A | 2/1999 | Wakeland .................... 709/230 |
| 5,878,225 A | 3/1999 | Bilansky et al. ......... 395/200.57 |
| 5,892,903 A | 4/1999 | Klaus .......................... 709/227 |
| 5,898,713 A | 4/1999 | Melzer et al. .................. 371/53 |
| 5,913,028 A | 6/1999 | Wang et al. ............ 395/200.33 |
| 5,920,566 A | 7/1999 | Hendel et al. ............... 370/401 |
| 5,930,830 A | 7/1999 | Mendelson et al. ......... 711/171 |
| 5,931,918 A | 8/1999 | Row et al. ................... 709/300 |
| 5,935,205 A | 8/1999 | Murayama et al. .......... 709/216 |
| 5,937,169 A | 8/1999 | Connery et al. .......... 395/200.8 |
| 5,941,969 A | 8/1999 | Ram et al. .................. 710/128 |
| 5,941,972 A | 8/1999 | Hoese et al. ................ 710/129 |
| 5,950,203 A | 9/1999 | Stakuis et al. ................ 707/10 |
| 5,987,022 A | 11/1999 | Geiger et al. ............... 370/349 |
| 5,991,299 A | 11/1999 | Radogna et al. ............ 370/392 |
| 5,996,013 A | 11/1999 | Delp et al. ................... 709/226 |
| 5,996,024 A | 11/1999 | Blumenau ................... 709/301 |
| 6,005,849 A | 12/1999 | Roach et al. ................ 370/276 |
| 6,009,478 A | 12/1999 | Panner et al. ................... 710/5 |
| 6,009,504 A * | 12/1999 | Krick ......................... 711/220 |
| 6,016,513 A | 1/2000 | Lowe ........................... 709/250 |
| 6,021,446 A | 2/2000 | Gentry et al. ............... 709/303 |
| 6,021,507 A | 2/2000 | Chen ............................. 714/2 |
| 6,026,452 A | 2/2000 | Pitts ............................. 710/56 |
| 6,034,963 A | 3/2000 | Minami et al. .............. 370/401 |
| 6,038,562 A | 3/2000 | Anjur et al. ................... 707/10 |
| 6,041,058 A | 3/2000 | Flanders et al. ............. 370/401 |
| 6,041,381 A | 3/2000 | Hoese ......................... 710/129 |
| 6,044,438 A | 3/2000 | Olnowich .................... 711/130 |
| 6,047,323 A | 4/2000 | Krause ........................ 711/129 |
| 6,047,356 A | 4/2000 | Anderson et al. ........... 711/129 |
| 6,049,528 A | 4/2000 | Hendel et al. ............... 370/235 |
| 6,057,863 A | 5/2000 | Olarig ......................... 345/520 |
| 6,061,368 A | 5/2000 | Hitzelberger ............... 370/537 |
| 6,065,096 A | 5/2000 | Day et al. .................... 711/114 |
| 6,067,569 A | 5/2000 | Khaki et al. ................. 709/224 |
| 6,070,200 A | 5/2000 | Gates et al. ................... 710/20 |
| 6,078,564 A | 6/2000 | Lakshman et al. .......... 370/235 |
| 6,078,733 A | 6/2000 | Osborne ...................... 709/250 |
| 6,097,734 A | 8/2000 | Gotesman et al. ........... 370/474 |
| 6,101,555 A | 8/2000 | Goshey et al. .............. 709/321 |
| 6,111,673 A | 8/2000 | Chang et al. ................ 359/123 |
| 6,115,615 A | 9/2000 | Ota et al. ................... 455/422.1 |
| 6,122,670 A | 9/2000 | Bennett et al. .............. 709/230 |
| 6,141,701 A | 10/2000 | Whitney ......................... 710/5 |
| 6,141,705 A | 10/2000 | Anand et al. .................. 710/15 |
| 6,145,017 A | 11/2000 | Ghaffari ......................... 710/5 |
| 6,157,955 A | 12/2000 | Narad et al. ................. 709/228 |
| 6,172,980 B1 | 1/2001 | Flanders et al. ............. 370/401 |
| 6,173,333 B1 | 1/2001 | Jolitz et al. |
| 6,181,705 B1 | 1/2001 | Branstad et al. ............. 370/412 |
| 6,202,105 B1 | 3/2001 | Gates et al. ................... 710/20 |
| 6,226,680 B1 | 5/2001 | Boucher et al. ............. 709/230 |
| 6,233,242 B1 | 5/2001 | Mayer et al. ................ 370/392 |
| 6,246,683 B1 | 6/2001 | Connery et al. ............ 370/392 |
| 6,247,060 B1 | 6/2001 | Boucher et al. ............. 709/238 |
| 6,279,051 B1 | 8/2001 | Gates et al. ................... 710/20 |
| 6,289,023 B1 | 9/2001 | Dowling et al. ............. 370/419 |
| 6,298,403 B1 | 10/2001 | Suri et al. .................... 710/100 |
| 6,324,649 B1 | 11/2001 | Eyres et al. .................. 713/202 |
| 6,334,153 B2 | 12/2001 | Boucher et al. ............. 709/230 |
| 6,343,360 B1 | 1/2002 | Feinleib ......................... 713/1 |
| 6,345,301 B1 | 2/2002 | Burns et al. ................. 709/230 |
| 6,345,302 B1 | 2/2002 | Bennett et al. .............. 709/236 |
| 6,356,951 B1 | 3/2002 | Gentry et al. ............... 709/250 |
| 6,370,599 B1 | 4/2002 | Anand et al. .................. 710/15 |
| 6,385,647 B1 | 5/2002 | Wills et al. .................. 709/217 |
| 6,389,468 B1 | 5/2002 | Muller et al. ................ 709/226 |
| 6,389,479 B1 | 5/2002 | Boucher ...................... 709/243 |
| 6,393,487 B2 | 5/2002 | Boucher et al. ............. 709/238 |
| 6,421,742 B1 | 7/2002 | Tillier ............................ 710/1 |
| 6,421,753 B1 | 7/2002 | Hoese et al. ................ 710/129 |
| 6,427,169 B1 | 7/2002 | Elzur .......................... 709/224 |
| 6,427,171 B1 | 7/2002 | Craft et al. .................. 709/230 |
| 6,427,173 B1 | 7/2002 | Boucher et al. ............. 709/238 |
| 6,434,620 B1 | 8/2002 | Boucher et al. ............. 709/230 |

| | | | | | |
|---|---|---|---|---|---|
| 6,434,651 B1 | 8/2002 | Gentry, Jr. ............... 710/260 | WO | WO 00/13091 | 3/2000 |
| 6,449,656 B1 | 9/2002 | Elzur et al. ............... 709/236 | WO | WO 01/04770 | 1/2001 |
| 6,453,360 B1 | 9/2002 | Muller et al. ............ 709/230 | WO | WO 01/05107 | 1/2001 |
| 6,470,415 B1 | 10/2002 | Starr et al. ............... 711/104 | WO | WO 01/05116 | 1/2001 |
| 6,473,425 B1 | 10/2002 | Bellaton et al. .......... 370/392 | WO | WO 01/05123 | 1/2001 |
| 6,480,489 B1 | 11/2002 | Muller et al. ............ 370/389 | WO | WO 01/40960 | 6/2001 |
| 6,487,202 B1 | 11/2002 | Klausmeier et al. ...... 370/395.1 | WO | WO 01/59966 | 8/2001 |
| 6,487,654 B2 | 11/2002 | Dowling ................... 712/244 | WO | WO 01/86430 | 11/2001 |
| 6,490,631 B1 | 12/2002 | Teich et al. ............... 709/250 | | | |
| 6,502,144 B1 | 12/2002 | Accarie ........................ 710/8 | | | |

OTHER PUBLICATIONS

Zilog product Brief entitled "Z85C30 CMOS SCC Serial Communication Controller", Zilog Inc., 3 pages, 1997.

Internet pages of Xpoint Technologies, Inc. entitled "Smart LAN Work Requests", 5 pages, printed Dec. 19, 1997.

Internet pages entitled: Asante and 100BASE-T Fast Ethernet. 7 pages, printed May 27, 1997.

Internet pages entitled: A Guide to the Paragon XP/S-A7 Supercomputer at Indiana University. 13 pages, printed Dec. 21, 1998.

Richard Stevens, "TCP/IP Illustrated, vol. 1, The Protocols", pp. 325-326 (1994).

Internet pages entitled: *Northridge/Southbridge* vs. *Intel Hub Architecture*, 4 pages, printed Feb. 19, 2001.

Gigabit Ethernet Technical Brief, Achieving End-to-End Performance. Alteon Networks, Inc., First Edition, Sep. 1996, 15 pages.

Internet pages directed to Technical Brief on Alteon Ethernet Gigabit NIC technology, www.alteon.com, 14 pages, printed Mar. 15, 1997.

VIA Technologies, Inc. article entitled "VT8501 Apollo MVP4", pp. i-iv, 1-11, cover and copyright page, revision 1.3, Feb. 1, 2000.

iReady News Archives article entitled "iReady Rounding Out Management Team with Two Key Executives", http://www.ireadyco.com/archives/keyexec.html, 2 pages, printed Nov. 28, 1998.

"Toshiba Delivers First Chips to Make Consumer Devices Internet-Ready Based On iReady's Design," Press Release Oct. 1998, 3 pages, printed Nov. 28, 1998.

Internet pages from iReady Products, web sitehttp://www.ireadyco.com/products,html, 2 pages, downloaded Nov. 25, 1998.

iReady News Archives, Toshiba, iReady shipping Internet chip, 1 page, printed Nov. 25, 1998.

Interprophet article entitled "Technology", http://www.interprophet.com/technology.html, 17 pages, printed Mar. 1, 2000.

iReady Corporation, article entitled "The I-1000 Internet Tuner", 2 pages, date unknown.

iReady article entitled "About Us Introduction", Internet pages fromhttp://www.iReadyco.com/about.html, 3 pages, printed Nov. 25, 1998.

iReady News Archive article entitled "Revolutionary Approach to Consumer Electronics Internet Connectivity Funded", San Jose, CA, Nov. 20, 1997. 2 pages, printed Nov. 2, 1998.

iReady News Archive article entitled "Seiko Instruments Inc. (SII) Introduces World's First Internet-Ready Intelligent LCD Modules Based on iReady Technology," Santa Clara, CA and Chiba, Japan, Oct. 26, 1998. 2 pages, printed Nov. 2, 1998.

NEWSwatch article entitled "iReady internet Tuner to Web Enable Devices", Tuesday, Nov. 5, 1996, printed Nov. 2, 1998, 2 pages.

EETimes article entitled "Tuner for Toshiba, Toshiba Taps iReady for Internet Tuner", by David Lammers, 2 pages, printed Nov. 2, 1998.

"Comparison of Novell Netware and TCP/IP Protocol Architectures", by J.S. Carbone, 19 pages, printed Apr. 10, 1998.

Adaptec article entitled "AEA-7110C-a DuraSAN product", 11 pages, printed Oct. 1, 2001.

iSCSI HBA article entitled "iSCSI and 2Gigabit fibre Channel Host Bus Adapters from Emulex, QLogic, Adaptec, JNI", 8 pages, printed Oct. 1, 2001.

iSCSI HBA article entitled "FCE-3210/6410 32 and 64-bit PCI-to-Fibre Channel HBA", 6 pages, printed Oct. 1, 2001.

ISCSI.com article entitled "iSCSI Storage", 2 pages, printed Oct. 1, 2001.

"Two-Way TCP Traffic Over Rate Controlled Channels: Effects and Analysis", by Kalampoukas et al., IEEE Transactions on Networking, vol. 6, No. 6, Dec. 1998, 17 pages.

| | | | |
|---|---|---|---|
| 6,523,119 B2 | 2/2003 | Pavlin et al. .............. 713/192 | |
| 6,526,446 B1 | 2/2003 | Yang et al. ................. 709/230 | |
| 6,570,884 B1 | 5/2003 | Connery et al. ........... 370/419 | |
| 6,591,302 B2 | 7/2003 | Boucher et al. ........... 709/230 | |
| 6,591,310 B1 | 7/2003 | Johnson ........................ 710/3 | |
| 6,648,611 B2 | 11/2003 | Morse et al. ............... 417/310 | |
| 6,650,640 B1 | 11/2003 | Muller et al. ............. 370/392 | |
| 6,657,757 B1 | 12/2003 | Chang et al. ............... 359/124 | |
| 6,658,480 B2 | 12/2003 | Boucher et al. ........... 709/239 | |
| 6,678,283 B1 | 1/2004 | Teplitsky .................... 370/463 | |
| 6,681,364 B1 | 1/2004 | Calvignac et al. ........... 714/776 | |
| 6,687,758 B2 | 2/2004 | Craft et al. ................. 709/250 | |
| 6,697,868 B2 | 2/2004 | Craft et al. ................. 709/250 | |
| 6,751,665 B2 | 6/2004 | Philbrick et al. ........... 709/224 | |
| 6,757,746 B2 | 6/2004 | Boucher et al. ........... 709/250 | |
| 6,765,901 B1 | 7/2004 | Johnson et al. ............ 370/352 | |
| 6,807,581 B1 | 10/2004 | Starr et al. ................. 709/250 | |
| 6,842,896 B1 | 1/2005 | Redding et al. ............. 717/172 | |
| 6,912,522 B2 | 6/2005 | Edgar ........................... 707/10 | |
| 6,938,092 B2 | 8/2005 | Burns ........................ 709/230 | |
| 6,941,386 B2 | 9/2005 | Craft et al. ................. 709/250 | |
| 6,965,941 B2 | 11/2005 | Boucher et al. ........... 709/230 | |
| 6,996,070 B2 | 2/2006 | Starr et al. ................. 370/252 | |
| 7,042,898 B2 | 5/2006 | Blightman et al. .......... 370/463 | |
| 7,076,568 B2 | 7/2006 | Philbrick et al. ........... 709/250 | |
| 7,089,326 B2 | 8/2006 | Boucher et al. ........... 709/242 | |
| 7,093,099 B2 | 8/2006 | Bodas et al. ............... 711/206 | |
| 7,124,205 B2 | 10/2006 | Craft et al. ................. 709/250 | |
| 7,133,940 B2 | 11/2006 | Blightman et al. ............ 710/22 | |
| 7,167,926 B1 | 1/2007 | Boucher et al. ........... 709/250 | |
| 7,167,927 B2 | 1/2007 | Philbrick et al. ........... 709/250 | |
| 7,174,393 B2 | 2/2007 | Boucher et al. ........... 709/250 | |
| 7,185,266 B2 | 2/2007 | Blightman et al. .......... 714/776 | |
| 7,191,241 B2 | 3/2007 | Boucher et al. ........... 709/230 | |
| 7,191,318 B2 | 3/2007 | Tripathy et al. ............ 712/225 | |
| 7,237,036 B2 | 6/2007 | Boucher et al. ........... 709/245 | |
| 7,254,696 B2 | 8/2007 | Mittal et al. ............... 712/210 | |
| 7,284,070 B2 | 10/2007 | Boucher et al. ........... 709/250 | |
| 2001/0004354 A1 | 6/2001 | Jolitz ......................... 370/328 | |
| 2001/0025315 A1 | 6/2001 | Jolitz ......................... 709/231 | |
| 2001/0013059 A1 | 8/2001 | Dawson et al. ............ 709/217 | |
| 2001/0014892 A1 | 8/2001 | Gaither et al. ............. 707/200 | |
| 2001/0014954 A1 | 8/2001 | Purcell et al. ................. 714/4 | |
| 2001/0048681 A1 | 12/2001 | Bilic et al. ................. 370/389 | |
| 2001/0053148 A1 | 12/2001 | Bilic et al. ................. 370/389 | |
| 2002/0073223 A1 | 6/2002 | Darnell et al. ............. 709/232 | |
| 2002/0112175 A1 | 8/2002 | Makofka et al. ............ 713/200 | |
| 2003/0066011 A1 | 4/2003 | Oren ........................... 714/758 | |
| 2003/0110344 A1 | 6/2003 | Szczepanek et al. ........ 711/100 | |
| 2003/0165160 A1 | 9/2003 | Minami et al. ............. 370/466 | |
| 2004/0054814 A1 | 3/2004 | McDaniel ................... 709/250 | |
| 2004/0059926 A1 | 3/2004 | Angelo et al. ............... 713/168 | |
| 2004/0153578 A1 | 8/2004 | Elzur ......................... 709/230 | |
| 2004/0213290 A1 | 10/2004 | Johnson et al. ............ 370/469 | |
| 2004/0246974 A1 | 12/2004 | Gyugi et al. ........... 370/395.31 | |

FOREIGN PATENT DOCUMENTS

| | | |
|---|---|---|
| WO | WO 98/50852 | 11/1998 |
| WO | WO 99/04343 | 1/1999 |
| WO | WO 99/65219 | 12/1999 |

IReady News article entitled "Toshiba Delivers First Chips to Make Consumer Devices Internet-Ready Based on iReady Design", Santa Clara, CA, and Tokyo, Japan, Oct. 14, 1998, printed Nov. 2, 1998, 3 pages.

Internet pages of InterProphet entitled "Frequently Asked Questions", by Lynne Jolitz, printed Jun. 14, 2000, 4 pages.

"File System Design For An NFS File Server Appliance", Article by D. Hitz, et al., 13 pages.

Adaptec Press Release article entitled "Adaptec Announces EtherStorage Technology", 2 pages, May 4, 2000, printed Jun. 14, 2000.

Adaptec article entitled "EtherStorage Frequently Asked Questions", 5 pages, printed Jul. 19, 2000.

Adaptec article entitled "EtherStorage White Paper", 7 pages, printed Jul. 19, 2000.

CIBC World Markets article entitled "Computers; Storage", by J. Berlino et al., 9 pages, dated Aug. 7, 2000.

Merrill Lynch article entitled "Storage Futures", by S. Milunovich, 22 pages, dated May 10, 2000.

CBS Market Watch article entitled "Montreal Start-Up Battles Data Storage Bottleneck", by S. Taylor, dated Mar. 5, 2000, 2 pages, printed Mar. 7, 2000.

Internet-draft article entitled "SCSI/TCP (SCSI over TCP)", by J. Satran et al., 38 pages, dated Feb. 2000, printed May 19, 2000.

Internet pages entitled Technical White Paper-XPoint's Disk to LAN Acceleration Solution for Windows NT Server, printed Jun. 5, 1997, 15 pages.

Jato Technologies article entitled Network Accelerator Chip Architecture, twelve-slide presentation, printed Aug. 19, 1998, 13 pages.

EETimes article entitled Enterprise System Uses Flexible Spec, dated Aug. 10, 1998, printed Nov. 25, 1998, 3 pages.

Internet pages entitled "Smart Ethernet Network Interface Cards", which Berend Ozceri is developing, printed Nov. 25, 1998, 2 pages.

Internet pages of Xaqti corporation entitled "GigaPower Protocol Processor Product Review," printed Nov. 25, 1999, 4 pages.

U.S. Appl. No. 60/283,896, Titled: CRC Calculations for Out of Order PUDs, filed Apr. 12, 2003, Inventor: Amit Oren, Assignee: Siliquent Technologies Ltd.

Internet pages entitled "DART: Fast Application Level Networking via Data-Copy Avoidance," by Robert J. Walsh, printed Jun. 3, 1999, 25 pages.

Andrew S. Tanenbaum, Computer Networks, Third Edition, 1996, ISBN 0-13-349945-6.

Rice University article entitled "LRP: A Network Subsystem Architecture for Server Systems", by P. Druschel and G. Banga, 14 pages.

Internet RFC/STD/FYI/BCP Archives article with heading "RFC2140" entitled "TCP Control Block Interdependence", web address http://www.faqs.org/ftp/rfc/pdf/rfc2140.txt.pdf, 11 pages, Apr. 1997.

WindRiver article entitled "Tornado: For Intelligent Network Acceleration", copyright Wind River Systems, 2001, 2 pages.

WindRiver White Paper entitled "Complete TCP/IP Offload for High-Speed Ethernet Networks", Copyright Wind River Systems, 2002, 7 pages.

Intel article entitled "Solving Server Bottlenecks with Intel Server Adapters", Copyright Intel Corporation, 1999, 8 pages.

Schwaderer et al., IEEE Computer Society Press publication entitled, "XTP in VLSI Protocol Decomposition for ASIC Implementation", from 15th Conference on Local Computer Networks, 5 pages, Sep. 30-Oct. 3, 1990.

Beach, Bob, IEEE Computer Society Press publication entitled, "UltraNet: An Architecture for Gigabit Networking", from 15th Conference on Local Computer Networks, 18 pages, Sep. 30-Oct. 3, 1990.

Chesson et al., IEEE Syposium Record entitled, "The Protocol Engine Chipset", from Hot Chips III, 16 pages, Aug. 26-27, 1991.

Maclean et al., IEEE Global Telecommunications Conference, Globecom '91, presentation entitled, "An Outboard Processor for High Performance Implementation of Transport Layer Protocols", 7 pages, Dec. 2-5, 1991.

Ross et al., IEEE article entitled "FX1000: A high performance single chip Gigabit Ethernet NIC", from Compcon '97 Proceedings, 7 pages, Feb. 23-26, 1997.

Strayer et al., "Ch. 9: The Protocol Engine" from XTP: The Transfer Protocol, 12 pages, Jul. 1992.

Publication entitled "Protocol Engine Handbook", 44 pages, Oct. 1990.

Koufopavlou et al., IEEE Global Telecommunications Conference, Globecom '92, presentation entitled, "Parallel TCP for High Performance Communication Subsystems", 7 pages, Dec. 6-9, 1992.

Lilienkamp et al., Publication entitled "Proposed Host-Front End Protocol", 56 pages, Dec. 1984.

Thla, Y.H. Publication entitled A Reduced Operational Protocol Engine (ROPE) for a multiple-layer bypass architecture, 16 pages.

U.S. Appl. No. 60/053,240, Titled: TCP/IP Network Accelerator and Method of Use, filed Jul. 18, 1997, Inventors: Jolitz et al., Assignee: InterProphet LLC.

Thia, Y.H. Publication entitled "High-Speed OSI Protocol Bypass Algorithm with Window Flow Control", *Protocols for High Speed Networks*, pp. 53-68, 1993.

Form 10-K for Excelan, Inc., for the fiscal year ending Dec. 31, 1987 (10 pages).

Form 10-K for Excelan, Inc., for the fiscal year ending Dec. 31, 1988 (10 pages).

Internet pages entitled: *Northridge/Southbridge vs. Intel Hub Architecture*, 4 pages, printed Feb. 19, 2001.

Article from Rice University entitled "LRP: A New Network Subsystem Architecture for Server Systems", by Peter Druschel and Gaurav Banga, 14 pages.

Schwaderer et al., IEEE Computer Society Press publication entitled, "XTP in VLSI Protocol Decomposition for ASIC Implementation", from 15th Conference on Local Computer Networks, 5 pages, Sep. 30-Oct. 3, 1990.

Beach, Bob, IEEE Computer Society Press publication entitled, "UltraNet: An Architecture for Gigabit Networking", from 15th Conference on Local Computer Networks, 18 pages, Sep. 30-Oct. 3, 1990.

Thia et al. Publication entitled "High-Speed OSI Protocol Bypass Algorithm with Window Flow Control," Protocols for High Speed Networks, pp. 53-68, 1993.

Thia et al. Publication entitled "A Reduced Operational Protocol Engine (ROPE) for a multiple-layer bypass architecture," Protocols for High Speed Networks, pp. 224-239, 1995.

* cited by examiner

Datapath Bandwidth

| | | |
|---|---|---|
| (125MB/s/1000Base) x 2 (full duplex) x 1 connections | = | 250 MB/s |
| Average frame size | = | 512 B |
| Frame rate = 250MB/s / 512B | = | 488,280 frames /s |
| Overhead / frame = (256B context read * 25%) + (96B header read) + (192B context write * 25%) + (64B misc.) | = | 272B / frame |
| Total bandwidth = (512B in) + (512B out) + (272B Cpu) | = | 1296B / frame |
| Dram Bandwidth required = (1296B/frame) x (488,280 frames/s) | = | 632.8MB/s |
| Dram Bandwidth @ 150MHz = (64 bytes / 126.6ns) | = | 505MB/s |
| PCI Bandwidth required | = | 250MB/s |
| PCI Bandwidth available @ 33 MHz, 64b, average | = | 200MB/s |
| PCI Bandwidth available @ 66 MHz, 64b, average | = | 450MB/s |

FIG. 11

Cpu Bandwidth

| | | |
|---|---|---|
| Required instructions / frame (per Clive) | = | 250 instructions/rcv |
| | | 220 instructions/ack |
| Ack frames per receive | = | .5 |
| Average instructions/Rcv = 250 + (220 * .5) | = | 360 instructions/frame |
| Receive frame interval = 512B / 125MB/s | = | 4.267 us |
| Instructions / frame @ 100MHz = (4.27us/frame) / (15ns/instruction) = | | 284 instructions/frame |

FIG. 12

PIN ASSIGNMENTS

| BALL | SIGNAL DESCRIPTION |
|---|---|
| Y14 | PCI_AD0 |
| W13 | PCI_AD1 |
| Y13 | PCI_AD2 |
| V12 | PCI_AD3 |
| W12 | PCI_AD4 |
| Y12 | PCI_AD5 |
| U11 | PCI_AD6 |
| V11 | PCI_AD7 |
| Y11 | PCI_AD8 |
| Y10 | PCI_AD9 |
| Y9 | PCI_AD10 |
| W9 | PCI_AD11 |
| V9 | PCI_AD12 |
| U9 | PCI_AD13 |
| Y8 | PCI_AD14 |
| W8 | PCI_AD15 |
| V4 | PCI_AD16 |
| W4 | PCI_AD17 |
| Y2 | PCI_AD18 |
| W2 | PCI_AD19 |
| V3 | PCI_AD20 |
| W1 | PCI_AD21 |
| V2 | PCI_AD22 |
| T4 | PCI_AD23 |
| T3 | PCI_AD24 |
| P3 | PCI_AD25 |
| P1 | PCI_AD26 |
| N3 | PCI_AD27 |
| N2 | PCI_AD28 |
| M4 | PCI_AD29 |
| M3 | PCI_AD30 |
| M1 | PCI_AD31 |
| K17 | PCI_AD32 |
| K18 | PCI_AD33 |
| K19 | PCI_AD34 |
| K20 | PCI_AD35 |
| L19 | PCI_AD36 |
| M20 | PCI_AD37 |
| M19 | PCI_AD38 |
| M18 | PCI_AD39 |
| M17 | PCI_AD40 |
| N20 | PCI_AD41 |
| N19 | PCI_AD42 |
| P20 | PCI_AD43 |
| P19 | PCI_AD44 |
| R20 | PCI_AD45 |
| R19 | PCI_AD46 |

| BALL | SIGNAL DESCRIPTION |
|---|---|
| P17 | PCI_AD47 |
| R18 | PCI_AD48 |
| T20 | PCI_AD49 |
| T19 | PCI_AD50 |
| U20 | PCI_AD51 |
| V20 | PCI_AD52 |
| T17 | PCI_AD53 |
| U18 | PCI_AD54 |
| U19 | PCI_AD55 |
| V19 | PCI_AD56 |
| V18 | PCI_AD57 |
| Y19 | PCI_AD58 |
| U16 | PCI_AD59 |
| Y18 | PCI_AD60 |
| W17 | PCI_AD61 |
| V16 | PCI_AD62 |
| Y17 | PCI_AD63 |
| L4 | PME |
| P4 | PCI_CLK |
| L1 | PCI_RESET_L |
| W10 | M66EN |
| L3 | PCI_REQ_L |
| L2 | PCI_GNT_L |
| V5 | PCI_FRAME_L |
| V1 | PCI_IDSEL |
| U7 | PCI_DEVSEL_L |
| W5 | PCI_IRDY_L |
| V6 | PCI_TRDY_L |
| W6 | PCI_STOP_L |
| Y15 | PCI_REQ64_L |
| W14 | PCI_ACK64_L |
| W7 | PCI_PAR |
| W16 | PCI_PAR54 |
| Y6 | PCI_PERR_L |
| V7 | PCI_SERR_L |
| W11 | PCI_CBE0_L |
| V8 | PCI_CBE1_L |
| U5 | PCI_CBE2_L |
| U2 | PCI_CBE3_L |
| V15 | PCI_CBE4_L |
| Y16 | PCI_CBE5_L |
| W15 | PCI_CBE6_L |
| V14 | PCI_CBE7_L |
| J3 | PCI_INTA_L |
| J2 | PCI_INTB_L |
| J1 | PCI_INTC_L |
| K2 | PCI_INTD_L |

FIG. 13/1

| BALL | SIGNAL DESCRIPTION |
|---|---|
| K3 | VDDPCI01 |
| N1 | VDDPCI02 |
| R1 | VDDPCI03 |
| U3 | VDDPCI04 |
| Y3 | VDDPCI05 |
| Y7 | VDDPCI06 |
| V10 | VDDPCI07 |
| U12 | VDDPCI08 |
| U14 | VDDPCI09 |
| W18 | VDDPCI10 |
| T18 | VDDPCI11 |
| N18 | VDDPCI12 |
| L18 | VDDPCI13 |
| C6 | EXT_CLK |
| A4 | CLK_SEL_0 |
| B5 | CLK_SEL_1 |
| C10 | PWR_GOOD |
| B10 | AUX_PWR_GOOD |
| D10 | NAND_OUT |
| B1 | EXT_RESET |
| D9 | EXT_PWR_EN |
| A11 | TRACE_SEL0 |
| A10 | TRACE_SEL1 |
| B3 | GPIO_0 |
| C4 | GPIO_1 |
| D5 | GPIO_2 |
| A3 | GPIO_3 |
| B8 | TN_ENABLE |
| A8 | IDD_TST |
| A7 | TST_MD_0 |
| C8 | TST_MD_1 |
| A5 | TST_0 |
| B6 | TST_1 |
| C7 | TST_2 |
| A6 | TST_3 |
| B7 | TST_4 |
| H4 | VSS |
| D17 | VSS |
| D13 | VSS |
| D8 | VSS |
| D4 | VSS |
| A1 | VSS |
| M9 | VSS |
| M10 | VSS |
| M11 | VSS |
| M12 | VSS |
| N4 | VSS |

| BALL | SIGNAL DESCRIPTION |
|---|---|
| N17 | VSS |
| U4 | VSS |
| U8 | VSS |
| U13 | VSS |
| U17 | VSS |
| C9 | VSS |
| A9 | VSS |
| H17 | VSS |
| J9 | VSS |
| J10 | VSS |
| J11 | VSS |
| J12 | VSS |
| K9 | VSS |
| K10 | VSS |
| L12 | VSS |
| L11 | VSS |
| L10 | VSS |
| L9 | VSS |
| K12 | VSS |
| K11 | VSS |
| B11 | VSS |
| U15 | VDD |
| U10 | VDD |
| U6 | VDD |
| R17 | VDD |
| R4 | VDD |
| L17 | VDD |
| K4 | VDD |
| F17 | VDD |
| F4 | VDD |
| D15 | VDD |
| D11 | VDD |
| D6 | VDD |
| A16 | VDD |
| D19 | VDD |
| Y4 | VDD |
| E5 | VDD |
| C1 | VDD |
| A12 | VDD |
| B11 | PLL_VSS |
| A12 | PLL_VDD |
| F3 | MA_RXD0 |
| E1 | MA_RXD1 |
| E2 | MA_RXD2 |
| D1 | MA_RXD3 |
| G4 | MA_RXDV |
| F2 | MA_RXER |

FIG. 13/2

| BALL | SIGNAL DESCRIPTION |
|---|---|
| E4 | MA_RXC |
| F1 | MA_TXC |
| D3 | MA_CRS |
| D2 | MA_COL |
| C2 | LNKA_STAT |
| H3 | MA_TXD0 |
| G1 | MA_TXD1 |
| G2 | MA_TXD2 |
| G3 | MA_TXD3 |
| H2 | MA_TXDV |
| H1 | MA_TXER |
| A2 | MDC |
| B2 | MDIO |
| A18 | RAM_CHK_0 |
| C17 | RAM_CHK_1 |
| B17 | RAM_CHK_2 |
| B18 | RAM_CHK_3 |
| A19 | RAM_CHK_4 |
| B14 | RAM_DATA_0 |
| C14 | RAM_DATA_1 |
| A15 | RAM_DATA_2 |
| B15 | RAM_DATA_3 |
| D14 | RAM_DATA_4 |
| C15 | RAM_DATA_5 |
| B16 | RAM_DATA_6 |
| C16 | RAM_DATA_7 |
| B19 | RAM_ADDR_0 |
| B20 | RAM_ADDR_1 |
| C19 | RAM_ADDR_2 |
| D18 | RAM_ADDR_3 |
| E17 | RAM_ADDR_4 |
| C20 | RAM_ADDR_5 |
| E18 | RAM_ADDR_6 |
| D20 | RAM_ADDR_7 |
| E19 | RAM_ADDR_8 |
| F18 | RAM_ADDR_9 |
| E20 | RAM_ADDR_10 |
| F19 | RAM_ADDR_11 |
| G18 | RAM_ADDR_12 |
| F20 | RAM_ADDR_13 |
| G19 | RAM_ADDR_14 |
| G20 | RAM_ADDR_15 |
| A17 | SDRAM_CLK |
| J17 | RAM_CKE |
| H20 | RAM_CS_L |
| H19 | RAM_RAS_L |
| J20 | RAM_CAS_L |

| BALL | SIGNAL DESCRIPTION |
|---|---|
| H18 | RAM_WE_L |
| A14 | RAM_DQM |
| C12 | EEPROM_SDI |
| D12 | EEPROM_SDO |
| B13 | EEPROM_CS |
| A13 | EEPROM_CLK |
| C13 | FSH_CD_L |
| L20 | NC |
| P18 | NC |
| W20 | NC |
| Y20 | NC |
| W19 | NC |
| T2 | NC |
| Y1 | NC |
| W3 | NC |
| Y5 | NC |
| V13 | NC |
| V17 | NC |
| J4 | NC |
| K1 | NC |
| M2 | NC |
| P2 | NC |
| U1 | NC |
| C3 | NC |
| B4 | NC |
| C5 | NC |
| D7 | NC |
| B9 | NC |
| C11 | NC |
| B12 | NC |
| D16 | NC |
| A20 | NC |
| C18 | NC |
| G17 | NC |
| J18 | NC |
| J19 | NC |
| R3 | NC |
| R2 | NC |
| T1 | NC |

FIG. 13/3

INSTRUCTION-WORD FORMAT

| TYPE | [55:49] | [48:47] | [46:42] | [41:33] | [32:24] | 23 | [22:16] | [15:00] |
|------|---------|---------|---------|---------|---------|-----|---------|---------|
| Jct  | 0b0000000, | 0b00, | AluOp, | OpdASel, | OpdBSel, | 1'b0 | TstSel, | Literal |
| Jcf  | 0b0000000, | 0b00, | AluOp, | OpdASel, | OpdBSel, | 1'b1 | TstSel, | Literal |
| Jmp  | 0b0000000 | 0b01, | AluOp, | OpdASel, | OpdBSel, | 1'b0 | FlgSel, | Literal |
| Jsr  | 0b0000000 | 0b10, | AluOp, | OpdASel, | OpdBSel, | 1'b0 | FlgSel, | Literal |
| Rts  | 0b0000000 | 0b11, | AluOp, | OpdASel, | OpdBSel, | 1'b1 | FlgSel, | Literal |
| Rtt  | 0b0000000 | 0b01, | AluOp, | OpdASel, | OpdBSel, | 1'b1 | TstSel, | Literal |
| Rtf  | 0b0000000 | 0b10, | AluOp, | OpdASel, | OpdBSel, | 1'b1 | TstSel, | Literal |
| Cont | 0b0000000 | 0b11, | AluOp, | OpdASel, | OpdBSel, | 1'b0 | FlgSel, | Literal |
| Map  | MapAddr | 0bxx, | 0bxxxxx, | 0bxxxxxxxxx, | 0bxxxxxxxxx, | 1'bx | 0hxx, | 0hxxxx |

FIG. 15

SEQUENCER BEHAVIOR

```
PgmCtrl        = {Instruction bits 48:47, Instruction bit 23};
DbgAddr        = DbgAddr + (Execute & DbgMd);
InstrFetchAddr = DbgMd ? DbgAddr:InstrAddr;
Pc             = InstrAddr + (Execute & ~DbgMd);} if (MapEn & (MapAddr != 0b0000000)){
        InstrAddr = 0h8000 |(MapAddr << 3) | Pc[2:0]; }          // re-map instr
else if (PgmCtrl == Jct && TstSel)
        InstrAddr = Pc:(AluDst==Pc) ? AluOut:Literal;            // jump if true
else if (PgmCtrl == Jcf && ~TstSel)
        InstrAddr = Pc:(AluDst==Pc) ? AluOut:Literal;            // jump if false
else if (PgmCtrl == Jmp)
        InstrAddr = (AluDst==Pc) ? AluOut:Literal;               // jump
else if (PgmCtrl == Jsr) {
        InstrAddr = (AluDst==Pc) ? AluOut:Literal;               // jsr
        Stack[StackPtr] = NextPc;
        StackPtr = StackPtr + 1; }
else if (PgmCtrl == Rtt && TstSel) {
        InstrAddr = Stack[StackPtr – 1] ;                        // return if true
        StackPtr = StackPtr -1 ; }
else if (PgmCtrl == Rtf && ~TstSel) {
        InstrAddr = Stack[StackPtr – 1];                         // return if false
        StackPtr = StackPtr -1 ; }
else if (PgmCtrl == Rts) {
        InstrAddr = Stack[StackPtr – 1];                         // return
        StackPtr = StackPtr -1 ; }
else   InstrAddr = Pc ;                                          //continue
```

FIG. 16

ALU OPERATIONS

| AluOp | OPERATION | |
|---|---|---|
| 0b00000 | A = (A & ~(1 << B));<br>C = 0; V = (B >= 32) ? 1:0; | //bit clear |
| 0b00001 | A = (A & B);<br>C = 0; V = 0; | //logical and |
| 0b00010 | A = (Literal & B);<br>C = 0; V = 0; | //logical and |
| 0b00011 | A = (~Literal & B);<br>C = 0; V = 0; | //logical and not |
| 0b00100 | A = (A | (1 << B));<br>C = 0; V = (B >= 32) ? 1:0; | //bit set |
| 0b00101 | A = (A | B);<br>C = 0; V = 0; | //logical or |
| 0b00110 | A = (Literal | B);<br>C = 0; V = 0; | //logical or |
| 0b00111 | A = (~Literal | B);<br>C = 0; V = 0; | //logical or not |
| 0b01000 | for (i=31; i>=0; i--) if B[i] continue; A=i;<br>C = 0; V = (B) ? 0:1; | //priority enc |
| 0b01001 | A = (A ^ B);<br>C = 0; V = 0; | //logical xor |
| 0b01010 | A = ({Literal} ^ B);<br>C = 0; V = 0; | //logical xor |
| 0b01011 | A = ({~Literal} ^ B);<br>C = 0; V = 0; | //logical xor not |
| 0b01100 | A = B;<br>C = 0; V = 0; | //move |
| 0b01101 | A = (1<<B);<br>C = 0; V = (B >= 32) ? 1:0; | //move bit |
| 0b01110 | A = {B[23:16],B[31:24],B[07:00],B[15:08]};<br>C = 0; V = 0; | //swap bytes |
| 0b01111 | A = {B[15:00], B[31:16]};<br>C = 0; V = 0; | //swap doublets |

FIG. 17/1

AluOp FUNCTION

0b10000   A = (A + B);          //add B
          C = (A + B)[32]; V = SignedOverflow;

0b10001   A = (A + B + C);                               //add B, carry
          C = (A + B + C)[32]; V = SignedOverflow;

0b10010   A = (Literal + B);                             //add constant
          C = (Literal + B)[32]; V = SignedOverflow;

0b10011   A = (-Literal + B);                            //sub constant
          C = (-Literal + B)[32]; V = SignedOverflow;

0b10100   A = (A - B);                                   //sub B
          C = (A - B)[32]; V = SignedOverflow;

0b10101   A = (A - B - ~C);                              //sub B, borrow
          C = (A - B - ~C)[32]; V = SignedOverflow;

0b10110   A = ({Literal, 16'h0000} & B);                 //and literal high
          C = 0, V = 0;

0b10111   A = ({Literal, 16'h0000} | B);                 //or literal high
          C = 0, V = 0;

0b11000   A = (A << B);                                  //shift left A
          C = A[31]; V = (B >= 32) ? 0:1;

0b11001   A = (B << Literal);                            //shift left B
          C = B[31]; V = (Literal >= 32) ? 0:1;

0b11010   A = (B << 1);                                  //shift left B
          C = B[31]; V = 0;

0b11011   n = (A - B);                                   //compare
          C = (A - B)[32]; V = SignedOverflow;

0b11100   A = (A >> B);                                  //shift right A
          C = A[0]; V = (B >= 32) ? 1:0;

0b11101   A = (B >> Literal);                            //shift right B
          C = A[0]; V = (Literal >= 32) ? 1:0;

0b11110   A = (B >> 1);                                  //shift right B
          C = A[0]; V = 0;

0b11111   n = (A & (1 << B));                            //bit test
          C = 0, V = (B >= 32) ? 1:0;

SignedOverflow
          For A+B
          V =     (A[31] & B[31] & !Result[31]) |
                  (!A[31] & !B[31] & Result[31]);
          For A-B (including compare)
          V=      (A[31] & !B[31] & !Result[31]) |
                  (!A[31] & B[31] & Result[31]);

FIG. 17/2

ALU OPERANDS

| OpdSel | Name | Description |
|---|---|---|
| 0b0000aaaaa | File (mode1) | File@(OpdSel[4:0] + FileBase1);<br>Allows paged access to any part of the register file. |
| 0b0001aaaaa | File (mode2) | File@(OpdSel[4:0] + FileBase2);<br>Allows paged access to any part of the register file. |
| 0b0010aaaaa | File (mode3) | File@(OpdSel[4:0] + FileBase3);<br>Allows paged access to any part of the register file. |
| 0b0011aaaaa | File (mode4) | File@(OpdSel[4:0] + FramePointer);<br>Allows paged access to any part of the register file. |
| 0b101100000 to<br>0b111111111 | File (mode5) | File@( {2'b11, OpdSel[7:0]} );<br>Allows direct, non-paged, access to the top 160 registers of the register file. |

For Mojave 1024 registers are implemented.
These registers may be accessed by five different modes.
Modes 1 through 4 are used to address the register file, indirectly via one of the three File Base registers or the Frame Pointer register. Note that the bottom 5 bits of the operand select field are added to the contents of the base register to derive the register address, allowing one of 32 registers above the base register address to be accessed.

| | | |
|---|---|---|
| 0b0100000XX | CpuStatus | 0b0000000000000BHD00000000000000CC<br>This is a read-only register providing information about the Cpu executing (OpdSel[1:0]) cycles after the current cycle. "CC" represents a value indicating the Cpu. Currently, only CpuId values of 0, 1 and 2 are returned. "H" represents the current state of Hlt, "D" indicates DbgMd and "B" indicates BigMd. Writing this register has no effect. Each CPU has its own copy of this register. |
| 0b010000100 | HostMiiCtrl | Read/Write. Default: 0x20000000 |

| bit | name | description |
|---|---|---|
| 31 | RdWrOp | When written with one (1) a status read operation is initiated to the addressed phy register managed by Host MII Management unit of the Ethernet 110 core. When written with a zero (0) a write operation is initiated to the addressed phy register. If reset bit29 is set or is being set then this bit is ignored. |
| 29 | Reset | Resets M11 management core. Default is one (1). Bit mustbe cleared for normal operation. |
| 28:26 | Reserved | |
| 25:21 | PhyAddr | This field specifies the phy address to be access by a read or write operation. |
| 20:16 | RegAddr | This field specifies the register within the addressed phy. |
| 15:00 | CtrlData | This data is written to the address phy register. It is ignored for read operations. |

FIG. 18/1

| OpdSel | Name | Description | | |
|---|---|---|---|---|
| 0b010000101 | HostMiiStatus | Read only. | | Default 0x0000XXXX |
| | | bit | name | description |
| | | 31 | StatusValid | Indicates that Status Data and MII Link Failure bits are valid. |
| | | 30 | WrOpPending | Indicates that an earlier write is pending completion. |
| | | 29:16 | Reserved | |
| | | 15:00 | StatusData | Data read during a Status Read or Scan operation. |
| 0b010000110 | XmtUrgDscr | Write only | | Default: 0x00000000 |
| | | bit | name | description |
| | | 31:00 | XmtUrgDscr | A transmit descriptor is written to this register. Writing of this register triggers a transmit operation for the selected transmit function when it is enabled, properly configured and has completed any operation in progress. See XmtDscr definition in XmtSeq section. |
| 0b010000111 | MetalRev | Read only. | | Default 0x00000000 |
| | | bit | name | description |
| | | 31:04 | Reserved | Always 0x0000000 |
| | | 03:0 | MetalRev | Represents the current revision level of the metal-mask layers of the chip. |
| 0b0100010XX | Pc | 0x0000AAAA<br>Writing to this address causes the program control logic to use AluOut as the new Pc value in the event of a Jmp, Jcc or Jsr instruction for the Cpu executing during the current cycle. If the current instruction is Nxt, Map, or Rts, the register write has no effect. Reading this register returns the value in Pc for the Cpu executing (OpdSel[1:0]) cycles after the current cycle. Each CPU has its own copy of this register. | | |
| 0100011XX | DbgAddr | 0xD000AAAA<br>Writing to this register alters the contents of the debug address register (DbgAddr) for the Cpu executing (OpdSel[1:0]) cycles after the current cycle. DbgAddr provides the fetch address for the control-store when DbgMd has been selected and the Cpu is executing. DbgAddr is also used as the control-store address when performing a WrWcs@DbgAddr or RdWcs@DbgAddr operation. "D" represents bit 31 of the register. It is a general purpose flag that is used for event indication during simulation. Reading this register returns a value of 0x00000000. Each CPU has its own copy of this register. | | |

FIG. 18/2

| OpdSel | Name | Description | | |
|---|---|---|---|---|
| 0b010010000 | DramCfg | SDRAM Configuration Register<br>Access Type: Read/Write | Default Value: | 0x00026288 |

<div style="margin-left:2em">

| bit | description |
|---|---|
| 31:22 | Reserved. |
| 21 | DramSmallCFg<br>Set to use 16bit wide, rather than 64 bit wide, dram data configuration. This allows configurations of a single dram for 10/100 networks. |
| 20:19 | Clock Divide normalizes refresh timer to account for ½ and ¼ speed operation.<br>Bits[20:19]   Divide Clock By<br>00                      1<br>01                      2<br>10                      4<br>11                      8 |
| 18:16 | ReadClk Delay. Adds incremental delay before clocking in data read from SDRAM.<br>Bits[18:16]   Read Clock Delay<br>000                    1.3 ns<br>001                    1.8 ns<br>010                    2.8 ns.<br>011                    4.8 ns. |
| 15 | Clock Enable. Set to one (1) to enable CKE to SDRAM. Used to put SDRAM in low-power mode. Set (0) coming out of reset. |
| 14 | Write Pipeline Enable. Set to one (1) to enable pipeline mode for writes. |
| 13 | Read Pipeline Enable. Set to one (1) to enable pipeline mode for reads. |
| 12 | SDRAM Interface Enable. Set to one (1) to enable drivers and SDRAM operation. |
| 11 | Refresh Enable. Setting this bit to one (1) enables refresh operations. Zero (0) disables refresh. (default – 0). |
| 10:09 | SDRAM Column Size. These bits are used in combination with the Dram Small Cfg to configure the the column size of the rams used in the SDRAM array. Adjusts address bits to SDRAM array address accordingly.<br><br>Normal Configurations<br>Bits [10:9]   SDRAM Column Size<br>00                    11 bits<br>01                    10 bits.<br>10                    9 bits<br>11                    8 bits<br><br>Dram Small Configurations<br>Bits [10:9]   SDRAM Column Size<br>00                    9 bits<br>01                    8 bits.<br>10                    11 bits<br>11                    10 bits |

</div>

FIG. 18/3

| OpdSel | Name | Description |
|--------|------|-------------|
| 8:7 | | Refresh Timer Count (RTC). This field selects the refresh rate for the SDRAM controller. At each of the clock frequencies below the setting will maintain a 15 us refresh cycle. |

<div style="margin-left:3em">

Bits[8:7]   RTC Initialization
00        500 Cycles - 33Mhz SDRAM clock
01        750 Cycles - 50Mhz SDRAM clock.
10        1125 Cycles - 75Mhz SDRAM clock.
11        1500 Cycles - 100Mhz SDRAM clock.

</div>

| OpdSel | Name | Description |
|--------|------|-------------|
| 6:4 | | SDRAM Mode Select (SDMS). This field selects the mode of operation for the SDRAM memory controller during the initialization phase of the SDRAM. Upon exiting the initialization phase these bits should be left in the Normal Mode (set to b000). |

<div style="margin-left:3em">

Bits[6:4]   Mode
000       Normal Mode (default). No command issued when writing the DramCmd register. Normal SDRAM Read, Write and Refresh sequencers operate.
001       NOP Command Enable. When set, Command Writes are converted to SDRAM NOP commands.
010       Precharge All Banks Command Enable. When set, Command Writes are converted to the Precharge All command.
011       Mode Register Command Enable. When set, Command Writes are converted to the Mode Register Set (MRS) command to the memory interface. The register command is driven on MemAddr[15:00] lines as follows:

</div>

<div style="margin-left:5em">

MemAddr  Setting
2:0        010    Burst mode of 4
3           0      Wrap type of sequential
4           C      Set to the value in the CAS latency bit.
6:5        01     Fixed so C determines latency (2 or 3 cycles).
15:7       0      Burst read and burst write operations.

</div>

<div style="margin-left:3em">

100       CBR Cycle Enable. When set, Command Writes are converted to CBR commands (refresh).
101       Reserved.
11X       Reserved.

</div>

| OpdSel | Name | Description |
|--------|------|-------------|
| 3 | | CAS Latency (CL). If set to one the CAS latency is set to 2 cycles. If set to zero the CAS latency is 3 cycles. |
| 2:0 | | Dram Technology<br>Set to tell chip when 2<sup>nd</sup> bank of DRAM is being used and DQM1 rather than DMQ0 should be used. |

<div style="margin-left:3em">

Bits[2:0]   Technology 000       address bit 24 selects second bank (64Mb(x32) tech)
001       address bit 25 selects second bank (128Mb(x32) or 64Mb(x16) tech)
010       address bit 26 selects second bank (256Mb(x32) or 128Mb(x16) tech)
011       address bit 27 selects second bank (256Mb(x16) tech)
1xx       single bank of dram installed – may use DQM0 & DQM1

</div>

FIG. 18/4

| OpdSel | Name | Description | | | |
|---|---|---|---|---|---|
| 0b010010001 | DramCmd | SDRAM command write register | | Default Value: | 0x00000000 |
| | | Access Type: Read/Write | | | |

| | bit | description |
|---|---|---|
| | 31 | Command Write Writing a one (1) to this bit initiates a SDRAM command as specified by the mode set by the SDMS bits of the DramConfig Register. When this bit returns to zero (0) it indicates that the command has completed. |
| | 30:0 | Reserved |

| OpdSel | Name | Description | | | |
|---|---|---|---|---|---|
| 0b010010010 | FlashCfg | Flash memory configuration/status register. | | Default Value: | 0x0000CA45 |
| | | Access Type: Read/Write | | | |

| | bit | description |
|---|---|---|
| | 31 | Write Complete Status. When set to one (1) this bit indicates that a write operation associated with a Program or an Erase sequence has completed. Writing FlashWrData register will clear this bit. |
| | 30:18 | Reserved |
| | 17:15 | Write Recovery. Number of wait-states after operation completes. Use same bit definitions as for Write Address to First Data Assert (001- 2 cycle is default) |
| | 14:12 | Write Strobe Length. Determines the number of cycles that write strobe is active. The number of cycles is equal to 1 plus the number selected in this field. |

<div style="margin-left:2em;">

| Bits[14:12] | Cycles (100 Mhz) |
|---|---|
| 000 | 0 + 1 = 1 |
| 001 | 4 + 1 = 2 |
| 010 | 8 |
| 011 | 12 |
| 100 | 16 |
| 101 | 20 |
| 110 | 24 |
| 111 | 28 (default). |

</div>

| | bit | description |
|---|---|---|
| | 11:09 | Write Address to First Data Assert. Number of wait-states from address assertion to write data assertion. |

<div style="margin-left:2em;">

| Bits[11:9] | Cycles (100 Mhz) |
|---|---|
| 000 | 0 |
| 001 | 4 |
| 010 | 8 |
| 011 | 12 |
| 100 | 16 |
| 101 | 20(default) |
| 110 | 24 |
| 111 | 28 |

</div>

| | bit | description |
|---|---|---|
| | 08:06 | Read Recovery. Number of wait-states after operation completes. Use same bit definitions as for Read Address to Data Valid (001- 2 cycle is default) |
| | 05:03 | Reserved |
| | 02:00 | Read Address to First Data Valid. Number of wait-states from address assertion to read data valid. |

<div style="margin-left:2em;">

| Bits[2:0] | Cycles (100 Mhz) |
|---|---|
| 000 | 0 |
| 001 | 4 |
| 010 | 8 |
| 011 | 12 |
| 100 | 16 |
| 101 | 20(default) |
| 110 | 24 |
| 111 | 28 |

</div>

FIG. 18/5

| OpdSel | Name | Description |
|---|---|---|
| 0b010010011 | FlashWrData | Flash memory write data register.<br>Default Value: 0x00000000<br>Access Type: Read/Write |

| bit | description |
|---|---|
| 31:08 | Reserved |
| 7:0 | Write Data.<br>Program Operations: Writing these bits will perform write cycles associated with a byte program operation to Flash memory. The Flash memory address is specified in the Flash Memory Address Register and must be programmed before the write. The program sequence consists of 4 write operations. There are 2 unlock cycles followed by a program cycle and a data write cycle. The first 3 cycles of this sequence complete when the Write Complete bit of the FlashConfig register is set. After writing this register during the data write cycle, data polling of bit 7 must be used to indicate when the data has actually been written. Data polling is done via a Flash read operation.<br><br>Erase Operations: Writing this register with the proper data will perform write cycles associated with a chip or sector erase. The erase sequence consists of 6 individual write operations. The Write Complete bit of the FlashCfg register must be checked before proceeding to the next cycle in the sequence. Additional wait loops may be needed between individual write operations in the sequence depending upon Flash technology used. |

| OpdSel | Name | Description |
|---|---|---|
| 0b010010100 | FlashRdData | Flash memory read data register.<br>Default Value: 0x00000000<br>Access Type: Read Only |

| bit | description |
|---|---|
| 31 | Read Complete Status. This bit is set when the read operation completes and is reset upon writing the FlashAddr register with bit 31 set to one (1). When set, data in bits 7:0 are valid. |
| 30:08 | Reserved |
| 07:00 | Read Data.<br>Read Operation: Writing the FlashAddr register when bit 31 is set will invoke a Flash memory read operation. The address in the FlashAddr Register is used as the read address. These bits contain the resultant data from that operation. The read operation is also used to perform data polling to determine the success of write operations. |

| OpdSel | Name | Description |
|---|---|---|
| 0b010010101 | FlashAddr | Flash memory address register.<br>Default Value: 0x00000000<br>Access Type: Read/Write |

Writing this register will clear the FlashRdData register when bit 31 is set.

| bit | description |
|---|---|
| 31 | Read/Write. When this bit is written with one (1) a read operation is initiated. When written with zero (0) a write operation is unlocked and can be initiated with a write to the FlashWrData register. |
| 30:20 | Reserved |
| 19:0 | Flash Address: This is the Flash address used for read and write accesses. |

FIG. 18/6

| OpdSel | Name | Description |
|---|---|---|
| 0b010010110 | EepromPrg | EEPROM program register.<br>Default Value: 0x00000000<br>Access Type: Read/Write<br><br>This register is bit-banged by the CPU to perform the EEPROM access functions.<br><br>| Bit | description | |<br>|---|---|---|<br>| 31:05 | Reserved. | |<br>| 4 | Serial Data In | Data sourced by the EEPROM. Connected to EEPROM_SD1. |<br>| 3 | Reserved | |<br>| 2 | Eeprom Chip Sel | Setting this bit to one (1) enables the EEPROM_CS signal selecting the external Eeprom. |<br>| 1 | Serial Data Out | Data output to EEPROM_SD0 |<br>| 0 | Clock. | Data output to EEPROM_CLK | |
| 0b010010111 | GPIOReg | General Purpose I/O Register.<br>Default Value: 0x00000000<br>Access Type: Read/Write<br><br>| Bit | description |<br>|---|---|<br>| 31 | External Reset. Reset is active during PCI reset or when this bit is set to one (1). Polarity of the Ext_Reset signal is determined by a zero or one setting TST[2] during normal operation |<br>| 30 | External Power Enable. Drives EXT_PWR_EN. Reset to disable. Polarity is determined by zero (0) or one (1) setting of TST[1] during normal operation. |<br>| 29:18 | Reserved |<br>| 17:16 | GPIO port direction bits: 0-read port 1-write port. Read ports upon reset. |<br>| 15:02 | Reserved |<br>| 01:00 | GPIO data | |
| 0b010011000 | ExternalOpts | These bits represent the state of the external SDRAM Data pins. They are used at initialization time to provide a mechanism for option selection through the use of external pull-up and pull-down resistors. These values must be read before SDRAM activity is initiated. |
| 0b010011001 | EccErrStat | ECC error status register.<br>Default Value: 0x00000000<br>Access Type: Read/Write<br><br>| bit | description |<br>|---|---|<br>| 31:25 | Reserved |<br>| 24:16 | Error Count. Represents the number of ECC errors which occurred since the last write to this register. This counter will stop at it's maximum value. |<br>| 09 | Double Bit Error. Indicates that a double-bit error has occurred. |<br>| 08 | Single Bit Error. Indicates that a single-bit error has occurred. |<br>| 07:00 | Syndrome. Record of the syndrome associated with the first single-bit error recorded since the last write to this register. | |

FIG. 18/7

| OpdSel | Name | Description |
|---|---|---|
| 0b010011010 | EccErrAddr | ECC error address register.<br>Default Value: 0x00000000<br>Access Type: Read only<br><br>bit     description<br>31:28    Reserved<br>27:00    EccErrAddr. Latched addres of the first single-bit or double-bit ECC error. Cleared by writing to the EccErrStat register. |
| 0b010011011 | EccErrCtrl | ECC Error control register.<br>Default Value: 0x00000000<br>Access Type: Read/Write<br><br>bit     description<br>1       Ecc Correction Enable. Set to one (1) to enable ECC error correction.<br>30     Ecc Detection Enable. Set to one (1) to enable ECC error detection.<br>29     Ecc Force Errors. Set to one (1) to force ECC errors.<br>28:08   Reserved.<br>07:00   Force Check Bits. Any write to DRAM will write these bits to the check bits of the SDRAM, allowing software to force ECC errors. |
| 0b0100111XX | Reserved | |
| 0b010100000 | RamAddr | {0b1CCC, 0x000, 0b1, AAAA}<br>RamAddr = AluOut[15] ? AluOut : (AluOut + RamBase);<br>PrevCC  = AluOut[31] ? CCC    : AluCC;<br><br>A read/write register. When reading this register, the Alu condition codes from the previous instruction are returned together with RamAddr.<br><br>bit      name      description<br>31                    Always 1.<br>30       PrevNeg    Previous Alu Bit 31<br>29       PrevC       Previous Alu Carry.<br>28       PrevV       Previous Alu Overflow.<br>27       PrevZ       Previous Alu Zero<br>26:16                 Always 0.<br>15                    Always 1.<br>14:0     RamAddr    Contents of last Sram address used.<br><br>When writing this register, if alu_out[31] is set, the previous condition codes will be overwritten with bits 30:27 of AluOut. If AluOut[15] is set, bits 14:0 will be written to the RamAddr. If AluOut [15] is not set, bits 14:0 will be added with the contents of the RamBase and written to the RamAddr. Each CPU has its own copy of this register. |

FIG. 18/8

| OpdSel | Name | Description |
| --- | --- | --- |
| 0b010100001 | AddrRegA | 0x0000AAAA<br>AddrRegA = AluOut;<br><br>A read/write operand which loads AddrRegA used to provide the address for read and write operations. When AddrRegA[15] is set, the contents will be presented directly to the ram. When AddrRegA[15] is reset, the contents will first be added with the contents of the RamBase register before presentation to the ram. Writing to this register takes priority over Literal loads using FlgOp. Reading this register returns the current value of the register. Each CPU has its own copy of this register. |
| 0b010100010 | AddrRegB | 0x0000AAAA<br>AddrRegB = AluOut;<br><br>A read/write operand which loads AddrRegB used to provide the address for read and write operations. When AddrRegB[15] is set, the contents will be presented directly to the ram. When AddrRegB[15] is reset, the contents will first be added with the contents of the RamBase register before presentation to the ram. Writing to this register takes priority over Literal loads using FlgOp. Reading this register returns the current value of the register. Each CPU has its own copy of this register. |
| 0b010100011 | AddrRegAb | 0x0000AAAA<br>AddrRegA = AluOut; AddrRegB = AluOut;<br><br>Writing to this operand loads AddrRegB and AddrRegA, which are used to provide the address for sram read and write operations. Writing to this register takes priority over Literal loads using FlgOp. Reading this register returns both registers concatenated {AddrRegB, AddrRegA}. Each CPU has its own copy of this register. |
| 0b010100100 | RamBase | 0x0000AAAA<br>RamBase = AluOut;<br><br>A read/write register which provides the base address for ram read and write cycles. When RamAddr[15] is set, the contents will not be used. When RamAddr[15] is reset, the contents will first be added with the contents of the RamBase register before presentation to the ram. Reading this register returns the value for the current Cpu. Each CPU has its own copy of this register. |
| 0b010100101 | FreeTime | Free Timer [31:0]<br>This register should be initialised by firmware to be the value of the frequency in Mhz of the CPU. That is, for a nominal speed of 110Mhz, a value of 110 should be written to this register. This ensures the accuracy of the 1 microsecond free running timer. When reading this register, the value of this free running timer, which is 32 bits wide, is returned. This timer is cleared during reset. |
| 0b010100110 | LiteralH | Instr[15:0]<<16;<br>A read-only register. Writing to this register has no effect |
| 0b010100111 | NotLiteralH | {~Instr[15:0], 0xffff};<br>A read only register. Writing this register has no effect. |
| 0b010101000 | OldPc | If the last instruction was a jump, this read only register will contain the last instruction address +1 (ie. the address of the instruction immediately following the jump). If the last instruction was not a jump, this register will contain the current address. This register is meant to be used for debug purposes only. Each CPU has its own copy of this register. |

FIG. 18/9

| OpdSel | Name | Description |
|---|---|---|
| 0b010101001 | Reserved | |
| 0b010101010 | Reserved | |
| 0b010101011 | GenEvent | A read-write register used to poll and reset timer and link events. |

| bit | name | description |
|---|---|---|
| 31 | TimeEventB | An event which occurs once every 2.00 milliseconds. Writing a one will force TimeEventB to be reset. |
| 30 | TimeEventA | An event which occurs once every 2.00 milliseconds. Writing a one will force TimeEventA to be reset. |
| 29:12 | reserved | Reserved for future use. |
| 11 | DmaError | A Dma error has occurred – the ChEventError Register is non-zero. |
| 10 | EccErrDoubleBit | Indicates a double-bit ecc error has occurred when reading from the SDRAM. Cleared by writing the EccErrStat register. |
| 09 | EccErrSingleBit | Indicates a single-bit ecc error has occurred when reading from the SDRAM. Cleared by writing the EccErrStat register. |
| 8. | PciEvent | Set whenever there is a change in power management state for any of the PCI functions. Writing a one resets PciEvent. |
| 07:05 | reserved | |
| 04 | UrgAEvent | An event which indicates UrgADscrDn has been set. Writing with a one resets UrgAEvent. |
| 03:02 | reserved | |
| 00 | LinkAEvent | An event which indicates that there has been a change in the state of LinkAStatus. Writing with a one will force LinkAEvent to be reset. |

| OpdSel | Name | Description |
|---|---|---|
| b010101100 | DmaErrorReg | This 32 bit register is set whenever a DMA completes with an error. A DMA terminating without error will set 8 bits of termination data in the termination queue. A DMA terminating with an error will set one bit according to the value in the least significant 5 bits of the termination data – (1 << term_data[4:0]).<br>Writing a 1 to any bit in this register will reset the corresponding bit in this register, while writing a 0 has no effect. |
| b010101101 | Reserved | |
| b0101011lx | | |

FIG. 18/10

| OpdSel | Name | Description |
|---|---|---|
| 0b010110000 | QCtrl | A write-only register used to select and manipulate a queue. Each CPU has its own copy of this register (although the queues themselves are common to all CPU's). |

| bit | name | description |
|---|---|---|
| 31:11 | reserved | Data written to these bits are ignored. |
| 10:8 | QSz | Used only during InitQ operations to specify the size of the QBdy in Dram.<br>7 – Queue depth is 32K entries (128KB).<br>6 – Queue depth is 16K entries (64KB).<br>5 – Queue depth is 8K entries (32KB).<br>4 – Queue depth is 4K entries (16KB).<br>3 – Queue depth is 2K entries (8KB).<br>2 – Queue depth is 1K entries (4KB).<br>1 – Queue depth is 512 entries (2KB).<br>0 – Queue depth is 256 entries (1KB). |
| 7:5 | QOp | Specifies the queue operation to perform.<br>7 – DblQ    Disables all queues.<br>6 – EnQ     Enables all queues.<br>5 – RdBdy   Incr QBdyRdPtr and incr QTlWrPtr.<br>4 – WrBdy   Decr QBdyWrPtr and incr QHdRdPtr.<br>3 – RdQ     Returns a queue entry in register QData.<br>2 – rsvd    Reserved. Not to be used.<br>1 – InitQ   Set the queue status to empty and initializes QSz.<br>0 – SelQ    Selects the QId to be used during writes to QData. |
| 4:0 | QId | Specifies the queue on which to perform all operations except DblQ or EnQ. |

| OpdSel | Name | Description |
|---|---|---|
| 0b010110001 | QData | A read/write register. Writing this register will result in the data being pushed on to the selected queue. Reading this register fetches queue data popped off during the previous RdQ operation. Each CPU has its own copy of this register (although the queues themselves are common to all CPU's). |
| 0b010110010 | LinkStatus | A read-only register comprising link status bits from each of the phys. This register will represent the true state of the status signals which could be active high or active low depending upon the polarity of the external signals feeding this register. |

| bit | name | description |
|---|---|---|
| 31:01 | reserved | |
| 00 | LinkAStatus | Represents the state of the link status from phy A. |

| OpdSel | Name | Description |
|---|---|---|
| 0b010110011 | XcvStatus | A read only register indicating the status of urgent descriptors pending processing. This register sets bit 0 to one (1) upon reset. |

| bit | name | description |
|---|---|---|
| 31:01 | reserved | |
| 00 | UrgADscrDn | Indicates urgent descriptor processed for Xcv A. |

| OpdSel | Name | Description |
|---|---|---|
| 0b010110100 | Lru | 0x0000000A<br>A read/write operand indicating which of the entries is least recently used. The number of entries in the Lru (the Lru depth) is controlled by the LruConfig register. When reading this register the least recently used entry is returned, after which it is automatically made the most recently used entry. This register should only be read in conjunction with a 'Move' operation of the ALU, else the results are unpredictable. Writing to this register forces the addressed entry to become the least recently used entry. |
| 0b010110101 | Mru | 0x0000000A<br>A write only operand forcing the addressed entry to become the most recently used entry. |

FIG. 18/11

| OpdSel | Name | Description |
|---|---|---|
| 0b010110110 | CpuTrace | A write only register that controls what trace data is to be driven on the cpu trace<br>bits 31:2 unused<br>bits 1:0 = 00   display PC & Data for Cpu 0<br>bits 1:0 = 01   display PC & Data for Cpu 1<br>bits 1:0 = 10   display PC & Data for Cpu 2<br>bits 1:0 = 11   display PCs for all Cpus (default) |
| 0b010110111 | LruConfig | Configures the depth of the Lru hardware in the cpu<br>bits 31:2 unused<br>bits 1:0 = 00   32 entries (default)<br>        = 01   28 entries<br>        = 10   24 entries<br>        = 11   16 entries |
| 0b010111000 | QInRdy | A read-only register comprising input ready flags for each of the 32 queues. |
| 0b010111001 | QOutRdy | A read-only register comprising output ready flags for each of the 32 queues. |
| 0b010111010 | QEmpty | A read-only register comprising empty flags for each of the 32 queues. |
| 0b010111011 | QFull | A read-only register comprising full flags for each of the 32 queues. |
| 0b010111100 | BistReg | Writing to this register<br>Bit 6  = BistGo for RCV_SEQ<br>Bit 5  = BistGo for XMIT_SEQ<br>Bit 4  = BistGo for QRAM<br>Bit 3  = BistGo for SRAM<br>Bit 2  = BistGo for REGFILE<br>Bit 1  = BistGo for MAP<br>Bit 0  = BistGo for WCS<br><br>Reading this register<br>Bit31:21 = 0<br>Bit 20:19 = TST[4:3] ( Boot Options   00 = TestVectors – Cpu Loads WCS<br>                                               01 = Load WCS from Flash<br>                                             10 = Default 2 PCI functions<br>                                             11 = Normal Operation )<br>Bit 18  = TST[2]  ( External Reset polarity )<br>Bit 17  = TST[1]  ( External Power Enable Polarity )<br>Bit 16  = TST[0]  (~CpuTraceEnable )<br>Bit 15  = 0<br>Bit 14  = BistError for RCV_SEQ<br>Bit 13  = BistError for XMIT_SEQ<br>Bit 12  = BistError for QRAM<br>Bit 11  = BistError for SRAM<br>Bit 10  = BistError for REGFILE<br>Bit 9    = BistError for MAP<br>Bit 8    = BistError for WCS<br>Bit 7    = 0<br>Bit 6    = BistDone for RCV_SEQ<br>Bit 5    = BistDone for XMT_SEQ<br>Bit 4    = BistDone for QRAM<br>Bit 3    = BistDone for SRAM<br>Bit 2    = BistDone for REGFILE<br>Bit 1    = BistDone for MAP<br>Bit 0    = BistDone for WCS |

FIG. 18/12

| OpdSel | Name | Description |
|---|---|---|
| 0b010111101 | ClockDivider | Write only<br>This is a 2 bit register that allows the cpu to control the clock speed for power management modes. This register is cleared by reset<br><br>bit    name    description<br>31:02  Reserved<br>02     DClkDbl  When set, disables external dram clock.<br>01:00  ClkDiv<br>       2'b11      The clock is divided by 64.<br>       2'b10      The clock is divided by 16.<br>       2'b01      The clock is divided by 4.<br>       2'b00      The clock is divided by 1. |
| 0b010111110 | reserved | |
| 0b010111111 | null | Reserved for null destinations. |
| 0b011000000 | CamAddrA | Write Only<br>CamAddr = AluOut[4:0]; This register provides the address in the 32 entry Cam when reading or writing the Cam Contents register. |
| 0b011000001 | CamContentsA | Read/Write<br>When writing:<br>    CamValid[CamAddrA]    = ~AluOut[16];<br>    CamContents[CamAddrA] = AluOut[15:0];<br>So writing bit 16 may be used to invalidate the Cam Entry<br>When reading<br>    Bit 16    = ~CamValid[CamAddrA];<br>    Bits 15-0 = CamContents[CamAddrA]; |
| 0b011000010 | CamMatchA | Read/Write<br>Writing a 16 bit value to this register causes the Cam to search its entries for a match with valid entries. A subsequent read of this register return the result of this search as follows:<br>Bit 5    Contents not found<br>Bits 4-0 If the contents were found and valid, this is the number of the cam entry, out of the total 32 entries, which matched. |
| 0b011000011 | CamConfigAB<br><br>CAMB. | Write Only<br>CamSplit = AluOut[0];<br>If CamSplit is set, the CAM is split into two 16 entry CAMs, CAMA and<br><br>The following decodes may then be used to access the second part of the CAM. |
| 0b011000100<br>0b011000101<br>0b011000110 | CamAddrB<br>CamContentsB<br>CamMatchB | Write Only<br>Read/Write<br>Read/Write<br>These registers are identical in use as for CamA(see above), but for the second half of the first Cam, CamB. |
| 0b011001111 | reserved | |
| 0b011001000<br>0b011001001<br>0b011001010<br>0b011001011<br>0b011001100<br>0b011001101<br>0b011001110 | CamAddrC<br>CamContentsC<br>CamMatchC<br>CamConfigCD<br>CamAddrD<br>CamContentsD<br>CamMatchD | <br><br><br><br><br><br>These registers are provided for the second CAM and are identical to the A and B registers. |
| 0b011001111 | reserved | |

FIG. 18/13

| OpdSel | Name | Description |
|---|---|---|
| 0b011010000 | FileBase1 | 0b00000000000000000000000AAAAAAAAAA<br>FileBase1 = AluOut[9:0];<br><br>A read/write register which provides a base address for file read and write cycles. Each CPU has its own copy of this register. |
| 0b011010001 | FileBase2 | 0b00000000000000000000000AAAAAAAAAA<br>FileBase2 = AluOut[9:0];<br><br>A read/write register which provides a base address for file read and write cycles. Each CPU has its own copy of this register. |
| 0b011010010 | FileBase3 | 0b00000000000000000000000AAAAAAAAAA<br>FileBase3 = AluOut[9:0];<br><br>A read/write register which provides a base address for file read and write cycles. Each CPU has its own copy of this register. |
| 0b011010011 | FramePointer | 0b00000000000000000000000AAAAAAAAAA<br>FramePointer = AluOut[9:0];<br><br>A read/write register which provides the base address for file read and write cycles. Frame Pointer only differs from the File Base registers in the flag fields that may be used to modify their contents. Each CPU has its own copy of this register. |
| 0b011010100 | StackPointer | Read/Write<br>StackPointer = AluOut[3:0];<br>This register may be written directly, although it is normally incremented by a jsr and decremented by a return. Since the stack is only 8 deep, writing a value of more than 8 essentially causes the stack to be full. Each CPU has its own copy of this register. |
| 0b011010101 | StackData Read/Write | StackData = AluOut[15:0];<br>The stack may be written or read directly. Writing to the stack will, if StackPointer is less than 8, write the value to the stack addressed by StackPointer, and the Stack Pointer will be incremented, simulating a stack push. If the StackPointer is greater than 7, any write to StackData is ignored. Reading from the stack will, if the StackPointer is greater than 0, cause the StackPointer to be decremented, and the contents of the stack addressed by the new StackPointer to be returned, simulating a stack pop. If the StackPointer is 0, it will be unaffected by a read and a value of 0x0004(the error address) will be returned. Each CPU has its own copy of this register. |
| b011010110 | InstrRegL 0xIIIIIIII | This is a read-only register which returns the contents of InstrReg[31:0]. Writing to this register has no effect. |
| b011010111 | InstrRegH | 0x00IIIIII<br>This is a read-only register which returns the contents of InstrReg[55:32]. Writing to this register has no effect. |
| b011011xxx | reserved | |

FIG. 18/14

| OpdSel | Name | Description | | |
|---|---|---|---|---|
| b011100000 | reserved | | | |
| b011100001 | MacCfg | Write only. | | |

| bit | name | description |
|---|---|---|
| 31 | TbiReset | Writing a one (1) will force reset asserted to the Ten Bit Interface of the Mac. |
| 30 | TbiSel | Setting this bit enables the ten bit interface instead of the GMII. |
| 29 | Gbit | Setting this bit configures the mac in GMII byte mode. If this bit is reset the mac will be configured in MII nibble mode. |
| 28 | FullDuplex | Setting this bit configures the Mac in full duplex mode. Full duplex is supported for 10 and 100 speeds only. |
| 27 | HugeEn | Setting this bit allows frames longer than 1518 bytes to be transmitted and received. |
| 26 | ChainEn | Setting this bit enables the receive sequencer to chain buffers in the event that the incomming frame exceeds a single buffer's capacity. |
| 25 | SramBufEn | Setting this bit causes the receive and transmit sequencers to use address bit 27 of the buffer descriptor to select either an sram buffer or dram buffer. |
| 24:21 | Reserved | |
| 20:14 | GapBB | This value is the number of bits required between back to back packets. The default value is 0x60 or 96 decimal. |
| 13:07 | GapR1 | This value represents a carrier sense value. If carrier is detected before GapR1 bits, the MAC defers to carrier. If, however carrier is detected after GapR1, the MAC will transmit after GapR2 is reached, knowingly causing a collision, and ensuring fair access to the medium.The default value is 0x40 (64d) which is 2/3 of the default GapR2. |
| 06:00 | GapR2 | This value is the number of bits in a non-back-to-back packet. The default value is 0x60 (96d). |

FIG. 18/15

| OpdSel | Name | Description | | |
|---|---|---|---|---|
| 0b01110010 | XmtCfg | Write only. | | |
| | | bit | name | description |
| | | 31 | Reset | Writing a one (1) will force reset asserted to the transmit sequencer and the xmt portion of the mac. |
| | | 30 | XmtEn | Writing a one (1) allows the transmit sequencer to run. Writing a zero (0) causes the transmit sequencer to halt after completion of the current packet. |
| | | 29 | PauseEn | Writing a one (1) allows the transmit sequencer to stop packet transmission, after completion of the current packet, whenever the receive sequencer detects an 802.3X pause command packet. |
| | | 28 | UrgSavEn | Determines whether or not to save an urgent descriptor back on the free queue. Writing a one allows the descriptor to be saved. |
| | | 27:17 | Reserved | |
| | | 16:15 | PriLevels | Determines the number of priority levels to be implemented by the transmit sequencer. 0 selects a single level, 1 selects two levels, 2 selects three levels and 3 selects four levels of priority. Each priority level consumes a single transmit queue. |
| | | 14:10 | FreeQId | Selects the queue to which the free-buffer descriptors will be written following transmission of a packet. |
| | | 09:05 | XmtQId | Selects the base queue from which the transmit buffer descriptors will be fetched for data packets. The queue priority level is ORed with the base queue id to create the queue id for each priority level. The priority levels are in ascending order such that level 3 represents the highest priority. Note that when using three or four priority levels, the base queue id must be set to a modulo 4 queue id. When using two priority levels, the base queue id must be set to a modulo 2 queue id. When using a single priority level, the base queue id may be set to any value. |
| | | 04:00 | VectQId | Selects the queue to which the transmit vector data is written after the completion of each packet transmit. |

FIG. 18/16

| OpdSel | Name | Description |
|---|---|---|
| 0b01110011 | RcvCfg | Write only. |

| bit | name | description |
|---|---|---|
| 31 | Reset | Writing a one (1) will force reset asserted to the receive sequencer and the rcv portion of the mac. |
| 30 | RcvEn | Writing a one (1) allows the receive sequencer to run. Writing a zero (0) causes the receive sequencer to halt after completion of the current packet. |
| 29 | RcvAll | Writing a one (1) allows the receive sequencer to ignore the Mac destination id field and receive all packets regardless of destination address. |
| 28 | RcvBad | Writing a one (1) allows the receive sequencer to receive packets for which a link error was detected. |
| 27 | CtrlEn | Writing a one (1) allows the receive sequencer to receive 802.3X control packets and to load the pause counter with data passed in a pause-control packet. |
| 26 | AddrBEn | Writing a one (1) allows reception of packets with the mac destination address equal to the contents of RcvAddrB. |
| 25 | AddrAEn | Writing a one (1) allows reception of packets with the mac destination address equal to the contents of RcvAddrA. |
| 24 | Download | Writing a one (1) to this bit causes the write line to be asserted to the receive sequencer control store. Data may then be downloaded by writing the address to the RcvAddrAL register and the data to the RcvAddrBH & RcvAddrBL registers |
| 23:22 | Reserved | |
| 21 | QHashEn | Writing a one (1) to this bit causes CtxHash to be written to the receive queue, by merging it with the receive descriptor. |
| 20:17 | HashSize | This register is read by firmware to modify the 16-bit context-hash length to a number of bits consistent with the main microcode. It yields hash lengths of 16 to 8 bits. Hash lengths less than eight bits are not allowed. The firmware implements the following algorithm : NewHash = ((Hash16 + (Hash16 >> HashSize) & ~(ffff << HashSize)); |
| 16:15 | PriLevels | Determines the number of priority levels to be implemented by the receive sequencer. 0 selects a single level, 1 selects two levels, 2 selects three levels and 3 selects four levels of priority. Each priority level consumes a single receive queue. |
| 14:10 | VectQId | Selects the queue to which the receive vector data is written after the completion of each packet received. |

FIG. 18/17

| OpdSel | Name | Description | | |
|---|---|---|---|---|
| | | 09:05 | RcvQId | Selects the base queue to which the receive buffer descriptors will be written for incoming packets. The queue priority level is ORed with the base queue id to create the queue id for each priority level. The priority levels are in ascending order such that level 3 represents the highest priority. Note that when using three or four priority levels, the base queue id must be set to a modulo 4 queue id. When using two priority levels, the base queue id must be set to a modulo 2 queue id. When using a single priority level, the base queue id may be set to any value. |
| | | 04:00 | FreeQId | Selects the queue from which the buffer descriptors will be fetched for reception of packets. |
| 0b011100100 | RcvAddrAL | Write only. | | |
| | | bit | name | description |
| | | 31:00 | RcvAddrA[31:00] | Lower bits of Mac receive address A. Bits 8:0 are also used for the download address when downloading microcode to the RcvSeq control store. |
| 0b011100101 | RcvAddrAH | Write only. | | |
| | | bit | name | description |
| | | 31:16 | reserved | Reserved for future use. |
| | | 15:00 | RcvAddrA[47:32] | Upper bits of Mac receive address A. |
| 0b011100110 | RcvAddrBL | Write only. | | |
| | | bit | name | description |
| | | 31:00 | RcvAddrB[31:00] | Lower bits of Mac receive address B Bits 31:0 are also used for bits 31:0 of the data when downloading microcode to the RcvSeq control store. |
| 0b011100111 | RcvAddrBH | Write only. | | |
| | | bit | name | description |
| | | 31:16 | reserved | Reserved for future use. |
| | | 15:00 | RcvAddrB[47:32] | Upper bits of Mac receive address B. Bits 4:0 are also used for bits 36:32 of the data when downloading microcode to the RcvSeq control store. |

FIG. 18/18

| OpdSel | Name | Description |
|---|---|---|
| 0b011101000 | PciAddrReg | A register containing the address of the memory location written to by another Pci master. This register is updated whenever the Pci Slave logic detects a slave access to Mojave configuration space or a write access to either of the function's memory spaces.<br>The CPU normally reads this register. It only writes to this register to clear the address valid bit 21 (see below). The data sent during a Cpu write is ignored.<br><br>The register is defined as follows:<br><br>bit    description<br>31    0<br>30.    Write to Memory Space for Function 2<br>29    Write to Memory Space for Function 1<br>28    Write to Memory Space for Function 0<br>27:24    ByteEnables from PCI_CBE[3:0]<br>23    0<br>22    0<br>21    PCI Access Pending. This bit is set for all writes to Memory Space function 0 (Network) or function 1 (Utility). It is cleared by any CPU write to this register, or if the PCI Queue is enabled it is cleared by the hardware when the hardware write to the queue is successful.<br>20    Word write (all ByteEnables are set)<br>19:00    Pci Address bits 19-0 |
| 0b011101001 | PciDataReg | This register is read only and is written whenever the Pci Address Register (above) is loaded by another Pci Master. It contains the data to be written. |
| 0b011101010 | PciCfgRegAddr | This register is read/write and controls the Cpu's access to PCI configuration register. This register must be loaded by the Cpu before accessing any configuration register with a value that mirrors the PCI address required when accessing the register from PCI. Only the following addresses have any meaning for Mojave. Registers that must be written to by the Cpu on reset are marked (init) and registers that are only written from pci are marked (pci). An 'n' in the address below signifies a PCI function number, and an 'x' is a 'don't care' in the function number (i.e writes to any function set the register).<br><br>0hn00 (init)    DeviceId    = CpuData bits 31:16<br>                 There is one register for each PCI function<br>0h000 (init)    VendorId    = CpuData bits 15:0<br>                 When writing to functions other than 0 these bits are ignored.<br><br>0hn04 (pci)    EnableParityError    = CpuData bit 6<br>      (pci)    EnableWriteInvalidate    = CpuData bit 4<br>      (pci)    EnablePciMaster    = CpuData bit 2<br>      (pci)    EnableFunction0Mem    = CpuData bit 1<br>                 There is one register for each PCI function<br><br>0hn05 (pci)    EnableSystemError    = CpuData bit 8<br>                 There is one register for each PCI function<br><br>0hx06 (init)    FastBacktoBackCapable    = CpuData bit 23<br>      (init)    Pci66MhzCapable    = CpuData bit 21<br>      (init)    PciCapabilitiesEnabled    = CpuData bit 20 |

FIG. 18/19

| OpdSel | Name | Description | |
|---|---|---|---|
| 0hx07 | (read only) | DetectedParityError | = CpuData bit 31 |
| | (read only) | ReceivedMasterAbort | = CpuData bit 29 |
| | (read only) | ReceivedTargetAbort | = CpuData bit 28 |
| | (init) | DeviceSelectTiming | = CpuData bits 26:25 |
| | (read only) | DataParityErrorDetected | = CpuData bit 24 |

0hn08 (init)  ClassCode            = CpuData bits 31-8
There are 2 Class Code registers. Writing to function 1 sets the Class Code for function 1. Writing to any other function writes the Class Code for all other functions.

0hx08 (init)  RevisionId           = CpuData 7-0

0hn0c (pci)   CacheLineSize        = CpuData bits 7-0
There is one register for each PCI function 0hn0d (pci)   LatencyTimer         = CpuData bits 15-11
(Bits 10-8 of the Latency Timer are always 1's)
There is one register for each PCI function 0hx0e (read only)  HeaderType      = CpuData bit 23
Set to 1 if the number of functions enabled is greater than 1.

0hx0f (init)  BistCapable          = CpuData bit 31
      (pci)   BistStart            = CpuData bit 30
      (init)  BistResult           = CpuData bit 27-24

0hn10 (pci)   MemFunctioAddrStart  = CpuData 31-0
This is the base PCI address for the NIC control registers. Bits 14-0 are not implemented so the address is always on a 32K address boundary. There is one register for each PCI function 0h014 (pci)   DramAddrStart        = CpuData bits 31-0
This is the base PCI address of the DRAM memory. Bits 15-0 are not implemented so the address is always on a 64K boundary. There is only one register and which function is used to access this register from the PCI perspective is dependant on the DramRomFunction number in the DramSize register (see below).

0hx2c (init)  SubsystemId          = CpuData bits 31-16
              SubsystemVendorId    = CpuData bits 15-0

0h030 (pci)   RomAddrStart         = CpuData bits 31-0
This is the base PCI address of the Flash EEPROM memory. Bits 15-1 are not implemented so the address is always on a 64K boundary. There is only one register and which function is used to access this register from the PCI perspective is dependant on the DramRomFunction number in the DramSize register (see below).

0hx34 (init)  PciCapPtr            = CpuData bits 7-3
This allows the Pci Capabilites to move to anywhere in PCI functions Configuration Space, aligned to an 8 byte boundary.

0hx3c (init)  MaxLatency           = CpuData bits 31-24
      (init)  MinGrant             = CpuData bits 23-16
0hn3c (init)  InterruptPin         = CpuData bits 15-8
There is one InterruptPin register for each PCI function. A value of 1 corresponds to INTA, 2 to INTB, 3 to INTC, and 4 to INTD. Values of 5 through 0xff are reserved as per PCI spec.

FIG. 18/20

| OpdSel | Name | Description |
|---|---|---|
| | | PciCapPtr + |
| | | 0hx00 (read only) CapabilityId = CpuData bits 7-0 |
| | |     Always read as 0h01 (Power Management) |
| | | 0hx01 (read only) NextItemPointer = CpuData bits 15-8 |
| | |     Always read as 0h00 |
| | | 0hx02 (init) PowerManagementCapabilities = CpuData bits 31-16 |
| | |     Software may implement all bits |
| | |     see Power Management Spec for details |
| | | 0hx04 PowerManagementControl/Status = CpuData bits 31-16 |
| | |     Bit 31     PME_Status - set by cpu, reset from PCI |
| | |     (read only) Bits 30 - 24   Not implemented - always 0 |
| | |     (pci) Bit 23     PME_Enable - set from PCI |
| | |     (read only) Bits 22-18   Not implemented - always 0 |
| | |     (pci) Bits 17-16   PowerState - set from PCI |
| | |     There is one Control/Status register for each PCI function. |
| | |     See Power Management Spec for details |
| | | 0hx06 (read only) PMCSR_BSE = CpuData bits 31-16 |
| | |     Always read as 0h0000 |
| 0b011101011 | PciCfgRegData | This register is Read/Write. The data read or written is accessed indirectly using address given in the ConfigRegisterAddress (see above) |
| 0b011101100 | PciDramSize | This register is Read/Write.<br>Bits 31:30 are unused<br>Bits 29:28 DramRomFunction Number<br>Bits 27:0 Dram Size<br>The Dram Size bits should be written with the (Dram Size - 1) in bytes.<br>The Dram Size should be a multiple of 64K bytes to a maximum of 256MB.<br>Bits 15-1 of this register are not implemented but are always read as 1's. Bit 0 serves as a DramEnable, so if this bit is 0, the Dram is not enabled. |
| 0b011101101 | PciIntReg | This register is Read/Write<br>When writing to this register<br>Bit 8     = 0 set interrupt indicated by bits 2-0<br>            = 1 reset interrupt indicated by bits 2-0<br>Bit 2     Set/Reset PCI Interrupt for function 2<br>Bit 1     Set/Reset PCI Interrupt for function 1<br>Bit 0     Set/Reset PCI Interrupt for function 0<br>When reading this register, bits 2-0 return the status of each functions interrupt. Each functions interrupt state is mapped to the PCI INTA, INTB, INTC, and INTD lines in hardware according to the values in the Interrupt Pin register (see above). The interrupt state for each function may be reset by microcode, but is normally reset in hardware by a host write to address 8 of the particular function's memory address space. |

FIG. 18/21

| OpdSel | Name | Description |
|---|---|---|
| 0b011101110 | PciStatus | The following bits are implemented. |
| | (read/write) | ReadStopImmediate = CpuData 17<br>This bit will cause a read multiple command to be terminated immediately when the latency timer expires. Normally the read multiplecommand will continue to the next cache line boundary to try to make maximum use of the PCI bandwidth. |
| | (read/write) | EnableSelfAddress = CpuData 16<br>This bit enables the board, as a master, to address itself as a slave. This is normally not allowed as per the PCI specification. |
| | (read/write) | SlaveBurstDisable = CpuData 15<br>This bit will retry all attempts by PCI masters to burst accesses to Mojave after transferring the first word. |
| | (read/write) | RestrictBurstSize = CpuData 14<br>This bit will restrict Mojave from bursting as a PCI master. Mojave will be limited to 64 byte bursts (128 byte bursts if the cache line size is 128) |
| | (read/write) | PrefetchableMemory = CpuData 13<br>This bit will report each functions memory address space as prefetchable by returning bit 3 in the base address registers. |
| | (read/write) | PciConfigured = CpuData 12<br>Set to indicate the Cpu has finished setting up the configuration registers. If this bit is reset, all Pci config cycles to this target will be retried. |
| | (read /write) | NumPciFunctions = CpuData 11:10 |
| | (read /write) | PciQueueEnabled = CpuData 9<br>When this bit is set, all PCI slave writes will be detected in hardware, and 64 bits of dat will be written to the queue indicated by the PciQueueId. The first 32 bits will be contents of the PciAddrReg (see above) and the second 32 bits will be the contents of the PciDataReg (see above). Note that care must be taken when microcode changes the state of this bit that no PCI slave writes are being done at the same time, since this will lead to unpredicatble results. |
| | | Unused = CpuData 8:4 |
| | (read only) | Pci66Mhz = CpuData bit 3 |
| | (read only) | Pci64 = CpuData bit 2 |
| | (read/write) | PciDACenable = CpuData bit 1<br>(enable 64 bit addressing) |
| | (read/write) | PciBigEndian = CpuData bit 0 |
| 0b011101111 | PciROMSize | This register is read/write and should be written with the (Memory Size -1) in bytes. It should be a multiple of 64K bytes to a maximum of 256K bytes. Bits 15-1 of this register are not implemented but are always read as 1's. Bit 0 serves as a ROMenable, so if this bit is 0, the ROM is not enabled. |

FIG. 18/22

| OpdSel | Name | Description |
|---|---|---|
| 0b01111XXXX | Sram OPERATIONS | |

| OpdSel[3] | PostAddrOp |
|---|---|
| 0 | nop |
| 1 | RamAddr = RamAddr + (OpdSel[1:0]); |

| OpdSel[2] | transpose_Ctrl |
|---|---|
| 0 | don't transpose |
| 1 | transpose bytes |

| OpdSel[1:0] | RamOpdSz |
|---|---|
| 0 | quadlet |
| 1 | triplet |
| 2 | doublet |
| 3 | byte |

RAM READ ATTRIBUTES / SOURCE OPERAND

| endian mode | trans-pose | byte offs | Sram data | sz=Q | sz=T | sz=D | sz=B |
|---|---|---|---|---|---|---|---|
| little | 0 | 0 | abcd | abcd | 0bcd | 00cd | 000d |
| little | 0 | 1 | abcX | trap | 0abc | 00bc | 000c |
| little | 0 | 2 | abXX | trap | trap | 00ab | 000b |
| little | 0 | 3 | aXXX | trap | trap | trap | 000a |
| little | 1 | 0 | abcd | dcba | 0dcb | 00dc | 000d |
| little | 1 | 1 | abcX | trap | 0cba | 00cb | 000c |
| little | 1 | 2 | abXX | trap | trap | 00ba | 000b |
| little | 1 | 3 | aXXX | trap | trap | trap | 000a |
| BIG | 0 | 0 | abcd | abcd | 0abc | 00ab | 000a |
| BIG | 0 | 1 | Xbcd | trap | 0bcd | 00bc | 000b |
| BIG | 0 | 2 | XXcd | trap | trap | 00cd | 000c |
| BIG | 0 | 3 | XXXd | trap | trap | trap | 000d |
| BIG | 1 | 0 | abcd | dcba | 0cba | 00ba | 000a |
| BIG | 1 | 1 | Xbcd | trap | 0dcb | 00cb | 000b |
| BIG | 1 | 2 | XXcd | trap | trap | 00dc | 000c |
| BIG | 1 | 3 | XXXd | trap | trap | trap | 000d |

RAM WRITE ATTRIBUTES / SOURCE OPERAND

| endian mode | trans-pose | Opd size | Alu out | OF=0 | OF=1 | OF=2 | OF=3 |
|---|---|---|---|---|---|---|---|
| little | 0 | Q | abcd | abcd | trap | trap | trap |
| little | 0 | T | Xbcd | -bcd | bcd- | trap | trap |
| little | 0 | D | XXcd | --cd | -cd- | cd-- | trap |
| little | 0 | B | XXXd | ---d | --d- | -d-- | d--- |
| little | 1 | Q | abcd | dcba | trap | trap | trap |
| little | 1 | T | Xbcd | -dcb | dcb- | trap | trap |
| little | 1 | D | XXcd | --dc | -dc- | dc-- | trap |
| little | 1 | B | XXXd | ---d | --d- | -d-- | d--- |
| big | 0 | Q | abcd | abcd | trap | trap | trap |
| big | 0 | T | Xbcd | bcd- | -bcd | trap | trap |
| big | 0 | D | XXcd | cd-- | -cd- | --cd | trap |
| big | 0 | B | XXXd | d--- | -d-- | --d- | ---d |
| big | 1 | Q | abcd | dcba | trap | trap | trap |
| big | 1 | T | Xbcd | dcb- | -dcb | trap | trap |
| big | 1 | D | XXcd | dc-- | -dc- | --dc | trap |
| big | 1 | B | XXXd | d--- | -d-- | --d- | ---d |

FIG. 18/23

| OpdSel | Name | Description |
|---|---|---|
| 0b1000xxxxx | BinaryBits | ( 1'b1 << OpdSel[4:0] ); |
| 0b1001xxxxx | BitMasks | (32'hffff_ffff >> OpdSel[4:0]); |
| 0b1010xxxxx | Constants | {0b000, OpdSel[4:0]} |
| 0b101100000 to 0b111111111 | File (mode5) | File@( {2'b11, OpdSel[7:0]} ); |

FIG. 18/24

| TstSel | SELECTED TEST | |
|---|---|---|
| 0b00xxxxx | Tst = AluOut[TstSel[4:0]] | //Alu bit |
| 0b0100000 | Tst = C | //carry |
| 0b0100001 | Tst = V | //error |
| 0b0100010 | Tst = Z | //zero |
| 0b0100011 | Tst = (Z | ~C) | //less or equal |
| 0b0100100 | Tst = PrevC | //previous carry |
| 0b0100101 | Tst = PrevV | //previous error |
| 0b0100110 | Tst = PrevZ | //previous zero |
| 0b0100111 | Tst = (PrevZ & Z) | //64b zero |
| 0b0101000 | Tst = QOpDn | //queue op okay |
| 0b0101001 | Tst = PCIAccessPending | //PCI slave access pending |
| 0b0101010 | Tst = (PrevZ | ~PrevC) | //previous less or equal |
| 0b0101011 | Tst = reserved | |
| 0b0101100 | Tst = (AluOut[7:0] = 0) | //alu out byte 0 = zero |
| 0b0101101 | Tst = (AluOut[15:8] = 0) | //alu out byte 1 = zero |
| 0b0101110 | Tst = (AluOut[23:16] = 0) | //alu out byte 2 = zero |
| 0b0101111 | Tst = (AluOut[31:24] = 0) | //alu out byte 3 = zero |
| 0b0110xxx | Tst = Lock[TstSel[2:0]]<br>Lock(TstSel[2:0]) = 1; | //tests the current value of<br>//the Lock then set it. |
| 0b0111xxx | Tst = Lock[TstSel[2:0]] | //tests the value of Lock. |
| 0b1000xxx | Tst = Lock[8+TstSel[2:0]]<br>Lock(8+TstSel[2:0]) = 1; | //duplivate logic for locks 8-15 |
| 0b1001xxx | Tst = Lock[8+TstSel[2:0]] | |
| 0b1010000 | Tst = AluOut[31] ^ V; | //signed less than |
| 0b1010001 | Tst = (AluOut[31] ^ V) | Z; | //signed than or equal |
| 0b1010010 | Tst = PrevAluOut[31] ^ PrevV; | //previous signed less than |
| 0b1010011 | Tst = (PrevAluOut[31] ^ PrevV) | PrevZ; | //previous signed less than or equal |
| 0b10101xx | Tst = reserved | |
| 0b1011xxx | Tst = reserved | |
| 0b11xxxxx | Tst = reserved | |

FIG. 19

| FlgSel | FLAG OPERATION | |
|---|---|---|
| 0b0000000 | No operation. | |
| 0b0000001 | reserved | |
| 0b0000010 | SelBigEnd | Selects big-endian mode for ram accesses for the current Cpu. |
| 0b0000011 | SelLitEnd | Selects little-endian mode for ram accesses for the current Cpu. |
| 0b0000100 | DblMap | Disable instruction re-mapping for the current Cpu. |
| 0b0000101 | EnbMap | Enable instruction re-mapping for the current Cpu. |
| 0b0000110 | IncFp | Increment Frame Pointer<br>FramePointer = FramePointer + Literal[9:0];<br>Note that since the Frame pointer is 10 bits, this flag field allows the Frame Pointer to be adjusted up or down without using the alu. |
| 0b0000111 | InhibitCc | Inhibit Alu condition codes from overwriting the previous values. This enables the previous values to be tested in a later instruction. |
| 0b0001xxx | reserved | |
| 0b001XXXX | ClrLck | Lock[FlgSel[3:0]] = 0;<br>Clears the semaphore register bit for the current Cpu only. |
| 0b010XXXX | AddrOp | |

FlgSel[3:2]    AddrSelect
              0         RamAddr = Literal[15]    ? Literal    : (Literal + RamBase);
              1         RamAddr = AddrRegA[15] ? AddrRegA : (AddrRegA + RamBase);
              2         RamAddr = AddrRegB[15] ? AddrRegB : (AddrRegB + RamBase);
              3         if (OpdA == RamAddr)
                             RamAddr = AluOut[15]    ? AluOut    : (AluOut + RamBase);
                else if (OpdA == ram)
                             RamAddr = AddrRegB[15] ? AddrRegB : (AddrRegB + RamBase);
                else
                           RamAddr = AddrRegA[15] ? AddrRegA : (AddrRegA + RamBase);

FlgSel[1:0]    addr reg load
              0         nop
              1         AddrRegA = Literal;
              2         AddrRegB = Literal;
              3         AddrRegA = Literal;        AddrRegB = Literal;

note: When specifying the same register for both the load and select fields, the current value of the register, before it is loaded with the new value, will be used for the ram address.

FIG. 20/1

| FlgSel | FLAG OPERATION | |
|---|---|---|
| 0b0110000 | AluToFB1 | The output of the Alu is redirected and written to FileBase1. The normal destination addressed by OpSelA is not written. |
| 0b0110001 | AluToFB2 | The output of the Alu is redirected and written to FileBase2. The normal destination addressed by OpSelA is not written. |
| 0b0110010 | AluToFB3 | The output of the Alu is redirected and written to FileBase3. The normal destination addressed by OpSelA is not written. |
| 0b0110011 | AluToFP | The output of the Alu is redirected and written to FramePointer. The normal destination addressed by OpSelA is not written. |
| 0b0110100 | AluToRamBase | The output of the Alu is redirected and written to RamBase. The normal destination addressed by OpSelA is not written. |
| 0b0110101 | AluToAddrRega | The output of the Alu is redirected and written to AddrRegA. The normal destination addressed by OpSelA is not written. |
| 0b0110110 | AluToAddrRegb | The output of the Alu is redirected and written to AddrRegB. The normal destination addressed by OpSelA is not written. |
| 0b0110111 | AluToAddrRegab | The output of the Alu is redirected and written to AddrRegA & AddrRegB. The normal destination addressed by OpSelA is not written. |
| 0b0111000 | ModifyFb1 | The output of the Alu is added to the literal field and written to FileBase1. The normal destination addressed by OpSelA is not written.<br>Note that these instructions allow the address of an item in an array in the register file to be calculated in one instructon.<br>e.g   integer array[20];<br>       reg index;<br>       a = array[index];<br>may be done as follows:<br>shftl index c2, modify_fb1 BASE_ADDRESS_OF_ARRAY;<br>move a fb1_r0; |
| 0b0111001 | ModifyFb2 | The output of the Alu is added to the literal field and written to FileBase2. The normal destination addressed by OpSelA is not written.<br>See note for ModifyFb1 |
| 0b0111010 | ModifyFb3 | The output of the Alu is added to the literal field and written to FileBase3. The normal destination addressed by OpSelA is not written.<br>See note for ModifyFb1 |
| 0b0111011 | ModifyFp | The output of the Alu is added to the literal field and written to FramePointer. The normal destination addressed by OpSelA is not written.<br>See note for ModifyFb1 |
| 0b0111100 | ModifyRamBase | The output of the Alu is added to the literal field and written to RamBase. The normal destination addressed by OpSelA is not written.<br>See note for ModifyFb1 |

FIG. 20/2

| FlgSel | FLAG OPERATION | |
|---|---|---|
| 0b0111101 | ModifyAddrRegA | The output of the Alu is added to the literal field and written to AddrRegA. The normal destination addressed by OpSelA is not written. Note that these instructions allow the address of an item in an array in sram to be calculated in one instructon.<br>e.g   integer array[20];<br>        reg index;<br>        a = array[index];<br>may be done as follows:<br>shftl index c2, modify_addr_rega BASE_ADDRESS_OF_ARRAY;<br>move a sram4; |
| 0b0111110 | ModifyAddrRegB | The output of the Alu is added to the literal field and written to AddrRegB. The normal    destination addressed by OpSelA is not written.<br>See note for ModifyAddrRega |
| 0b0111111 | ModifyAddrRegAB | The output of the Alu is added to the literal field and written to AddrRegA and AddrRegB. The normal destination addressed by OpSelA is not written.<br>See note for ModifyAddrRega |
| 0b1000000 | WrWcsL@Dbg | Causes the bits [31:0] of the control-store at address DbgAddr to be written with the current AluOut data. |
| 0b1000001 | WrWcsH@Dbg | Causes the bits [63:32] of the control-store at address DbgAddr to be written with the current AluOut data. |
| 0b1000010 | RdWcsL@Dbg | Causes the bits [31:0] of the control-store at address DbgAddr to be moved to the last register in the register file (for Mojave this is address 0x3ff) |
| 0b1000011 | RdWcsH@Dbg | Causes the bits [63:32] of the control-store at address DbgAddr to be moved to the last register in the register file (for Mojave this is address 0x3ff) |
| 0b1000100 | reserved | |
| 0b10001XX | Step | Allows the Cpu (FlgSel[1:0]) cycles after the current cycle to execute a single instruction. There is no effect if the Cpu is not halted. An Offset of 0 is not allowed. |
| 0b10010XX | PcMd | Selects the Pc as the address source for the control-store during instruction fetches for the Cpu (FlgSel[1:0]) cycles after the current cycle. |
| 0b10011XX | DbgMd | Selects the DbgAddr address register as the address source for the control-store during instruction fetches for the Cpu (FlgSel[1:0]) cycles after the current cycle. |
| 0b10100XX | Hlt | Halts the Cpu (FlgSel[1:0]) cycles after the current cycle. |
| 0b10101XX | Run | Clears Halt for the Cpu (FlgSel[1:0]) cycles after the current cycle. |
| 0b1011XXX | reserved | |

FIG. 20/3

| FlgSel | FLAG OPERATION | | |
|---|---|---|---|
| 0b110XXXX | SramWriteFlag | \multicolumn{2}{l}{This flag can be used in order to cause the output of the Alu to be written to Sram, as well as to some other destination. The least significant 4 bits of the FlgSel field are used to control the write, in the same way as the OpnSel field when the OpnSel field is addressing the same Sram (see page 29).} |

FlagSel [3]        PostAddrOp
        0                  nop
        1                  RamAddr = RamAddr + (FlagSel [1:0])

FlagSel [2]        transpose control
        0                  don't transpose
        1                  transpose bytes FlagSel [1:0]      Ram Operand Size
        1.                Quadlet
        2.                Triplet
        3.                Doublet
        4.                Byte 0b111xxxx        Reserved

FIG. 20/4

| PriLevels | VLAN Pri | Receive Queue |
|---|---|---|
| X | Non-VLAN | 0 |
| 0 | X | 0 |
| 1 | Pri<4 | 0 |
| 1 | Pri>3 | 1 |
| 2 | Pri<4 | 0 |
| 2 | Pri>3&<6 | 1 |
| 2 | Pri>5 | 2 |
| 3 | Pri=0,3 | 1 |
| 3 | Pri=1,2 | 0 |
| 3 | Pri=4,5 | 2 |
| 3 | Pri>5 | 3 |

FIG. 38

RECEIVE DESCRIPTOR

| bit | name | description with QhshEn = 0 |
|---|---|---|
| 31 | reserved | |
| 30 | Attn | A copy of FRAME_STATUS - Attn bit. |
| 29:28 | BufSize | Represents the size of the buffer by indicating at what boundary the buffer should start and terminate. This is used in to determine the starting address of the buffer:<br><br>Normal Mode<br>S = 0   256B boundary. A[07:0] ignored.<br>S = 1   2KB boundary. A[10:0] ignored.<br>S = 2   16KB boundary. A[11:0] ignored.<br>S = 3   32KB boundary. A[14:0] ignored. |
| 27:00 | BufAddr | Represents the base-address of the buffer to which frame data was transferred.<br>If SramBufEn is reset then the address describes a Dram buffer. If SramBufEn is set then address bit[27], when set indicates an sram buffer was used and when reset indicates a dram buffer was used. |

| bit | name | description with QhshEn = 1 |
|---|---|---|
| 31 | Attn | A copy of FRAME_STATUS - Attn bit. |
| 30:14 | BufAddr27:11 | Represents the base-address of the buffer to which frame data was transferred.<br>If SramBufEn is reset then the address describes a Dram buffer. If SramBufEn is set then address bit[27], when set indicates an sram buffer was used and when reset indicates a dram buffer was used. |
| 13:00 | CtxHsh15:02 | Context hash bits 15:02 only. |

FIG. 40

RECEIVE BUFFER FORMAT

| FRAME_STATUS | | OFFSET 0x0000:0x0003 |
|---|---|---|
| bit | name | description |
| 31 | Attn | Indicates that one of the following conditions was found: !TcpIpV4, TprtErr, NetMcst, NetBcst, NetErr, NetFrag, (!MacAddrA & !MacAddrB), or LnkErr. |
| 30:25 | TpStatus | Transport Status – Bit 30 indicates a transport error occured. |
| | | 6'b1xxxxx     = Transport error detected. |
| | | 6'b100011     = Transport checksum error. |
| | | 6'b100010     = Transport underflow error. |
| | | 6'b100001     = Reserved. |
| | | 6'b100000     = Transport header length error. |
| | | 6'b01xxxx     = Transport flags detected. |
| | | 6'b0x1xxx     = Transport options detected. |
| | | 6'b0xx100     = Session NFS-RPC. |
| | | 6'b0xx011     = Session FTP. |
| | | 6'b0xx010     = Session WWW-HTTP. |
| | | 6'b0xx001     = Session SMB. |
| | | 6'b0xx000     = Session unknown. |
| 24:16 | NetStatus | Network Status – Bit 24 indicates a network error. |
| | | 9'b1_xxxx_xxxx = Network error detected. |
| | | 9'b1_0000_0011 = Checksum error. |
| | | 9'b1_0000_0010 = Underflow error. |
| | | 9'b1_0000_0001 = Reserved. |
| | | 9'b1_0000_0000 = Header length error. |
| | | 9'b0_1xxx_xxxx = Network overflow detected |
| | | 9'b0_x1xx_xxxx = Network multicast/broadcast detected |
| | | 9'b0_xx1x_xxxx = Network options detected. |
| | | 9'b0_xxx1_xxxx = Network Offset detected. |
| | | 9'b0_xxxx_1xxx = Network fragmentation detected. |
| | | 9'b0_xxxx_x010 = Transport UDP. |
| | | 9'b0_xxxx_x001 = Transport TCP. |
| | | 9'b0_xxxx_x000 = Transport unknown. |
| 15:11 | reserved | |
| 10:8 | AddrDet | Address detection code. |
| | | 3'b101    = Link multicast. |
| | | 3'b100    = Link broadcast. |
| | | 3'b011    = Link control frame. |
| | | 3'b010    = Link address B. |
| | | 3'b001    = Link address A. |
| | | 3'b000    = Link address not detected. |
| 7:0 | LnkStatus | Link status – Bit 7 indicates a link error. |
| | | 8'b1xxx_xxx    = Link error detected. |
| | | 8'b1000_0110 = Data early. |
| | | 8'b1000_0101 = Buffer overflow – pkt size > buf size. |
| | | 8'b1000_0100 = Link code error. |
| | | 8'b1000_0011 = Link dribble nibble. |
| | | 8'b1000_0010 = Link crc error. |
| | | 8'b1000_0001 = Link Overflow – pkt size > Llc size. |
| | | 8'b1000_0000 = Link Underflow – pkt size < Llc size. |
| | | 8'b01xx_xxxx = Magic packet. (Nonfunctional on Rev.A) |
| | | 8'b0x1x_xxxx = 802.3 packet. |
| | | 8'b0xx1_xxxx = Snap packet. |
| | | 8'b0xxx_1xxx = Vlan packet. |
| | | 8'b0xxx_x011 = Control packet. |
| | | 8'b0xxx_x010 = Network Ipv6. |
| | | 8'b0xxx_x001 = Network Ipv4. |
| | | 8'b0xxx_x000 = Network unknown. |

FIG. 39/1

RECEIVE BUFFER FORMAT -continued

| BYTE COUNT | Offset 0x0004:0x0005 | |
|---|---|---|
| bit | name | description |
| 15:00 | ByteCnt | Byte count of received frame. |

| CHECKSUM | Offset 0x0006:0x0007 | |
|---|---|---|
| bit | name | description |
| 15:00 | TpChksum | Reflects the value of the transport checksum at network layer completion or frame completion. If network was known but transport was unknown, the checksum will not include the psuedo-header. If network was not detected, the checksum will be 0. |

| CONTEXT HASH | Offset 0x0008:0x0009 | |
|---|---|---|
| bit | name | description |
| 15:0 | CtxHash | A hash value is derived from the network source address, network destination address, the transport source port, and the transport destination port. These values are added together to form a 16 bit number which is then adjusted by the hash size as follows: CtxHash = (Hash16 + (Hash16 >> HashSize)) & ~(16'hffff << HashSize); |

| MAC HASH | Offset 0x000A:0x000B | |
|---|---|---|
| bit | name | description |
| 15:0 | MacHash | Crc generated bits using mac destination address only. Used for multicast address only. |

| BUFFER LINK | Offset 0x000C:0x000F | |
|---|---|---|
| bit | name | description |
| 31:26 | Reserved | |
| 27:0 | BufLnk | Link descriptor to next frame if the buffer size is exceeded. Note that the frame data in a linked buffer starts at a byte Offset of 16 rather than 18 as for the first buffer. |

| PACKET ALIGN | OFFSET 0x0010:0x0011 - First buffer only. | |
|---|---|---|
| bit | name | description |
| 15:00 | Reserved | Offset 0x0010:0x0011 |

| PACKET DATA | Offset 0x0012:0x0011 - First buffer only. Offset 0x0010:0x0011 - All chained buffers. | |
|---|---|---|
| bit | name | description |
| 31:00 | PktData | Packet data only. Packet FCS is not saved. |

FIG. 39/2

RECEIVE VECTOR

| bit | name | description |
|---|---|---|
| 31 | VecInvld | Indicates that the vector is a duplicate and should be discarded. |
| 30 | Reserved | Always 0. |
| 29 | VecType | Always set. Indicates this entry is a receive vector. |
| 28 | TcpIpV4 | Network and transport layers are Tcp and IpV4 respectively. |
| 27 | TprtOpt | Transport options were detected. |
| 26 | NetOpt | Network options were detected. |
| 25 | 802.3 | Packet format was 802.3. |
| 24 | MacBcast | Mac detected a broadcast destination address. |
| 23 | MMcast | Mac detected a multicast destination address. |
| 22 | PrevCarr | A false carrier has been detected. |
| 21 | LongEvent | Refer to E110 Technical Manual. |
| 20 | PktMissed | A previous packet was missed. |
| 19 | DataEarly | Failed to save some incomming packet data. |
| 18 | CrcError | FCS detected error. |
| 17 | OddSymb | An additional 1 to 7 bits were received (10/100Mb only). |
| 16 | CodeErr | Receive code violation. |
| 15 | Attn | A copy of FRAME_STATUS - Attn. |
| 14:00 | PktLength | Total bytes in frame. |

FIG. 41

TRANSMIT DESCRIPTOR

| bit | name | description |
|---|---|---|
| 31 | MergeFlag | Indicates that this buffer descriptor is followed by a partial-checksum descriptor (see below) which is to be merged with the buffer contents during transmission. |
| 30 | SoftFlag | This bit is returned in transmit vector bit 28 at the completion of a transmit. |
| 29:28 | BufSize | Indicates the size of the buffer. |
| | | Size = 0    256B boundary. A[07:0] ignored. |
| | | Size = 1    2KB boundary. A[10:0] ignored. |
| | | Size = 2    16KB boundary. A[13:0] ignored. |
| | | Size = 3    32KB boundary. A[14:0] ignored. |
| 27:08 | BufAddr | The starting address of the transmit buffer. |
| 07:00 | Reserved | |

FIG. 43

MERGE DESCRIPTOR

| bit | name | description |
|---|---|---|
| 31:17 | MergeIx | Word offset from the start of the packet (Start of buffer + 9 words) at which to merge the partial checksum. |
| 16 | Reserved | Always 0. |
| 15:00 | MergeData | Partial-checksum to be added to the two bytes at MergeIx to form a new checksum. |

FIG. 44

TRANSMIT-BUFFER FORMAT

RESERVED    Offset 0x0000:0x0003

BYTE COUNT    Offset 0x0004:0x0005

| bit | name | description |
|---|---|---|
| 15:00 | ByteCnt | Byte count of frame to be transmitted. |

RESERVED    Offset 0x0006:0x000B

BUFFER LINK    Offset 0x000C:0x000F

| bit | name | description |
|---|---|---|
| 31:28 | Reserved | |
| 27:00 | BufLnk | Link to next frame if the buffer size is exceeded. Note that the frame data in a linked buffer starts at a byte Offset of 16 rather than 18 as for the first buffer. |

PACKET ALIGN    Offset 0x0010:0x0011 - First buffer only.

PACKET DATA    Offset 0x0012:EOB   - First buffer only.
Offset 0x0010:EOB   - All chained buffers.

| bit | name | description |
|---|---|---|
| 31:00 | PktData | Packet data only. Crc is generated by the mac. |

FIG. 45

TRANSMIT VECTOR

| bit | name | description |
|---|---|---|
| 31:30 | Reserved | Always 0. |
| 29 | VecType | Set to 0 to indicate this entry is a transmit vector. |
| 28 | SoftFlag | A copy of transmit-buffer descriptor-bit 30. |
| 27 | XmtDone | Transmission of the packet was completed. |
| 26 | Deferred | The packet was deferred at least once, and fewer than the excessive limit. |
| 25 | DeferLng | The packet was deferred in excess of 6,071 nibble times in 100Mbs mode or 24,287 bit times in 10Mbs mode. Not set for Gbe mode. |
| 21:24 | CollCnt | Number of collisions incurred during transmission attempts. |
| 20 | CollAbort | Packet was aborted after CollCnt exceeded 15. |
| 19 | CollLate | Collision occurred beyond the normal collision window (512 bit imes). |
| 18 | DmaErr | XmitSeq failed to provide timely data or an ecc error was detected. |
| 17 | BrdCst | Packet's destination address was broadcast address. |
| 16 | MltCst | Packet's destination address was multicast address. |
| 15:00 | PktLength | Total bytes transmitted on the wire. |

FIG. 46

| | |
|---|---|
| Queue 0 | Pci Slave Write Queue |
| | When the PCI queue is enabled, all slave writes to Mojave will be written to this queue as 64 bit entries. The first 32 bits written will be the Pci Address Register (see page 36), and the second 32 bits will be the PCI Data Register. |
| Queue 1 | D2D DMA |
| Queue 2 | D2S DMA |
| Queue 3 | D2P DMA |
| Queue 4 | S2D DMA |
| Queue 5 | S2P DMA |
| Queue 6 | P2D DMA |
| Queue 7 | P2S DMA |
| | These 7 queues are used for sending DMA commands to each of the DMA sequencers. For a description of these commands refer to the DMA section following. |

FIG. 48

| | | |
|---|---|---|
| Queue 1 | D2D | (Dram to Dram) |
| Queue 2 | D2S | (Dram to Sram) |
| Queue 3 | D2P | (Dram to PCI) |
| Queue 4 | S2D | (Sram to Dram) |
| Queue 5 | S2P | (Sram to PCI) |
| Queue 6 | P2D | (PCI to Dram) |
| Queue 7 | P2S | (PCI to Sram) |

The commands are written by the cpu and read by the DMA sequencer. Each command is 32 bits and has the following format:

| | |
|---|---|
| Bits 31:24 | DMA Context |
| Bit 22 | Dummy DMA (force event) |
| Bit 21 | DMA chain (do not set event) |
| Bits 20:16 | DMA Termination Queue Id |
| Bits 15:0 | Sram Address of DMA descriptor block |

FIG. 49

| bit | name | description |
| --- | --- | --- |
| 127:96 | PciAddrH | Bits [63:32] of the Pci address. |
| 95:64 | PciAddrL | Bits [31:00] of the Pci address. |
| 59:32 | MemAddr | Bits [27:00] of the ExtMem address or bits [15:00] of the Sram address. |
| 31:24 | reserved | Reserved bits for software - these bits are preserved through the DMA |
| 23 | PciEndian | When set, selects big endian mode for Pci transfers. |
| 22 | WideDbl | When set, disables Pci 64-bit mode |
| 21 | PciCacheInh | When set, disable Pci Master logic use of PciReadMultiple & PciReadLine |
| 20:16 | unused | Reserved for future use. |
| 15:00 | XfrSz | Bits [15:00] of the requested dma size expressed in bytes. |

FIG. 50

| bit | name | description |
| --- | --- | --- |
| 123:96 | MemAddr | Bits [27:00] of the ExtMem address or bits [15:00] of the Sram address. |
| 95:64 | PciAddrH | Bits [63:32] of the Pci address. |
| 63:32 | PciAddrL | Bits [31:00] of the Pci address. |
| 31:24 | reserved | Reserved bits for software - these bits are preserved through the DMA |
| 23 | PciEndian | When set, selects big endian mode for Pci transfers. |
| 22 | WideDbl | When set, disables Pci 64-bit mode |
| 21 | PciCacheInh | When set, disable Pci Master logic use of PciWrite&Invalidate |
| 20:16 | unused | Reserved for future use. |
| 15:00 | XfrSz | Bits [15:00] of the requested dma size expressed in bytes. |

FIG. 51

| bit | name | description |
| --- | --- | --- |
| 127:92 | unused | Reserved for future use. |
| 91:64 | SrcAddr | Bits [27:00] of the ExtMem address or bits [15:00] of the Sram address. |
| 63:60 | unused | |
| 59:32 | DstAddr | Bits [27:00] of the ExtMem address or bits [15:00] of the Sram address. |
| 31:24 | reserved | Reserved bits for software - these bits are preserved through the DMA |
| 23:16 | unused | Reserved for future use. |
| 15:00 | XfrSz | Bits [15:00] of the requested dma size expressed in bytes. |

FIG. 52

| bit | name | description |
|---|---|---|
| 127:64 | unused | Reserved for future use. |
| 63:32 | ChkSum | Represents the 1's compliment sum of all halfwords transferred during a P2d or D2d operation only. |
| 31:24 | reserved | Reserved bits for software - these bits are preserved through the DMA |
| 23:22 | unused | Always return 0 |
| 20 | DramError | An uncorrectable Dram error occurred during the dma |
| 19 | PciParityErr64 | Set when reading from PCI and a parity error is detected on the PCI64 extension lines (AD[63:32], CBE[7:4], PAR64). |
| 18 | PciParityErr | Set when reading from Pci and a parity error is detected on the PCI bus (AD[31:0], CBE[3:0], PAR) or when writing to PCI and the target signals that it has detected a parity error (PERR). |
| 17 | PciTgtAbort | Set when the target signals target abort. |
| 16 | PciMstrAbort or D2dRMWErr | Pci Master abort is set when no DEVSEL is asserted on a PCI xfer or D2d ReadModifyWrite error when there is an uncorrectable Dram error at the destination address<br><br>There is a special case when a PCI DMA is initiated and Mojave has not been enabled as a PCI Master (PCI Configuration space, Command Register bit 2). In this case all 4 bitsPci Status Bits, 19 thru 16, are set and the DMA terminated. |
| 15:00 | XfrSz | Bits [15:00] of the residual dma size expressed in bytes. Note that due to prefetching this value may be zero even if the dma was unsuccessful due to one of the status bits above, but if the dma operation was successful, this value will be zero. |

FIG. 53

TCP/IP OFFLOAD DEVICE

CROSS-REFERENCE TO RELATED APPLICATIONS

This application claims the benefit under 35 U.S.C. § 119(e) of Provisional Application Ser. No. 60/374,788, filed Apr. 22, 2002. The complete disclosure of Provisional Application Ser. No. 60/374,788 is incorporated herein by reference.

CROSS-REFERENCE TO COMPACT DISC APPENDIX

Compact Disc Appendix, which is a part of the present disclosure, includes a recordable Compact Disc (CD-R) containing information that is part of the disclosure of the present patent document. A portion of the disclosure of this patent document contains material that is subject to copyright protection. All the material on the Compact Disc is hereby expressly incorporated by reference into the present application. The copyright owner of that material has no objection to the facsimile reproduction by anyone of the patent document or the patent disclosure, as it appears in the Patent and Trademark Office patent files or records, but otherwise reserves all copyright rights.

BRIEF DESCRIPTION OF THE DRAWINGS

The present invention is illustrated by way of example and not limitation in the figures of the accompanying drawings, in which:

FIG. 11 is a table of datapath bandwidth in accordance with the embodiment of FIG. 10.

FIG. 12 is a table of CPU bandwidth in accordance with the embodiment of FIG. 10.

FIG. 13 is a table of pin assignments in accordance with the embodiment of FIG. 10.

FIG. 15 is a table of instruction types in accordance with the processor of FIG. 14.

FIG. 16 is a table of sequencer behavior in accordance with the processor of FIG. 14.

FIG. 17 is a table of ALU operations in accordance with the processor of FIG. 14.

FIG. 18 is a table of ALU operands in accordance with the processor of FIG. 14.

FIG. 19 is a table of selected tests in accordance with the processor of FIG. 14.

FIG. 20 is a table of flag operations in accordance with the processor of FIG. 14.

FIG. 38 is a table of vlan priorities in accordance with the frame receive sequencer of FIG. 37.

FIG. 39 is a table of a receive buffer format in accordance with the embodiment of FIG. 10.

FIG. 40 is a table of a receive buffer descriptor in accordance with the embodiment of FIG. 10.

FIG. 41 is a table of a receive vector in accordance with the embodiment of FIG. 10.

FIG. 43 is a diagram of a transmit descriptor in accordance with the embodiment of FIG. 10.

FIG. 44 is a diagram of a merge descriptor in accordance with the embodiment of FIG. 10.

FIG. 45 is a table of a transmit buffer format in accordance with the embodiment of FIG. 10.

FIG. 46 is a table of a transmit vector in accordance with the embodiment of FIG. 10.

FIG. 48 is a table of dedicated queues in accordance with the queue manager of FIG. 47.

FIG. 49 is a table of queue identifications in accordance with the queue manager of FIG. 47.

FIG. 50 is a table of a PCI to DRAM or PCI to SRAM descriptor format in accordance with the embodiment of FIG. 10.

FIG. 51 is a table of a DRAM to PCI or SRAM to PCI descriptor format in accordance with the embodiment of FIG. 10.

FIG. 52 is a table of a SRAM to DRAM, DRAM to DRAM, or DRAM to SRAM descriptor format in accordance with the embodiment of FIG. 10.

FIG. 53 is a table of an ending status format of a DMA in accordance with the embodiment of FIG. 10.

DETAILED DESCRIPTION

Figure 1:
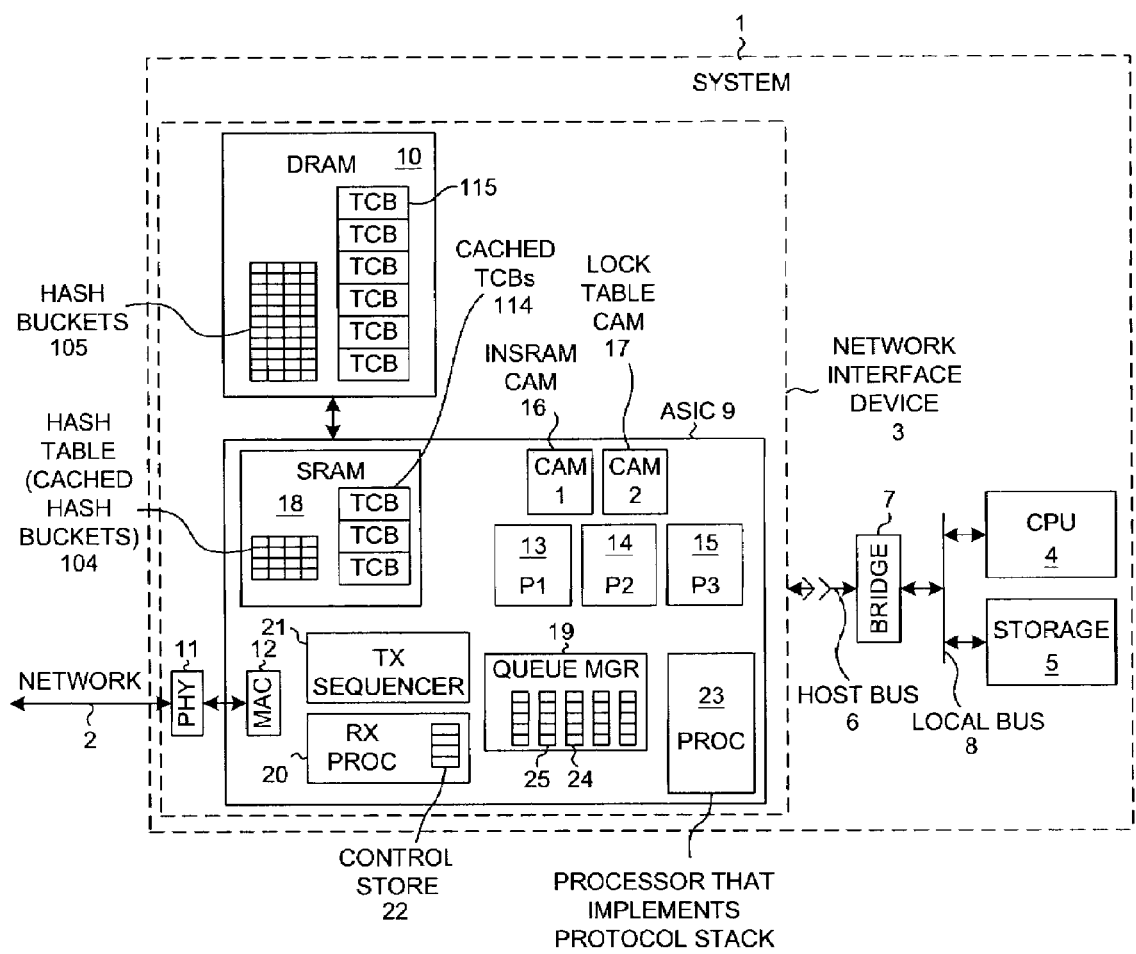
FIG. 1 is a diagram of a system 1 in accordance with one embodiment of the present invention.

FIG. 1 is a simplified diagram of a system 1 in accordance with a first embodiment. System 1 is coupled to a packet-switched network 2. Network 2 can, for example, be a local area network (LAN) and/or a collection of networks. Network 2 can, for example, be the Internet. Network 2 can, for example, be an IP-based SAN that runs iSCSI. Network 2 may, for example, be coupled to system 1 via media that communicates electrical signals, via fiber optic cables, and/or via a wireless communication channel. System 1 includes a network interface device (NID) 3 as well as a central processing unit (CPU) 4. CPU 4 executes software stored in storage 5. NID 3 is coupled to CPU 4 and storage 5 via host bus 6, a bridge 7, and local bus 8. Host bus 6 may, for example, be a PCI bus or another computer expansion bus.

In the illustrated particular embodiment, NID 3 includes an application specific integrated circuit (ASIC) 9, an amount of dynamic random access memory (DRAM) 10, and Physical Layer Interface (PHY) circuitry 11. NID 3 includes specialized protocol accelerating hardware for implementing "fast-path" processing whereby certain types of network communications are accelerated in comparison to "slow-path" processing whereby the remaining types of network communications are handled at least in part by a software protocol processing stack. In one embodiment, the certain types of network communications accelerated are TCP/IP communications. The embodiment of NID 3 illustrated in FIG. 1 is therefore sometimes called a TCP/IP Offload Engine (TOE).

For additional information on examples of a network interface device (sometimes called an Intelligent Network Interface Card or "INIC"), see: U.S. Pat. No. 6,247,060; U.S. Pat. No. 6,226,680; Published U.S. Patent Application No. 20010021949; Published U.S. Patent Application No. 20010027496; and Published U.S. Patent Application No. 20010047433 (the contents of each of the above-identified patents and published patent applications is incorporated herein by reference). System 1 of FIG. 1 employs techniques set forth in these documents for transferring control of TCP/IP connections between a protocol processing stack and a network interface device.

NID 3 includes Media Access Control circuitry 12, three processors 13-15, a pair of Content Addressable Memories (CAMs) 16 and 17, an amount of Static Random Access Memory (SRAM) 18, queue manager circuitry 19, a receive processor 20, and a transmit sequencer 21. Receive processor 20 executes code stored its own control store 22.

In some embodiments where NID 3 fully offloads or substantially fully offloads CPU 4 of the task of performing TCP/IP protocol processing, NID 3 includes a processor 23. Processor 23 may, for example, be a general purpose microprocessor. Processor 23 performs slow-path processing such as TCP error condition handling and exception condition handling. In some embodiments, processor 23 also performs higher layer protocol processing such as, for example, iSCSI layer protocol processing such that NID 3 offloads CPU 4 of all iSCSI protocol processing tasks. In the example of FIG. 1, CPU 4 executes code that implements a file system, and processor 23 executes code that implements a protocol processing stack that includes an iSCSI protocol processing layer.

Overview of One Embodiment of a Fast-Path Receive Path:

Operation of NID 3 is now described in connection with the receipt onto NID 3 of a TCP/IP packet from network 2. DRAM 10 is initially partitioned to include a plurality of buffers. Receive processor 20 uses the buffers in DRAM 10 to store incoming network packet data as well as status information for the packet. For each buffer, a 32-bit buffer descriptor is created. Each 32-bit buffer descriptor indicates the size of the associated buffer and the location in DRAM of the associated buffer. The location is indicated by a 19-bit pointer.

At start time, the buffer descriptors for the fee buffers are pushed onto on a "free-buffer queue" 24. This is accomplished by writing the buffer descriptors to queue manager 19. Queue manager 19 maintains multiple queues including the "free-buffer queue" 24. In this implementation, the heads and tails of the various queues are located in SRAM 18, whereas the middle portion of the queues are located in DRAM 10.

The TCP/IP packet is received from the network 2 via Physical Layer Interface (PHY) circuitry 11 and MAC circuitry 12. As the MAC circuitry 12 processes the packet, the MAC circuitry 12 verifies checksums in the packet and generates "status" information. After all the packet data has been received, the MAC circuitry 12 generates "final packet status" (MAC packet status). The status information (also called "protocol analyzer status") and the MAC packet status information is then transferred to a free one of the DRAM buffers obtained from the free-buffer queue 24. The status information and MAC packet status information is stored prepended to the associated data in the buffer.

After all packet data has been transferred to the free DRAM buffer, receive processor 20 pushes a "receive packet descriptor" (also called a "summary") onto a "receive packet descriptor" queue 25. The "receive packet descriptor" includes a 14-bit hash value, the buffer descriptor, a buffer load-count, the MAC ID, and a status bit (also called an "attention bit"). The 14-bit hash value was previously generated by the receive processor 20 (from the TCP and IP source and destination addresses) as the packet was received. If the "attention bit" of the receive packet descriptor is a one, then the packet is not a "fast-path candidate"; whereas if the attention bit is a zero, then the packet is a "fast-path candidate". In the present example of a TCP/IP offload engine, the attention bit being a zero indicates that the packet employs both the TCP protocol and the IP protocol.

Once the "receive packet descriptor" (including the buffer descriptor that points to the DRAM buffer where the data is stored) has been placed in the "receive packet descriptor" queue 25 and the packet data has been placed in the associated DRAM buffer, one of the processors 13 and 14 can retrieve the "receive packet descriptor" from the "receive packet descriptor" queue 25 and examine the "attention bit".

If the attention bit is a digital one, then the processor determines that the packet is not a "fast-path candidate" and the packet is handled in "slow-path". In one embodiment where the packet is a TCP/IP packet, wherein the attention bit indicates the packet is not a "fast-path candidate", and where NID 3 performs full offload TCP/IP functions, general purpose processor 23 performs further protocol processing on the packet (headers and data). In another embodiment where there is no general purpose processor 23 and where NID 3 performs partial TCP/IP functions, the entire packet (headers and data) are transferred from the DRAM buffer and across host bus 6 such that CPU 4 performs further protocol processing on the packet.

If, on the other hand, the attention bit is a zero, then the processor determines that the packet is a "fast-path candidate". If the processor determines that the packet is a "fast-path candidate", then the processor uses the buffer descriptor from the "receive packet descriptor" to initiate a DMA transfer the first approximately 96 bytes of information from the pointed to buffer in DRAM 10 into a portion of SRAM 18 so that the processor can examine it. This first approximately 96 bytes contains the IP source address of the IP header, the IP destination address of the IP header, the TCP source address ("TCP source port") of the TCP header, and the TCP destination address ("TCP destination port") of the TCP header. The IP source address of the IP header, the IP destination address of the IP header, the TCP source address of the TCP header, and the TCP destination address of the TCP header together uniquely define a single "connection context" with which the packet is associated.

While this DMA transfer from DRAM to SRAM is occurring, the processor uses the 14-bit hash from the "receive packet descriptor" to identify the connection context of the packet and to determine whether the connection context is one of a plurality of connection contexts that are under the control of NID 3. The hash points to one hash bucket in a hash table 104 in SRAM 18. In the diagram of FIG. 1, each row of the hash table 104 is a hash bucket. Each hash bucket contains one or more hash table entries. If the hash identifies a hash bucket having more than-one hash table entry (as set forth below in further detail), then the processor attempts to match the IP source address, IP destination address, TCP source address (port), and TCP destination address (port) retrieved from DRAM with the same fields, i.e., the IP source address, IP destination address, TCP source port, and TCP destination port of each hash table entry. The hash table entries in the hash bucket are searched one by one in this manner until the processor finds a match. When the processor finds a matching hash table entry, a number stored in the hash table entry (called a "transmit control block number" or "TCB number") identifies a block of information (called a TCB) related to the connection context of the packet. There is one TCB maintained on NID 3 for each connection context under the control of NID 3.

If the connection context is determined not to be one of the contexts under the control of NID 3, then the "fast-path candidate" packet is determined not to be an actual "fast-path packet." In one embodiment where NID 3 includes general purpose processor 23 and where NID 3 performs full TCP/IP offload functions, processor 23 performs further TCP/IP protocol processing on the packet. In another embodiment where NID 3 performs partial TCP/IP offload functions, the entire packet (headers and data) is transferred across host bus 6 for further TCP/IP protocol processing by the sequential protocol processing stack of CPU 4.

If, on the other hand, the connection context is one of the connection contexts under control of NID 3, then software executed by the processor (13 or 14) checks for one of numerous exception conditions and determines whether the packet is a "fast-path packet" or is not a "fast-path packet". These exception conditions include: 1) IP fragmentation is detected; 2) an IP option is detected; 3) an unexpected TCP flag (urgent bit set, reset bit set, SYN bit set or FIN bit set) is detected; 4) the ACK field in the TCP header shrinks the TCP window; 5) the ACK field in the TCP header is a duplicate ACK and the ACK field exceeds the duplicate ACK count (the duplicate ACK count is a user settable value); and 6) the sequence number of the TCP header is out of order (packet is received out of sequence).

If the software executed by the processor (13 or 14) detects an exception condition, then the processor determines that the "fast-path candidate" is not a "fast-path packet." In such a case, the connection context for the packet is "flushed" (control of the connection context is passed back to the stack) so that the connection context is no longer present in the list of connection contexts under control of NID 3. If NID 3 is a full TCP/IP offload device including general purpose processor 23, then general purpose processor 23 performs further TCP/IP processing on the packet. In other embodiments where NID 3 performs partial TCP/IP offload functions and NID 3 includes no general purpose processor 23, the entire packet (headers and data) is transferred across host bus 6 to CPU 4 for further "slow-path" protocol processing.

If, on the other hand, the processor (13 or 14) finds no such exception condition, then the "fast-path candidate" packet is determined to be an actual "fast-path packet". The processor executes a software state machine such that the packet is processed in accordance with the IP and TCP protocols. The data portion of the packet is then DMA transferred to a destination identified by another device or processor. In the present example, the destination is located in storage 5 and the destination is identified by a file system controlled by CPU 4. CPU 4 does no or very little analysis of the TCP and IP headers on this "fast-path packet". All or substantially all analysis of the TCP and IP headers of the "fast-path packet" is done on NID 3.

Description of a TCB Lookup Method:

As set forth above, information for each connection context under the control of NID 3 is stored in a block called a "Transmit Control Block" (TCB). An incoming packet is analyzed to determine whether it is associated with a connection context that is under the control of NID 3. If the packet is associated with a connection context under the control of NID 3, then a TCB lookup method is employed to find the TCB for the connection context. This lookup method is described in further detail in connection with FIGS. 2 and 3.

NID 3 is a multi-receive processor network interface device. In NID 3, up to sixteen different incoming packets can be in process at the same time by two processors 13 and 14. (Processor 15 is a utility processor, but each of processors 13 and 14 can perform receive processing or transmit processing.) A processor executes a software state machine to process the packet. As the packet is processed, the state machine transitions from state to state. One of the processors, for example processor 13, can work on one of the packets being received until it reaches a stopping point. Processor 13 then stops work and stores the state of the software state machine. This stored state is called a "processor context". Then, at some later time, either the same processor 13 or the other processor 14 may resume processing on the packet. In the case where the other processor 14 resumes processing, processor 14 retrieves the prior state of the state machine from the previous "processor context", loads this state information into its software state machine, and then continues processing the packet through the state machine from that point. In this way, up to sixteen different flows can be processed by the two processors 13 and 14 working in concert.

In this example, the TCB lookup method starts after the TCP packet has been received, after the 14-bit hash and the attention bit has been generated, and after the hash and attention bit have been pushed in the form of a "receive packet descriptor" onto the "receive packet descriptor queue".

In a first step (step 200), one of processors 13 or 14 obtains an available "processor context". The processor pops (step 201) the "receive packet descriptor" queue 25 to obtain the "receive packet descriptor". The "receive packet descriptor" contains the previously-described 14-bit hash value 101 (see FIG. 2) and the previously-described attention bit. The processor checks the attention bit.

If the attention bit is set (step 202), then processing proceeds to slow-path processing. As set forth above, if NID 3 is a TCP/IP full-offload device and if the packet is a TCP/IP packet, then further TCP/IP processing is performed by general purpose processor 23. As set forth above, if NID 3 is a TCP/IP partial offload device, then the packet is sent across host bus 6 for further protocol processing by CPU 4.

If, on the other hand, the attention bit is not set (step 203), then the processor initiates a DMA transfer of the beginning part of the packet (including the header) from the identified buffer in DRAM 10 to SRAM 18. 14-bit hash value 101 (see FIG. 2) actually comprises a 12-bit hash value 102 and another two bits 103. The 12-bit hash value (bits [13:2]) identifies an associated one of 4096 possible 64-byte hash buckets. In this embodiment, up to 48 of these hash buckets can be cached in SRAM in a hash table 104, whereas any additional used hash buckets 105 are stored in DRAM 10. Accordingly, if the hash bucket identified by the 12-bit hash value is in DRAM 10, then the hash bucket is copied (or moved) from DRAM 10 to an available row in hash table 104. To facilitate this, there is a hash byte (SRAM_hashbt) provided in SRAM for each of the possible 4096 hash buckets. A six-bit pointer field in the hash byte indicates whether the associated hash bucket is located in SRAM or not. If the pointer field contains a number between 1 and 48, then the pointer indicates the row of hash table 104 where the hash bucket is found. If the pointer field contains the number zero, then the hash bucket is not in hash table 104 but rather is in DRAM. The processor uses the 12-bit hash value 102 to check the associated hash byte to see if the pointed to hash bucket is in the SRAM hash table 104 (step 204).

If the hash bucket is in the SRAM hash table 104 (step 205), then processing is suspended until the DMA transfer of the header from DRAM to SRAM is complete.

If, on the other hand, the hash bucket is not in the SRAM hash table 104 (step 206), then a queue (Q_FREEHASH-SLOTS) identifying free rows in hash table 104 is accessed (the queue is maintained by queue manager 19) and a free hash bucket row (sometimes called a "slot") is obtained. The processor then causes the hash bucket to be copied or moved from DRAM and into the free hash bucket row. Once the hash bucket is present in SRAM hash table 104, the processor updates the pointer field in the associated hash byte to indicate that the hash bucket is now in SRAM and is located at the row now containing the hash bucket.

Once the pointed to hash bucket is in SRAM hash table 104, the up to four possible hash bucket entries in the hash bucket are searched one by one (step 207) to identify if the TCP and IP fields of an entry match the TCP and IP fields of the packet header 106 (the TCP and IP fields from the packet header were obtained from the receive descriptor).

Figure 2:
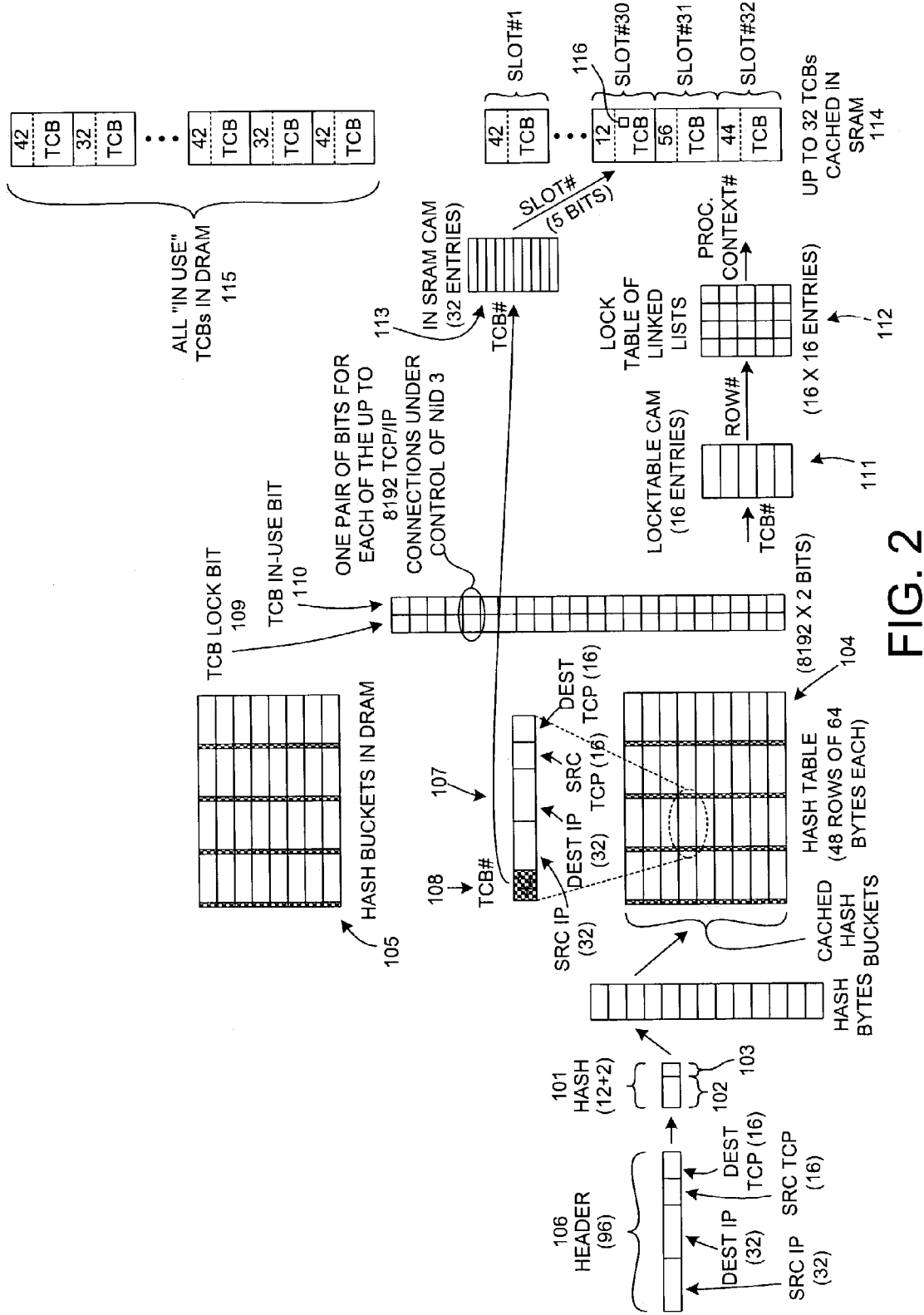
FIG. 2 is a simplified diagram of various structures and steps involved in the processing of an incoming packet in accordance with an embodiment of the present invention.
Figure 3A:
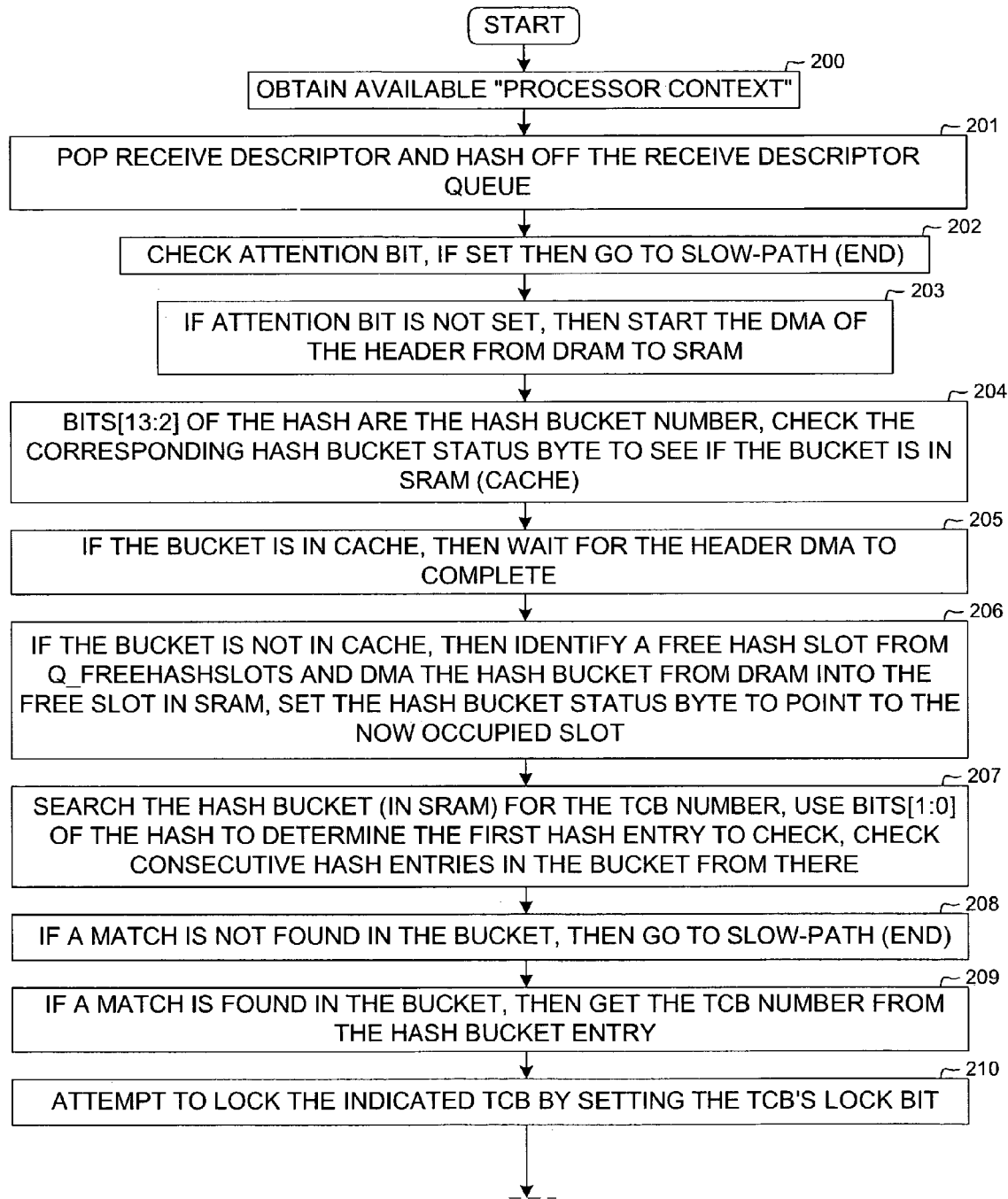
FIG. 3 is a flowchart of a method in accordance with an embodiment of the present invention.
Figure 3B:
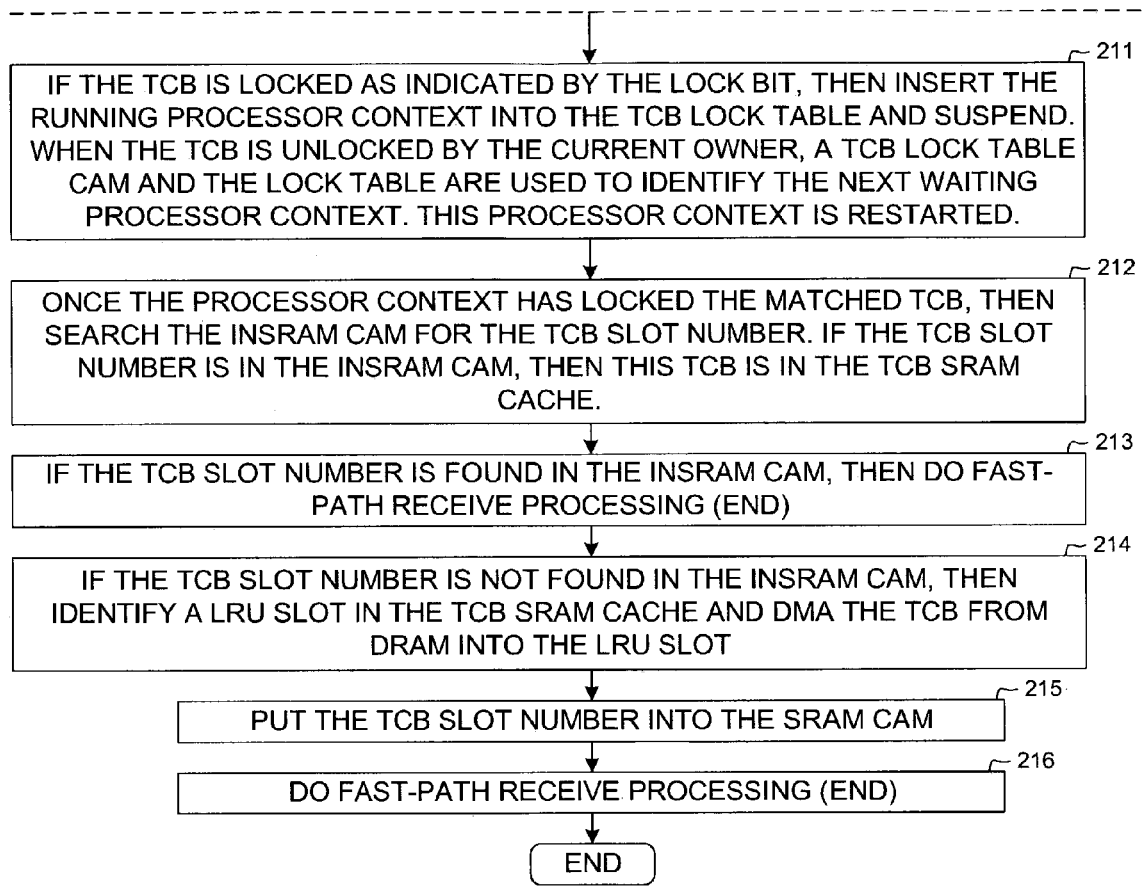
Figure 3:

In the example of FIG. 2, the pointed to hash bucket contains two hash entries. The hash entries are checked one by one. The two bits 103 Bits [1:0] of the 14-bit hash are used to determine which of the four possible hash table entry rows (i.e., slots) to check first. In FIG. 2, the second hash entry 107 (shown in exploded view) is representative of the other hash table entries. It includes a 16-bit TCB# 108, a 32-bit IP destination address, a 32-bit IP source address, a 16-bit TCP destination port, and a 16-bit TCP source port.

If all of the entries in the hash bucket are searched and a match is not found (step 208), then processing proceeds by the slow-path. If, on the other hand, a match is found (step 209), then the TCB# portion 108 of the matching entry identifies the TCB of the connection context.

NID 3 supports both fast-path receive processing as well as fast-path transmit processing. A TCP/IP connection can involve bidirectional communications in that packets might be transmitted out of NID 3 on the same TCP/IP connection that other packets flow into NID 3. A mechanism is provided so that the context for a connection can be "locked" by one processor (for example, a processor receiving a packet on the TCP/IP connection) so that the another processor (for example, a processor transmitting a packet on the same TCP/IP connection) will not interfere with the connection context. This mechanism includes two bits for each of the up to 8192 connections that can be controlled by NID 3: 1) a "TCB lock bit" (SRAM_tcblock), and 2) a "TCB in-use bit" (SRAM_tcbinuse). The "TCB lock bits" 109 and the "TCB in-use bits" 110 are maintained in SRAM 18.

The processor attempts to lock the designated TCB (step 210) by attempting to set the TCB's lock bit. If the lock bit indicates that the TCB is already locked, then the processor context number (a 4-bit number) is pushed onto a linked list of waiting processor contexts for that TCB. Because there are sixteen possible processor contexts, a lock table 112 is maintained in SRAM 18. There is one row in lock table 112 for each of the sixteen possible processor contexts. Each row has sixteen four-bit fields. Each field can contain the 4-bit processor context number for a waiting processor context. Each row of the lock table 112 is sixteen entries wide because all sixteen processor contexts may be working on or waiting for the same TCB.

If the lock bit indicates that the TCB is already locked (step 211), then the processor context number (a four-bit number because there can be up to sixteen processor contexts) is pushed onto the row of the lock table 112 associated with the TCB. A lock table content addressable memory (CAM) 111 is used to translate the TCB number (from TCB field 108) into the row number in lock table 112 where the linked list for that TCB number is found. Accordingly, lock table CAM 111 receives a sixteen-bit TCB number and outputs a four-bit row number. When the processor context that has the TCB locked is ready to suspend itself, it consults the lock table CAM 111 and the associated lock table 112 to determine if there is another processor context waiting for the TCB. If there is another processor context waiting (there is an entry in the associated row of lock table 112), then it restarts the first (oldest) of the waiting processor contexts in the linked list. The restarted processor context is then free to lock the TCB and continue processing.

If, on the other hand, the TCB is not already locked, then the processor context locks the TCB by setting the associated TCB lock bit 109. The processor context then supplies the TCB number (sixteen bits) to an IN SRAM CAM 113 (step 212) to determine if the TCB is in one of thirty-two TCB slots 114 in SRAM 18. (Up to thirty-two TCBs are cached in SRAM, whereas a copy of all "in-use" TCBs is kept in DRAM). The IN SRAM CAM 113 outputs a sixteen-bit value, five bits of which point to one of the thirty-two possible TCB slots 114 in SRAM 18. One of the bits is a "found" bit.

If the "found" bit indicates that the TCB is "found", then the five bits are a number from one to thirty-two that points to a TCB slot in SRAM 18 where the TCB is cached. The TCB has therefore been identified in SRAM 18, and fast-path receive processing continues (step 213).

If, on the other hand, the "found" bit indicates that the TCB is not found, then the TCB is not cached in SRAM 18. All TCBs 115 under control of NID 3 are, however, maintained in DRAM 10. The information in the appropriate TCB slot in DRAM 10 is then written over one of the thirty-two TCB slots 114 in SRAM 18. In the event that one of the SRAM TCB slots is empty, then the TCB information from DRAM 10 is DMA transferred into that free SRAM slot. If there is no free SRAM TCB slot, then the least-recently-used TCB slot in SRAM 18 is overwritten.

Once the TCB is located in SRAM cache 114, the IN SRAM CAM 113 is updated to indicate that the TCB is now located in SRAM at a particular slot. The slot number is therefore written into the IN SRAM CAM 113. Fast-path receive processing then continues (step 216).

When a processor context releases control of a TCB, it is not always necessary for the TCB information in SRAM 18 to be written to DRAM to update the version of the TCB in DRAM. If, for example, the TCB is a commonly used TCB and the TCB will be used again in the near future by the next processor context, then the next processor context can use the updated TCB in SRAM without the updated TCB having to have been written to DRAM and then having to be transferred back from DRAM to SRAM. Avoiding this unnecessary transferring of the TCB is advantageous. In accordance with one embodiment of the present invention, the processor context releasing control of a TCB does not update the DRAM version of the TCB, but rather the processor context assuming control of the TCB has that potential responsibility. A "dirty bit" 116 is provided in each TCB. If the releasing processor context changed the contents of the TCB (i.e., the TCB is dirty), then the releasing processor context sets this "dirty bit" 116. If the next processor context needs to put another TCB into the SRAM TCB slot held by the dirty TCB, then the next processor first writes the dirty TCB information (i.e., updated TCB information) to overwrite the corresponding TCB information in DRAM (i.e., to update the DRAM version of the TCB). If, on the other hand, the next processor does not need to move a TCB into an SRAM slot held by a dirty TCB, then the next processor does not need to write the dirty TCB information to DRAM. If need be, the next processor can either just update a TCB whose dirty bit is not set, or the next processor can simply overwrite the TCB whose dirty bit is not set (for example, to move another TCB into the slot occupied by the TCB whose dirty bit is not set).

In one specific embodiment, the instruction set of processors 13-15 includes the instructions in Table 1 below.

TABLE 1

| OpdSel | Name | Description |
|---|---|---|
| 0b011000000 | CamAddrA | Write Only. CamAddr=AluOut[4:0]. This register is written to define which one of the entries of the multi-entry CAM A will be read from or written to. The entry is either read from CamContentsA register on a read, or the entry is written into the CamContentsA register on a write. CAM A is a thirty-two entry CAM when CAMs A and B are used together as a single CAM. If CAM A is used separately, then CAM A is an sixteen-entry CAM. |
| 0b011000001 | CamContentsA | Read/Write. When writing: Cam Valid[CamAddrA]=~AluOut[16]. CamContents [CamAddrA]= AluOut[15:0]. Accordingly, writing bit sixteen "invalidates" the CAM entry. The tilde symbol here indicates the logical NOT. When reading: Bit 16=~CamValid[CamAddrA]. Bits 15-0=Cam Contents[CamAddrA]. |
| 0b011000010 | CamMatchA | Read/Write. Writing a sixteen-bit value into this register causes CAM A to search its entries for a match with valid CAM A entries. A subsequent read of this register returns the result of the search as follows: Bit 5=contents not found. Bits 4-0=If the contents were found and the matched entry is valid, then bits 4-0 are the number of the CAM entry which matched. |
| 0b011000011 | CamConfigAB | Write Only. CamSplit=AluOut[0]. If CamSplit is set, then CAM A is split into two sixteen-entry CAMs: CAM A and CAM B. The following addresses (CamAddrB, CanConentsB and CamMatchB) are then available to use the second part of the CAM (CAM B). |
| 0b011000100 | CamAddrB | Write Only. See the description of CamAddrA above. |
| 0b011000101 | CamContentsB | Read/Write. See the description of CamContentsB above. |
| 0b011000110 | CamMatchB | Read/Write. These registers (CamAddrB, Cam ContentsB and CamMatchB) are identical in use to those for CAM A (see above), except that they are for the second half of the first CAM (CAM B). |
| 0b011001000 | CamAddrC | Write Only. This register for CAM C is identical in function to the corresponding register for CAM A. |
| 0b011001001 | CamContentsC | Read/Write. This register for CAM C is identical in function to the corresponding register for CAM A. |
| 0b011001010 | CamMatchC | Read/Write. This register for CAM C is identical in function to the corresponding register for CAM A. |
| 0b011001011 | CamConfigCD | Write Only. As in the case of CAM A above, CAM C can be split into two sixteen-entry CAMs: CAM C and CAM D. |
| 0b011001100 | CamAddrD | Write Only. This register for CAM D is identical in function to the corresponding register for CAM D. |
| 0b011001101 | CamContentsD | Read/Write. This register for CAM D is identical in function to the corresponding register for CAM D. |
| 0b011001110 | CamMatchD | Read/Write. This register for CAM D is identical in function to the corresponding register for CAM D. |

One embodiment of the code executed by processors 13-15 is written using functions. These functions are in turn made up of instructions including those instructions set forth in Table 1 above. The functions are set forth in the file SUBR.MAL of the CD Appendix (the files on the CD Appendix are incorporated by reference into the present patent document). These functions include:

1) The INSRAM_CAM_INSERT function: Executing this function causes the TCB number present in a register (register cr11) to be written into the IN SRAM CAM (CAM A of the processor). The particular CAM slot written to is identified by the lower sixteen bits of the value present in another register (register TbuffL 18).

2) The INSRAM_CAM_REMOVE function: Executing this function causes the CAM entry in the IN SRAM CAM slot identified by a register (register cr11) to be invalidated (i.e., removed). The entry is invalidated by setting bit 16 of a register (register CAM_CONTENTS_A).

3) The INSRAM_CAM SEARCH function: Executing this function causes a search of the IN SRAM CAM for the TCB number identified by the TCB number present in a register (register cr11). The result of the search is a five-bit slot number that is returned in five bits of another register (register TbuffL 18). The value returned in a sixth bit of the register TbuffL 18 indicates whether or not the TCB number was found in the INSRAM_CAM.

4) The LOCKBL_CAM_INSERT function: Executing this function causes the sixteen-bit TCB number present in a register (register cr11) to be written into the LOCK TABLE CAM (CAM C of the processor). The particular CAM slot written to is identified by the value present in a register (register cr10).

5) The LOCKBL_CAM_REMOVE function: Executing this function causes the CAM entry in the LOCK TABLE CAM slot identified by a register (register cr10) to be invalidated (i.e., removed). The entry is invalidated by setting bit of another register (register CAM_CONTENTS_C).

6) The LOCK_TABLE_SEARCH function: Executing this function causes a search of the LOCK TABLE CAM for the TCB number identified by the TCB number present in a register (register cr11). The result of the search is a four-bit number of a row in the lock table. The four-bit number is four bits of another register (register cr10). The value returned in a fifth bit of the register cr10 indicates whether or not the TCB number was found in the LOCK TABLE CAM.

Compact Disc Appendix:

The Compact Disc Appendix includes a folder "CD Appendix A", a folder "CD Appendix B", a folder "CD Appendix C", and a file "title page.txt". CD Appendix A includes a description of an integrated circuit (the same as ASIC 9 of FIG. 1 except that the integrated circuit of CD Appendix A does not include processor 23) of one embodiment of a TCP/IP offload network interface device (NID). CD Appendix B includes software that executes on a host computer CPU, where the host computer is coupled to a NID incorporating the integrated circuit set forth in CD Appendix A and wherein the host computer includes a CPU that executes a protocol stack. CD Appendix C includes a listing of the program executed by the receive processor of the integrated circuit set forth in Appendix A as well as a description of the instruction set executed by the receive processor.

The CD Appendix A includes the following: 1) a folder "Mojave verilog code" that contains a hardware description of an embodiment of the integrated circuit, and 2) a folder "Mojave microcode" that contains code that executes on the processors (for example, processors 13 and 14 of FIG. 1) of the integrated circuit. In the folder "Mojave microcode", the file "MAINLOOP.MAL" is commented to indicate instructions corresponding to various steps of the method of FIG. 3. In the folder "Mojave microcode", the file "SEQ.H" is a definition file for the "MAINLOOP.MAL" code. Page 9 sets forth steps in accordance with a twenty-step method in accordance with some embodiments of the present invention. Page 10 sets forth the structure of a TCB in accordance with some embodiments. Page 17 sets forth the structure of a hash byte (called a "TCB Hash Bucket Status Byte").

A description of the instruction set executed by processors 13-15 of FIG. 1 is set forth in the section of this document entitled "Mojave Hardware Specification."

The CD Appendix B includes the following: 1) a folder entitled "simba (device driver software for Mojave)" that contains device driver software executable on the host computer; 2) a folder entitled "atcp (free BSD stack and code added to it)" that contains a TCP/IP stack [the folder "atcp" contains: a) a TCP/IP stack derived from the "free BSD" TCP/IP stack (available from the University of California, Berkeley) so as to make it run on a Windows operating system, and b) code added to the free BSD stack between the session layer above and the device driver below that enables the BSD stack to carry out "fast-path" processing in conjunction with the NID]; and 3) a folder entitled "include (set of files shared by ATCP and device driver)" that contains a set of files that are used by the ATCP stack and are used by the device driver.

The CD Appendix C includes the following: 1) a file called "mojave_rcv_seq (instruction set description).mdl" that contains a description of the instruction set of the receive processor, and 2) a file called "mojave_rcv_seq (program executed by receive processor).mal" that contains a program executed by the receive processor.

System Configurations:

FIGS. 4-9 illustrate various system configurations involving a network interface device in accordance with the present invention. These configurations are but some system configurations. The present invention is not limited to these configurations, but rather these configurations are illustrated here only as examples of some of the many configurations that are taught in this patent document.

Figure 4:
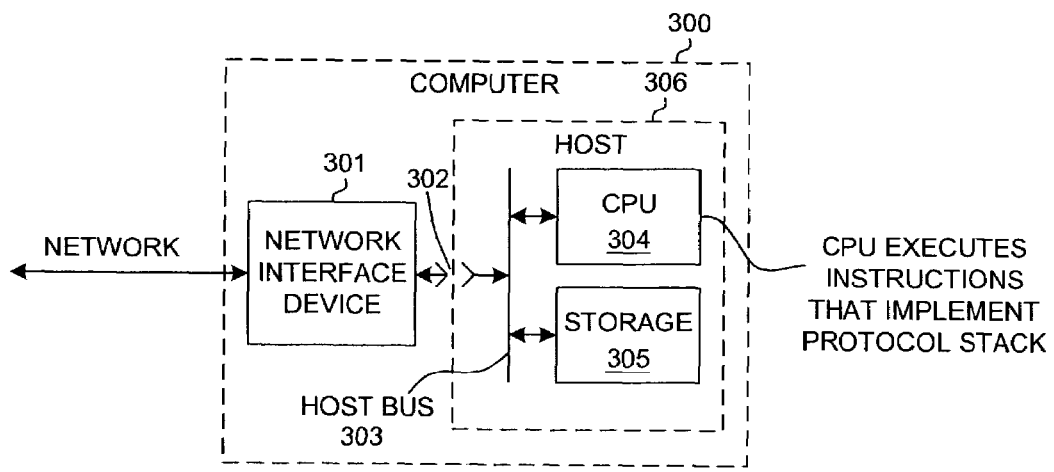
FIGS. 4, 5, 6, 7, 8 and 9 are diagrams that illustrate various system configurations involving a network interface device in accordance with the present invention.

FIG. 4 shows a computer 300 wherein a network interface device (NID) 301 is coupled via a connector 302 and a host bus 303 to a CPU 304 and storage 305. CPU 304 and storage 305 are together referred to as a "host" 306.

Figure 5:
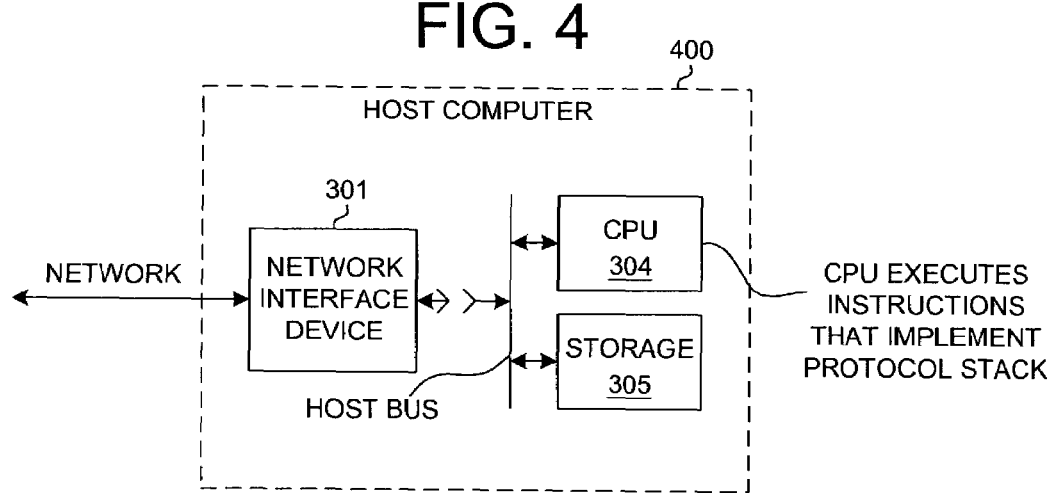

Rather than being considered coupled to a host, network interface device (NID) 301 can be considered part of a host as shown in FIG. 5. In FIG. 5, what is called a host computer 400 includes NID 301 as well as CPU 304 and storage 305. In both the examples of FIGS. 4 and 5, the CPU executes instructions that implement a sequential protocol processing stack. The network interface device 301 performs fast-path hardware accelerated protocol processing on some types of packets such that CPU 304 performs no or substantially no protocol processing on these types of packets. Control of a connection can be passed from the NID to the stack and from the stack to the NID.

Figure 6:
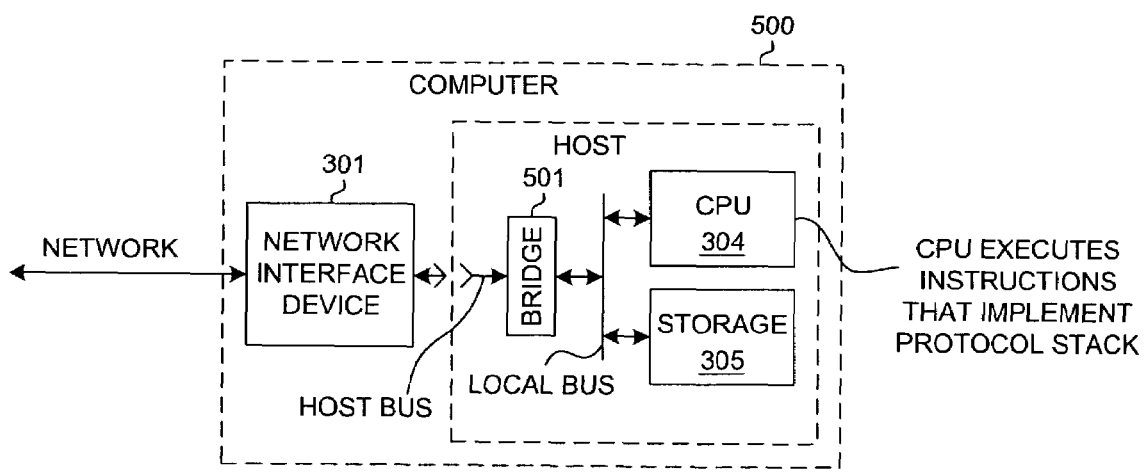

FIG. 6 shows a computer 500 wherein NID 301 is coupled to CPU 304 and storage 305 by a bridge 501.

Figure 7:
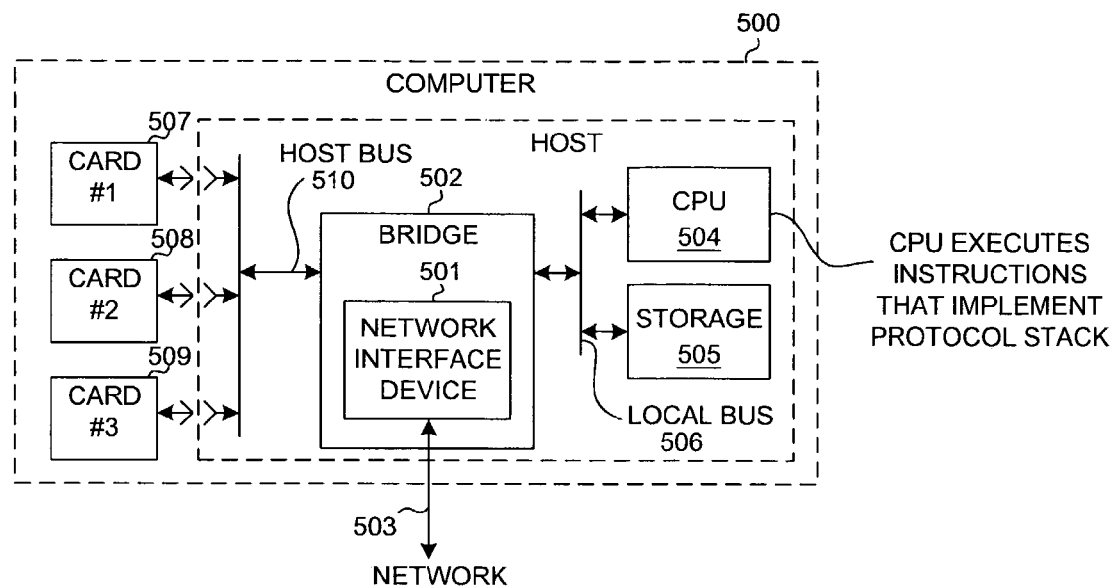

FIG. 7 shows a computer 500 wherein a network interface device (NID) 501 is integrated into a bridge integrated circuit 502. Bridge 502 couples computer 500 to a network 503. Bridge 502 is coupled to CPU 504 and storage 505 by local bus 506. CPU 504 executes instructions that implement a software sequential protocol processing stack. Bridge 502 is coupled to multiple expansion cards 507, 508 and 509 via a host bus 510. Network interface device 501 performs TCP and IP protocol processing on certain types of packets, thereby offloading CPU and its sequential protocol processing stack of these tasks. Control of a connection can be passed from the NID to the stack and from the stack to the NID.

In one version, NID 501 is a full TCP/IP offload device. In another version, NID is a partial TCP/IP offload device. The terms "partial TCP/IP" are used here to indicate that all or substantially all TCP and IP protocol processing on certain types of packets is performed by the offload device, whereas substantial TCP and IP protocol processing for other types of packets is performed by the stack.

Figure 8:
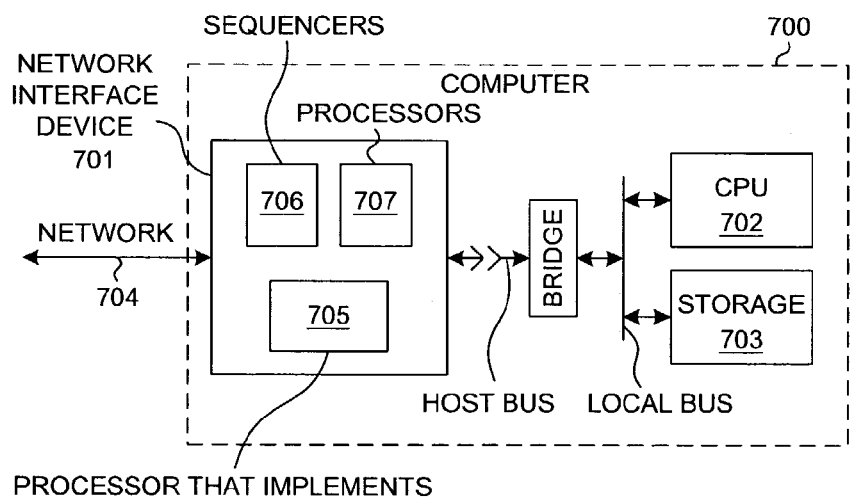

FIG. 8 shows a computer 700 wherein a network interface device (NID) 701 couples CPU 702 and storage 703 to network 704. NID 701 includes a processor that implements a sequential protocol processing stack 705, a plurality of sequencers 706 (such as, for example, a receive sequencer and a transmit sequencer), and a plurality of processors 707. This embodiment maybe a full-offload embodiment in that processor 705 fully offloads CPU 702 and its stack of all or substantially all TCP and IP protocol processing duties.

Figure 9:
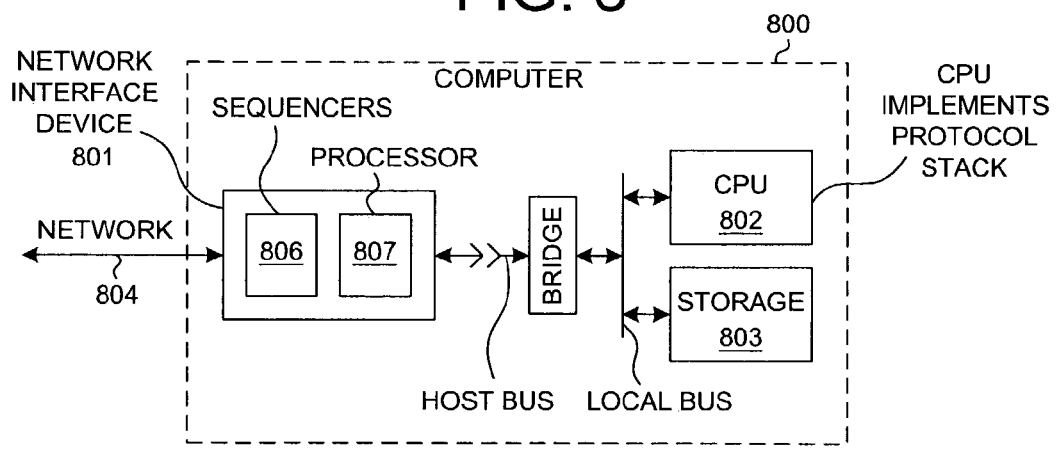

FIG. 9 shows a computer 800 wherein a network interface device (NID) 801 couples CPU 802 and storage 803 to network 804. NID 801 includes a plurality of sequencers 806 (for example, a receive sequencer and a transmit sequencer), and a plurality of processors 807. In this example, CPU 802 implements a software sequential protocol processing stack, and NID 801 does not include a general purpose processor that implements a sequential software protocol processing stack. This embodiment may be a partial-offload embodiment in that NID 801 performs all or substantially all TCP and IP protocol processing tasks on some types of packets, whereas CPU 802 and its stack perform TCP and IP protocol processing on other types of packets.

In the realization of different embodiments, the techniques, methods, and structures set forth in the documents listed below are applied to the system, and/or to the network interface device (NID), and/or to the application specific integrated circuit (ASIC) set forth in present patent document: U.S. Pat. No. 6,389,479; U.S. Pat. No. 6,470,415; U.S. Pat. No. 6,434,620; U.S. Pat. No. 6,247,060; U.S. Pat. No. 6,226,680; Published U.S. Patent Application 20020095519; Published U.S. Patent Application No. 20020091844; Published U.S. Patent Application No. 20010021949; Published U.S. Patent Application No. 20010047433; and U.S. patent application Ser. No. 09/801,488, entitled "Port Aggregation For Network Connections That Are Offloaded To Network Interface Devices", filed Mar. 7, 2001. The content of each of the above-identified patents, published patent applications, and patent application is incorporated herein by reference.

Although certain specific exemplary embodiments are described above in order to illustrate the invention, the invention is not limited to the specific embodiments. NID 3 can be part of a memory controller integrated circuit or an input/output (I/O) integrated circuit or a bridge integrated circuit of a microprocessor chip-set. In some embodiments, NID 3 is part of an I/O integrated circuit chip such as, for example, the Intel 82801 integrated circuit of the Intel 820 chip set. NID 3 may be integrated into the Broadcom ServerWorks Grand Champion HE chipset, the Intel 82815 Graphics and Memory Controller Hub, the Intel 440BX chipset, or the Apollo VT8501 MVP4 North Bridge chip. The instructions executed by receive processor 20 and/or processors 13-15 are, in some embodiments, downloaded upon power-up of NID 3 into a memory on NID 3, thereby facilitating the periodic updating of NID functionality. High and low priority transmit queues may be implemented using queue manager 19. Hardcoded transmit sequencer 21, in some embodiments, is replaced with a transmit processor that executes instructions. Processors 13, 14 and 15 can be identical processors, each of which can perform receive processing and/or transmit processing and/or utility functions. Accordingly, various modifications, adaptations, and combinations of various features of the described embodiments can be practiced without departing from the scope of the invention as set forth in the following claims that follow the "Mojave Hardware Specification" section below.

Mojave Hardware Specification

Features

1) Peripheral Component Interconnect (PCI) Interface.
a) Universal PCI interface supports both 5.0V and 3.3V signaling environments;
b) Supports both 32-bit and 64 bit PCI interface;
c) Supports PCI clock frequencies from 0 MHz to 66 MHz;
d) High performance bus mastering architecture;
e) Host memory based communications reduce register accesses;
f) Host memory based interrupt status word reduces register reads;
g) Plug and Play compatible;
h) PCI specification revision 2.2 compliant;
i) PCI bursts up to 4 K bytes;
j) Supports cache line operations up to 128 bytes;
k) Both big-endian and little-endian byte alignments supported; and
l) Supports Expansion ROM.

2) Network Interface.
a) One internal 802.3 and ethernet compliant Mac;
b) Gigabit Media Independent Interface (GMII) supports external PHYs;
c) Ten Bit Interface (TBI) supports external SERDES;
d) 10 BASE-T, 100 BASE-TX/FX and 1000 BASE-TX/FX supported;
e) Full and half-duplex modes supported at 10/100 speeds;
f) Automatic PHY status polling notifies system of status change;
g) Provides SNMP statistics counters;
h) Supports broadcast and multicast packets;
i) Provides promiscuous mode for network monitoring or multiple unicast address detection;
j) Supports "Huge Packets" up to 9018B; and
k) Supports auto-negotiating Phys.

3) Memory Interface.
a) External Dram buffering of transmit and receive packets;
b) ECC error correction and detection;
c) 64-bit data interface supports maximum throughput of 600 MB/s at 100 Mhz;
d) Supports external FLASH ROM up to 1 MB, for diskless boot applications; and
e) Supports external serial EEPROM for custom configuration and Mac addresses.

4) Protocol Processor.
a) High speed, custom, 32-bit processor executes 100 million instructions per second;
b) Processes IP, TCP, IPX and UDP protocols;
c) Supports up to 32K resident TCP/IP contexts; and
d) Writable control store (WCS) allows field updates and feature enhancements.

5) Power.
a) 1.8/3.3V chip operation; and
b) PCI controlled 5.0V/3.3V I/O cell operation.

6) Packaging.
a) 272-pin plastic ball grid array.

General Description

Figure 10:
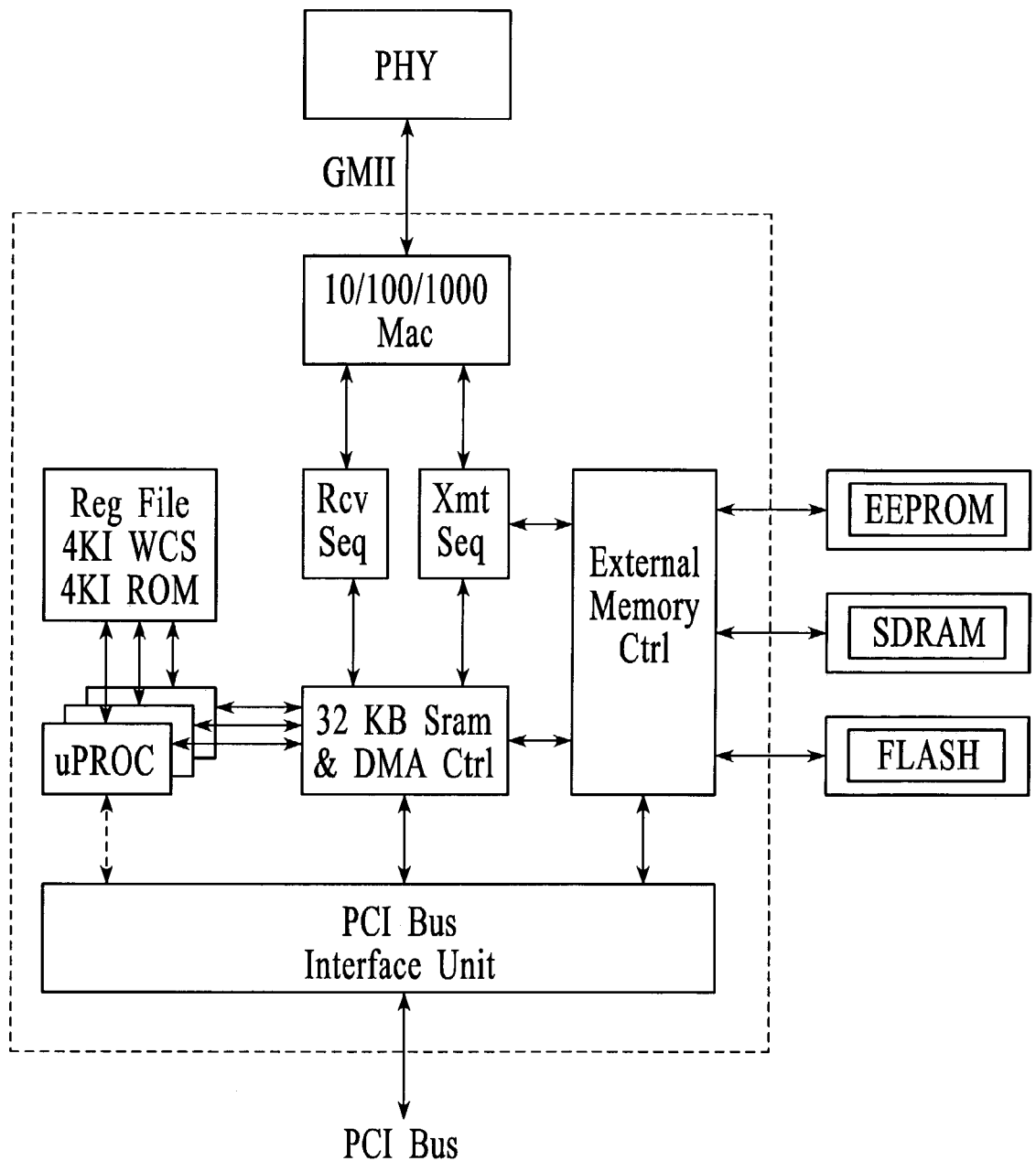
FIG. 10 is a diagram of a controller in accordance with one embodiment of the present invention.

Mojave (See FIG. 10) is a 32-bit, full-duplex, single channel, 10/100/1000-Megabit per second (Mbps), Session Layer Interface Controller (SLIC), designed to provide high-speed protocol processing for server and desktop applications. It combines the functions of a standard network interface controller and a protocol processor within a single chip.

When combined with the 802.3/GMII compliant Phy and Synchronous Dram (SDRAM), Mojave comprises one complete ethernet node. It contains one 802.3/ethernet compliant Mac, a PCI Bus Interface Unit (BIU), a memory controller, transmit fifo, receive fifo and a custom TCP/IP protocol processor. Mojave supports 10 Base-T, 100 Base-TX and 1000 Base-TX via the GMII interface attachment of appropriate Phys. Mojave also supports 100 Base-FX, and 1000 Base-FX via the TBI interface attachment of external Serdes.

The Mojave Mac provides statistical information that may be used for SNMP. The Mac can operate in promiscuous mode allowing Mojave to function as a network monitor, receive broadcast and multicast packets and implement multiple Mac addresses for each node.

Any 802.3/GMII/TBI compliant PHY/SERDES can be utilized, allowing Mojave to support 10 BASE-T, 10 BASE-T2, 100 BASE-TX, 100 Base-FX, 100 BASE-T4, 1000 BASE-TX or 1000 BASE-FX as well as future interface standards. PHY identification and initialization is accomplished through host driver initialization routines. PHY status registers can be polled continuously by Mojave to detect PHY status changes which are then reported to the host driver. The Mac can be configured to support a maximum frame size of 1518 bytes or 9018 bytes.

The 64-bit, multiplexed BIU provides a direct interface to the PCI bus for both slave and master functions. Mojave is capable of operating in either a 64-bit or 32-bit PCI environment, while supporting 64-bit addressing in either configuration. PCI bus frequencies up to 33 MHz are supported yielding instantaneous bus transfer rates of 266 MB/s. Both 5.0V and 3.3V signaling environments can be utilized by Mojave. Configurable cache-line size up to 256B will accommodate future architectures, and Expansion ROM/Flash support will allow for diskless system booting. Non-PC applications are supported via programmable big and little endian modes. Host based communication has been utilized to provide the best system performance possible.

Mojave supports Plug-N-Play auto-configuration through the PCI configuration space. Support of an external eeprom allows for local storage of configuration information such as Mac addresses.

External SDRAM provides frame buffering, which is configurable as 1 MB, 2 MB, 4 MB or 8 MB using the appropriate technology and width selections. Use of –10 speed grades yields an external buffer bandwidth of 88 MB/s. The buffer provides temporary storage of both incoming and outgoing frames. The protocol processor accesses the frames within the buffer in order to implement TCP/IP and NETBIOS. Incoming frames are processed, assembled then transferred to host memory under the control of the protocol processor. For transmit, data is moved from host memory to buffers where various headers are created before being transmitted out via the Mac.

1) Datapath Bandwidth (See FIG. 11).
2) Cpu Bandwidth (See FIG. 12).
3) Performance Features.
a) 896 registers improve performance through reduced scratch ram accesses and reduced instructions;
b) Register windowing eliminates context-switching overhead;
c) Separate instruction and data paths eliminate memory contention;
d) Totally resident control store eliminates stalling during instruction fetch;
e) Multiple logical processors reduce context switching and improve real-time response;
f) Pipelined architecture increases operating frequency;
g) Shared registers and scratch ram improve inter-processor communication;
h) Fly-by receive sequencer assists address compare and checksum calculation;
i) TCP/IP-context caching reduces latency;
j) Hardware-implemented queues reduce Cpu overhead and latency;
k) Horizontal microcode greatly improves instruction efficiency;
l) Automatic frame DMA and status between Mac and dram buffer; and
m) Deterministic architecture coupled with context switching eliminates processor stalls.

4) Pin Assignments (See FIG. 13).

Processor.

The processor (See FIG. 14) is a convenient means to provide a programmable state-machine capable of processing incoming frames and host commands, directing network traffic and directing PCI bus traffic. Three processors are implemented using shared hardware in a three-level pipelined architecture which launches and completes a single instruction for every clock cycle. The instructions are executed in three distinct phases corresponding to each of the pipeline stages where each phase is responsible for a different function.

The first instruction phase writes the instruction results of the last instruction to the destination operand, modifies the program counter (Pc), selects the address source for the instruction to fetch, then fetches the instruction from the control store. The fetched instruction is then stored in the instruction register at the end of the clock cycle.

The processor instructions reside in the on-chip control-store, which is implemented as a mixture of ROM and Sram. The ROM contains 4K instructions starting at address 0×0000 and aliases every 0×1000 locations throughout the first 0×8000 locations of instruction space. The Sram (WCS) will hold up to 0×1000 instructions starting at address 0×8000 and aliasing each 0×1000 locations throughout the last 0×8000 of instruction space. The ROM and Sram are both 49-bits wide accounting for bits [48:0] of the instruction microword. A separate mapping ram provides bits [55:49] of the microword (MapAddr) to allow replacement of faulty ROM based instructions. The mapping ram has a configuration of 512×7 which is insufficient to allow a separate ma address for each of the 4K ROM locations. To allow re-mapping of the entire 4K ROM space, the map ram address lines are connected to the address bits Fetch [9:3]. The result is that the ROM is re-mapped in blocks of 8 contiguous locations.

The second instruction phase decodes the instruction which was stored in the instruction register. It is at this point that the map address is checked for a non-zero value which will cause the decoder to force a Jmp instruction to the map address. If a non-zero value is detected then the decoder selects the source operands for the Alu operation based on the values of the OpdASel, OpdBSel and AluOp fields. These operands are then stored in the decode register at the end of the clock cycle. Operands may originate from File, Sram, or flip-flop based registers. The second instruction phase is also where the results of the previous instruction are written to the Sram.

The third instruction phase is when the actual Alu operation is performed, the test condition is selected and the Stack push and pop are implemented. Results of the Alu operation are stored in the results register at the end of the clock cycle.

Figure 14:
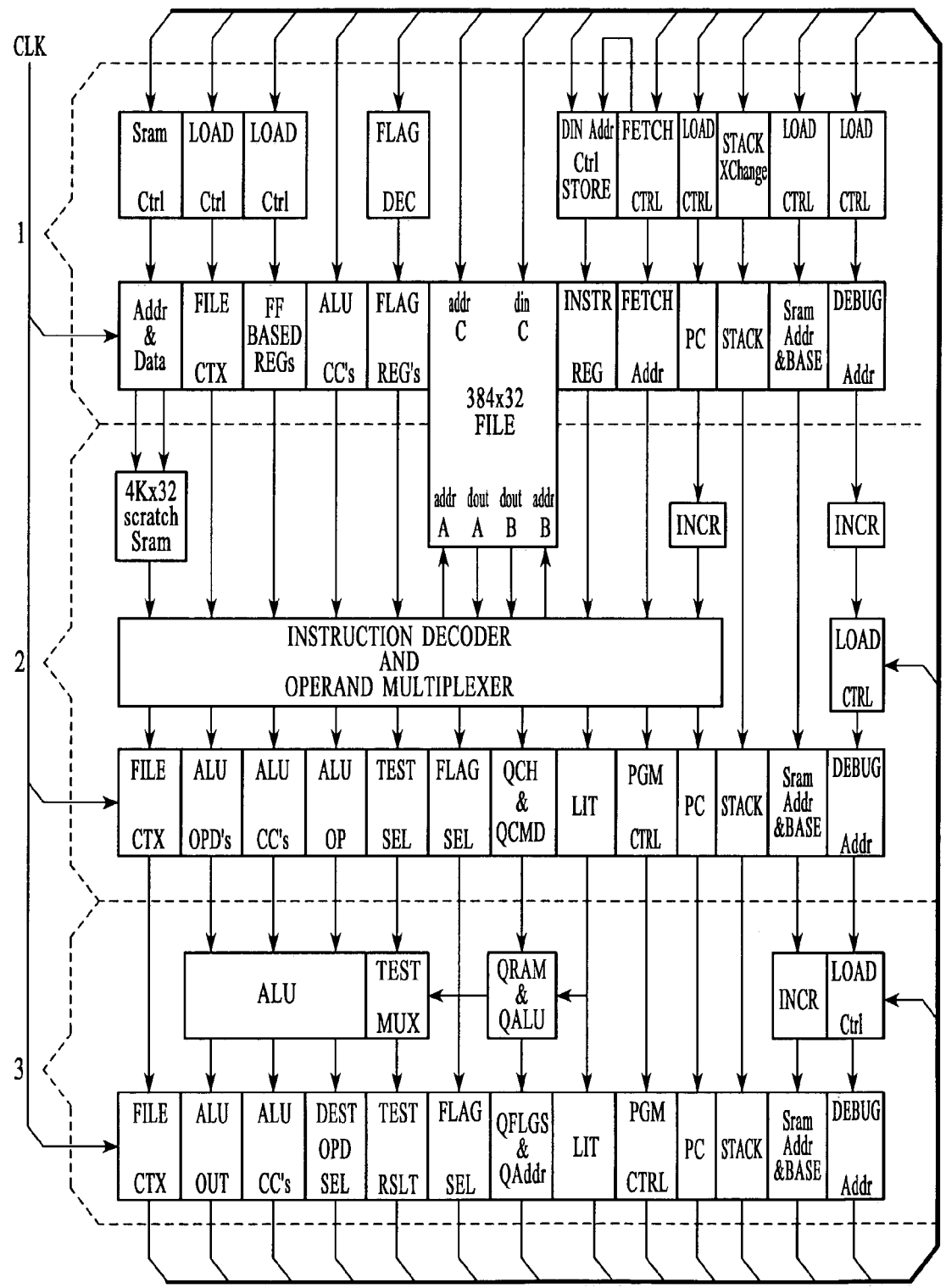
FIG. 14 is a diagram of a processor in accordance with the embodiment of FIG. 10.

FIG. 14 is a block diagram of the CPU. FIG. 14 shows the hardware functions associated with each of the instruction phases. Note that various functions have been distributed across the three phases of the instruction execution in order to minimize the combinatorial delays within any given phase.

Instruction Set.

The micro-instructions are divided into nine types according to the program control directive. The micro-instruction is further divided into sub-fields for which the definitions are dependant upon the instruction type. The six instruction types are listed IN FIG. 15.

All instructions (See FIG. 15) include the Alu operation (AluOp), operand "A" select (OpdASel), operand "B" select (OpdBSel) and Literal fields. Other field usage depends upon the instruction type.

The conditional jump (Jct/Jcf) instruction causes the program counter to be altered if the condition selected by the "test select" (TstSel) field is true/false. The new program counter (Pc) value is loaded from either the Literal field or the AluOut as described in the following section and the Literal field may be used as a source for the Alu or the ram address if the new Pc value is sourced by the Alu.

The "jump" (Jmp) instruction causes the program counter to be altered unconditionally. The new program counter (Pc) value is loaded from either the Literal field or the AluOut as described in the following section. The format allows instruction bits 22:16 to be used to perform a flag operation and the Literal field may be used as a source for the Alu or the ram address if the new Pc value is sourced by the Alu.

The "jump subroutine" (Jsr) instruction causes the program counter to be altered unconditionally. The new program counter (Pc) value is loaded from either the Literal field or the AluOut as described in the following section. The old program counter value is stored on the top location of the Pc-Stack which is implemented as a LIFO memory. The format allows instruction bits 22:16 to be used to perform a flag operation and the Literal field may be used as a source for the Alu or the ram address if the new Pc value is sourced by the Alu.

The "Cont" (Cont) instruction causes the program counter to increment. The format allows instruction bits 22:16 to be used to perform a flag operation and the Literal field may be used as a source for the Alu or the ram address.

The "return from subroutine" (Rts) instruction, or the conditional Rts (Rtt/Rtf) if the selected condition is true/false, causes the current Pc value to be replaced with the last value stored in the stack. The Literal field may be used as a source for the Alu or the ram address. The unconditional return (Rts) allows instruction bits 22:16 to be used to perform a flag operation.

The Map instruction is provided to allow replacement of instructions which have been stored in ROM and is implemented any time the "map enable" (MapEn) bit has been set and the content of the "map address" (MapAddr) field is non-zero. The instruction decoder forces a jump instruction with the Alu operation and destination fields set to pass the MapAddr field to the program control block.

FIGS. 16-20 show sequencer behavior, ALU operations, ALU operands, selected tests, and flag operations.

Program Errors:

Hardware will detect certain program errors. Any sequencer generating a program error will be forced to continue executing from location 0004. The program errors detected are:

1. Stack Overflow: A JSR is attempted and the stack registers are full.

2. Stack Underflow: An RTS is attempted and the stack registers are empty.

3. Incompatible Sram Size & Sram Alignment: An Sram Operation is attempted where the size and the Sram address would cause the operation to extend beyond the size of the word, e.g. Size=4 Address=401 or Size=2 Address=563.

4. An Sram read is attempted immediately following an Sram write. Because an Sram write is actually done in the clock cycle of the following instruction, the sram interface will be busy during that phase, and an Sram read is illegal at this time.

5. An attempt was made to access a non-existent register.

Sram Control Sequencer (SramCtrl).

Figure 21:
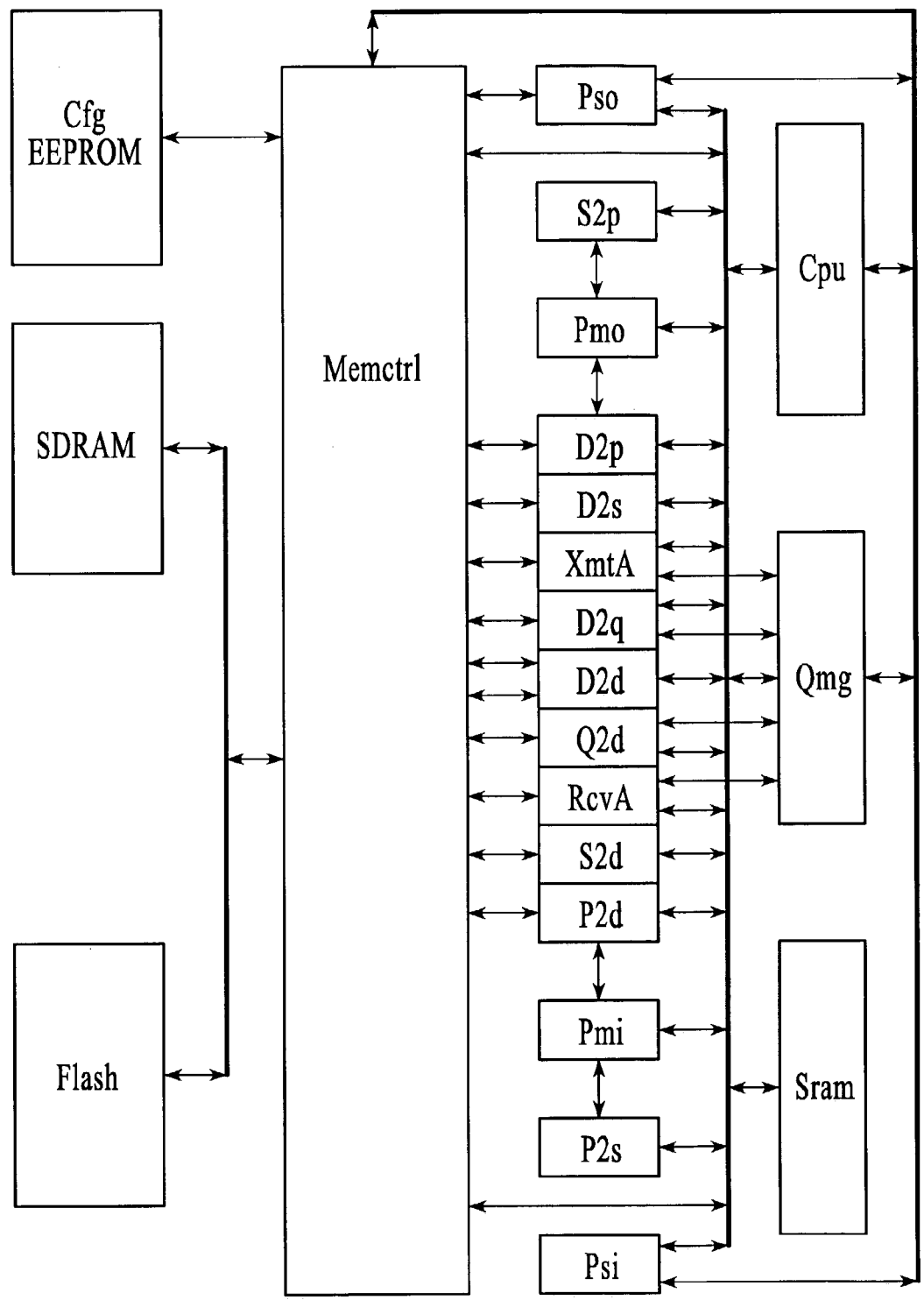
FIG. 21 is a diagram of data flow in accordance with the embodiment of FIG. 10.

Sram is the nexus for data movement within Mojave. A hierarchy of sequencers, working in concert, accomplish the movement of data between dram, Sram, Cpu, ethernet and the Pci bus. Slave sequencers, provided with stimulus from master sequencers, request data movement operations by way of the Sram, Pci bus and Dram. The slave sequencers prioritize, service and acknowledge the requests The data flow block diagram of FIG. 21 shows all of the master and slave sequencers of the Mojave product. Request information such as r/w, address, size, endian and alignment are represented by each request line. Acknowledge information to master sequencers include only the size of the transfer being acknowledged.

Figure 22:
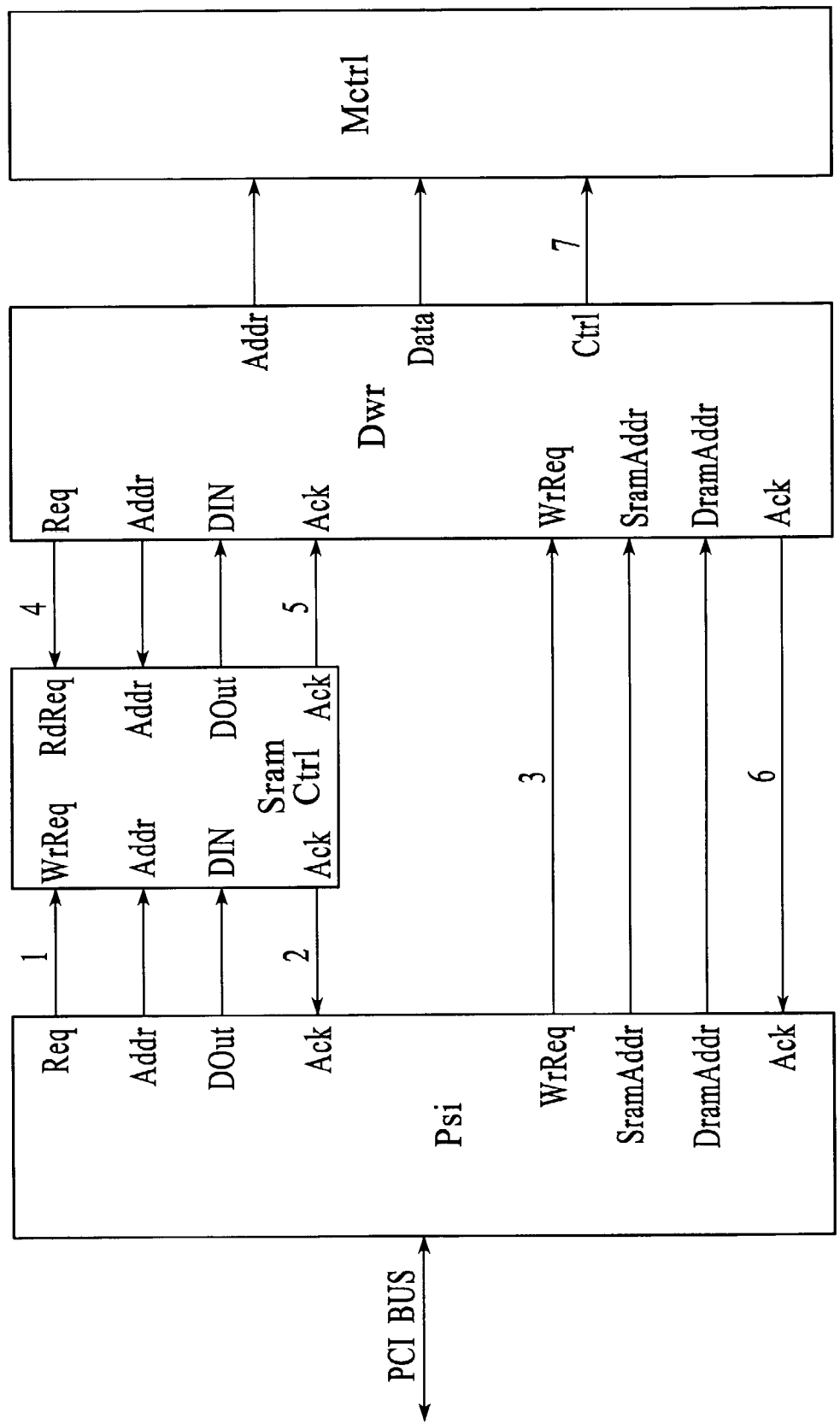
FIG. 22 is a diagram of data movement in accordance with the embodiment of FIG. 10.

The block diagram of FIG. 22 illustrates how data movement is accomplished for a Pci slave write to Dram. Psi sends a write request to the SramCtrl module. Psi requests Dwr to move data from Sram to dram. Dwr subsequently sends a read request to the SramCtrl module then writes the data to the dram via the Mctrl module. As each piece of data is moved from the Sram to Dwr, Dwr sends an acknowledge to the Psi module.

Sram Control Sequencer (SramCtrl).

The Sram control sequencer (See FIG. 23) services requests to store to, or retrieve data from an Sram organized as 2048 locations by 128 bits (32 KB). The sequencer operates at a frequency of 200 Mhz, allowing both a Cpu access and a dma access to occur during a standard 100 Mhz Cpu cycle. One 200 Mhz cycle is reserved for Cpu accesses during each 100 Mhz cycle while the remaining 200 Mhz cycle is reserved for dma accesses on a prioritized basis.

Figure 23:
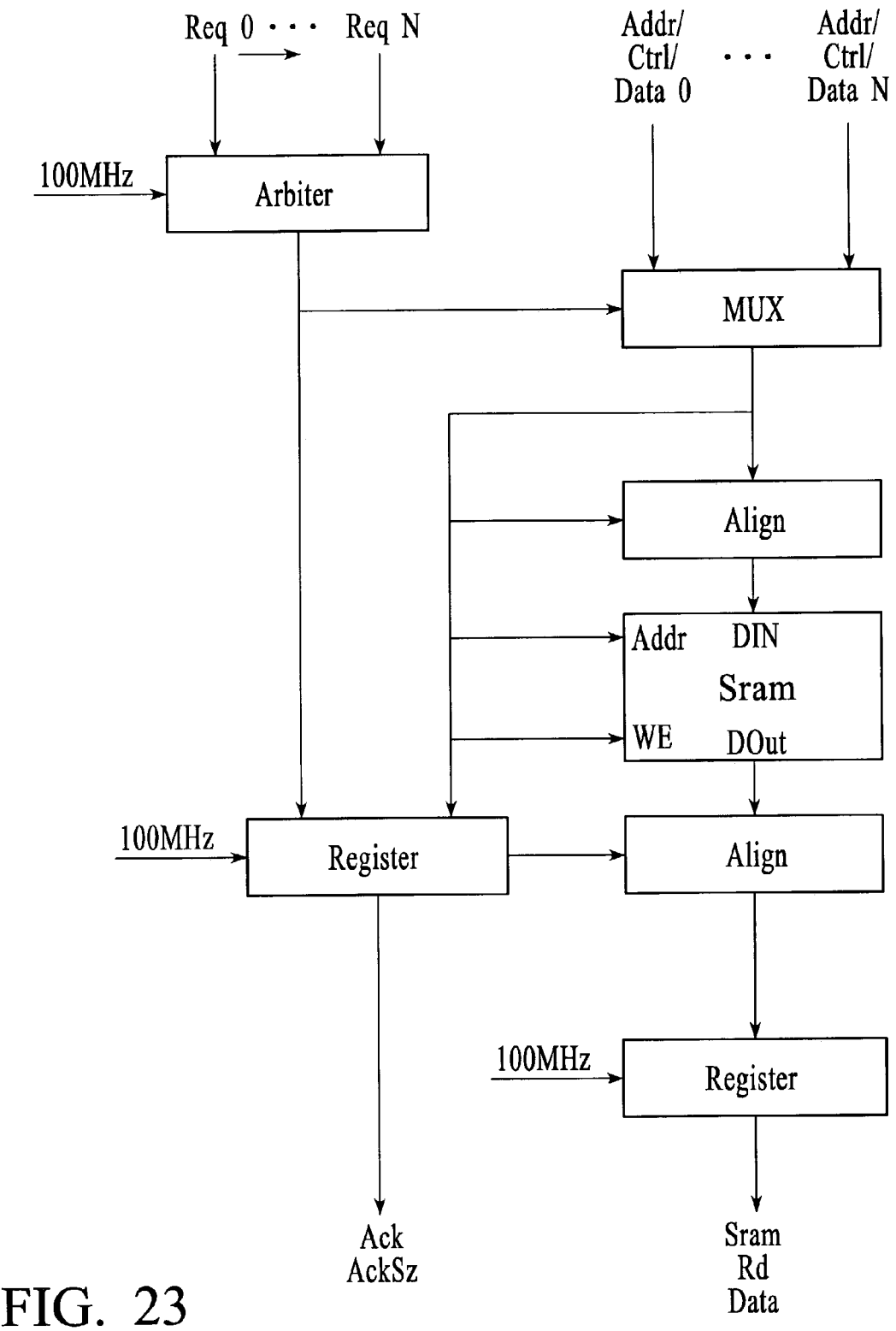
FIG. 23 is a diagram of a SRAM control sequencer in accordance with the embodiment of FIG. 10.

The block diagram of FIG. 23 shows the major functions of the Sram control sequencer. A slave sequencer begins by asserting a request along with r/w, ram address, data path alignment and request size. SramCtrl prioritizes the requests. The request parameters are then selected by a multiplexer which feeds the parameters to the Sram via alignment logic. The requestor provides the Sram address which when combined with the other parameters controls the input and output alignment. Sram outputs are fed to the output aligner. Requests are acknowledged in parallel with the returned data.

External Memory Control (memctrl).

Figure 24:
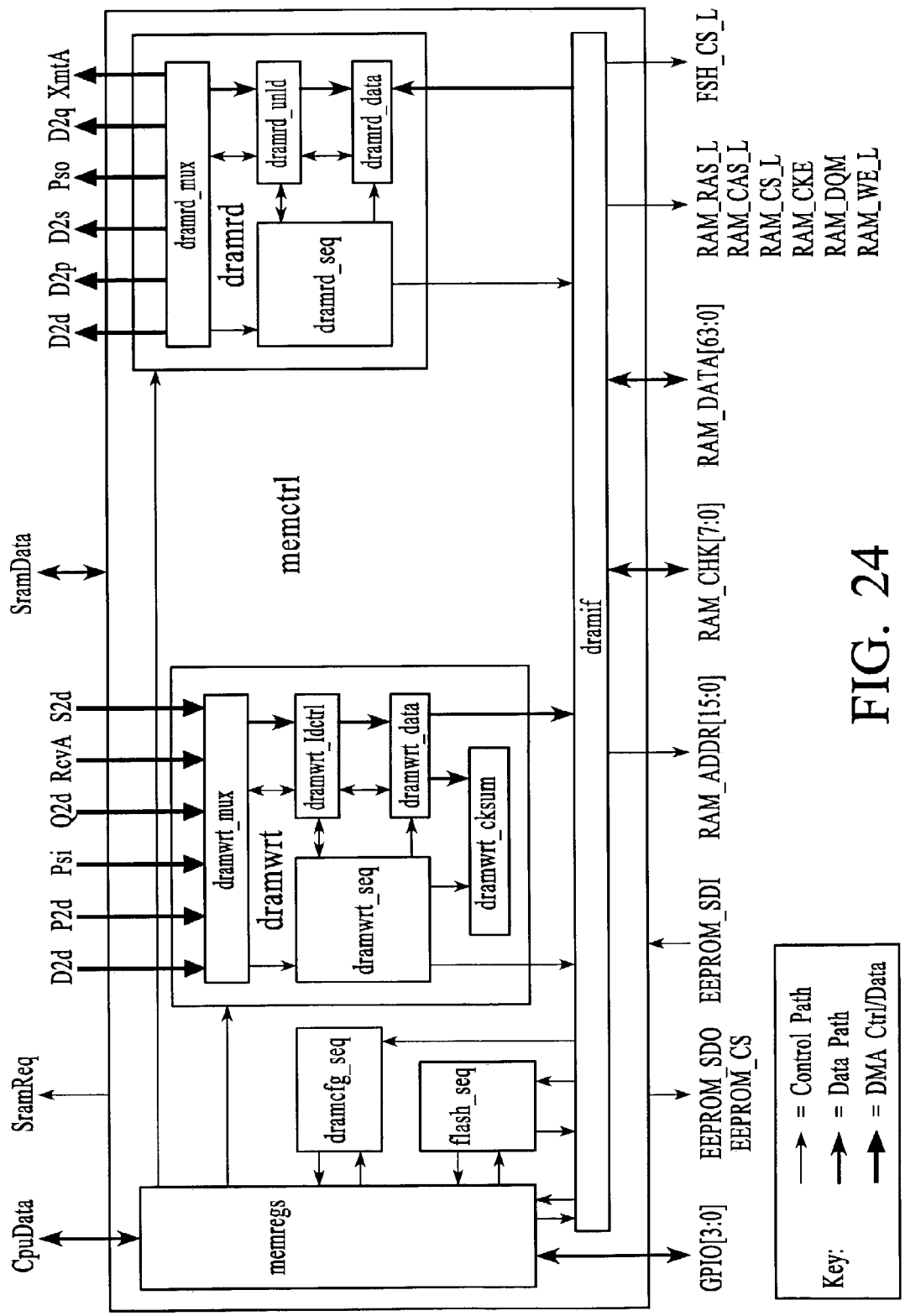
FIG. 24 is a diagram of a memory controller in accordance with the embodiment of FIG. 10.

Memctrl (See FIG. 24) implements the memory controller function and registers for access to SDRAM, Flash memory, and external configuration jumpers. It also implements the register interface for the serial EEPROM and GPIO access. Memctrl functional module summaries:

memregs: The memregs module provides the configuration and control registers for all the functions of memctrl. memregs also implements the GPIO interface registers for reading, writing and directional control, the FLASH control registers for configuring and accessing FLASH, and registers associated with configuring the SDPAM controller. memregs is accessed through the CPU data path with all of its registers mapped to a CPU register address.

dramcfg_seq: The dramcfg_seq module contains the refresh logic, timers, and sequencer for the various configuration accesses that are performed. This also includes operations which take place during initialization.

flash_seq: The flash_seq module performs the various FLASH memory access sequences. This module also implements the programmable nature of the access time delays between the control signals and data accesses.

dramif: The dramif module arbitrates between the memctrl modules requesting access to the memory interface. This includes the dramcfg_seq, flash_seq, memregs, dramwrt and dramrd modules. The dramif module also muxes the row and column address for the SDRAM accesses, muxs the read and write control signals between dramrd, dramwrt, etc., and also controls the direction of the data bus interface. dramif attempts to ping-pong between reads and writes to maximize the overlap between read and write buffers and for fairness. This fairness can be overriden if a requester asserts it's urgent request signal for high priority conditions like impending buffer overflow or underflow. When the flash_seq has access to the interface the checkbits become address and control signals and the FSH_CS_L signal is asserted.

dramwrt: The dramwrt module implements the data and control path for all masters requesting write access to SDRAM. The dramwrt submodule dramwrt_mux arbitrates across all six dma requesters giving the following priorities from highest to lowest: RcvA, Q2d, Psi, S2d, P2d and D2d. dramwrt_mux will then mux the selected requester's data and address. The dramwrt_ldctrl will buffer the granted requester's data and ack the appropriate requester while the dramwrt_seq will proceed to initiate an SDRAM write operation. After dramwrt_seq gains control of the SDRAM interface via dramif, the buffered data will be selected from dramwrt_data data buffers and written to memory. If ECC is enabled, the dramwrt_data block will also compute the checkbits as the data passes through. This block can also force ECC errors at any bit in any location. Also, as the data is being written, the dramwrt_cksum block will checksum the data and indicate to the DMA requester when the checksum is complete. P2d and D2d are the only two requesters which have checksums calculated for their transactions.

dramrd: The dramrd module implements the data and control path for all masters requesting read access from SDRAM. The dramrd submodule dramrd_mux arbitrates across all six dma requesters, giving the following priorities from highest to lowest: XmtA, Pso, D2s, D2q, D2p and D2d. dramrd_mux also implements a state machine to overlap multiple read operations. So when a requester's read operation is being satisfied from SDRAM, another operation can be in progress with respect to bank activation and addressing. Once the dramrd_mux starts a transaction the dramrd_seq intiates the request for the interface via dramif and starts the actual read sequence. Once data starts to come back from the SDRAM the dramrd_data block will check it for ECC errors, if ECC correction and detection is enabled. The data is then stored in a 64 byte read buffer. Once there is enough data to write to the sram, the dramrd_unld sequencer will select data from the read buffer and request access to sram. The acks coming back from these sram writes are directed by the dramrd_mux to the original DMA requestor. Once all the requested data is delivered to the requestor, this operation is then complete.

External Memory Read Operations (dramrd).

The dramrd controller (See FIG. 24) acts only as a slave sequencer to the rest of the Mojave chip. Servicing requests issued by master sequencers, the dramrd controller moves data from external SDRAM or flash to the Sram, via the dramif module, in blocks of 64 bytes or less. The nature of the SDRAM requires fixed burst sizes for each of it's internal banks with ras precharge intervals between each access. By selecting a burst size of 4 words for SDRAM bank reads and interleaving bank accesses on a 4 word boundary, we can ensure that the ras precharge interval for the first bank is satisfied before burst completion for the second bank, allowing us to re-instruct the first bank and continue with uninterrupted dram access. SDRAMs require a consistent burst size be utilized each and every time the SDRAM is accessed. For this reason, if an SDRAM access does not begin or end on a 16 word boundary, SDRAM bandwidth will be reduced due to less than 64 bytes of data being transferred to sram during the burst cycle.

The Memory Controller Block Diagram (See FIG. 24) depicts the major functional blocks of the dramrd controller. The first step is servicing a request to move data from SDRAM to Sram in the prioritization of the master sequencer requests. This is done by dramrd_mux. Next the dramrd_mux selects the DMA requester's dram read address and sram write address and applies configuration information to determine the correct bank, row and column address to apply. The dramrd_seq will control the operations of applying the row and column addresses and sequencing the appropriate control signals. While reading the data from the SDRAM interface the dramrd_data block will perform error detection and/or correction on the data if this feature is enabled. Once sufficient data has been read, the dramrd_unld sequencer issues a write request to the SramCtrl sequencer which in turn sends an acknowledge to the dramrd sequencer. The dramrd sequencer passes this acknowledge along to the level two master with a size code indicating how much data was written during the Sram cycle allowing the update of pointers and counters. The dram read and Sram write cycles repeat until the original burst request has been completed at which point the dramrd sequencer prioritizes any remaining requests in preparation for the next burst cycle.

Contiguous dram burst cycles are not guaranteed to the dramrd controller as an algorithm is implemented in the dramif which ensures highest priority to refresh cycles followed by ping-pong access between dram writes and dram reads and then confiuration and flash cycles.

Figure 25:
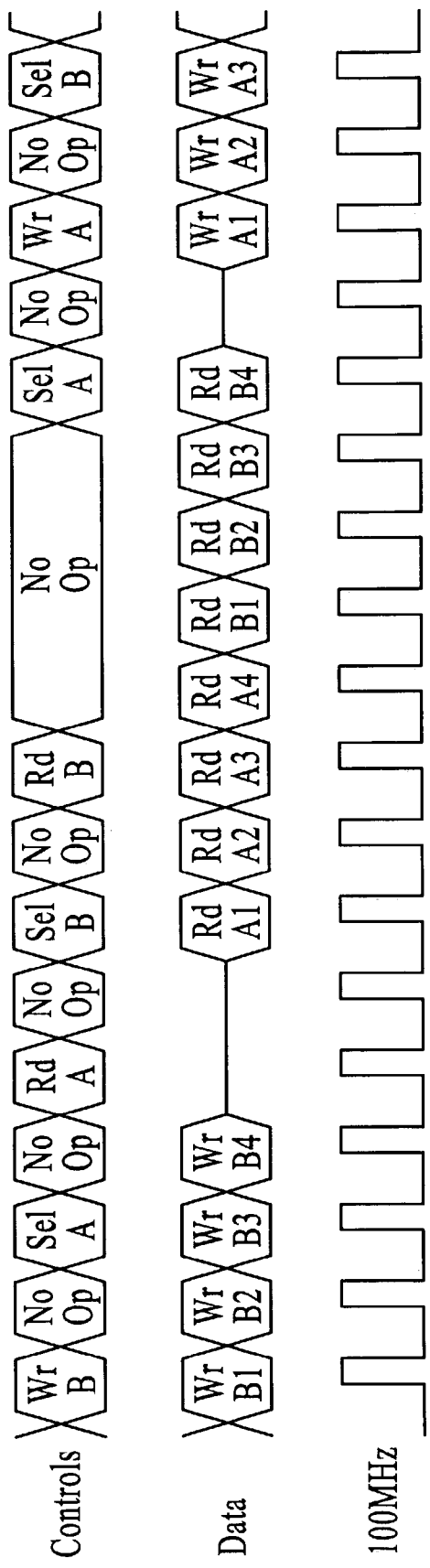
FIG. 25 is a timing diagram illustrating how data is read from SDRAM.

FIG. 25 is a timing diagram illustrating how data is read from SDRAM. The dram has been configured for a burst of 4 with a latency of 2 clock cycles. Bank A is first selected/activated followed by a read command 2 clock cycles later. The bank select/activate for bank B is next issued as read data begins returning 2 clocks after the read command was issued to bank A. Two clock cycles before we need to receive data from bank B we issue the read command. Once all 4 words have been received from bank A we begin receiving data from bank B.

External Memory Write Operations (dramwrt).

The dramwrt controller (See FIG. 24) is a slave sequencer to the rest of Mojave. Servicing requests issued by master DMA sequencers, the dramwrt controller moves data from Sram to the external SDRAM or flash, via the dramif module, in blocks of 64 bytes or less while accumulating a checksum of the data moved. The nature of the SDRAM requires fixed burst sizes for each of it's internal banks with ras precharge intervals between each access. By selecting a burst size of 4 words for SDRAM writes and interleaving bank accesses on a 4 word boundary, we can ensure that the ras precharge interval for the first bank is satisfied before burst completion for the second bank, allowing us to re-instruct the first bank and continue with uninterrupted dram access. SDRAMs require a consistent burst size be utilized each and every time the SDRAM is accessed. For this reason, if an SDRAM access does not begin or end on a 64 byte boundary, SDRAM bandwidth will be reduced due to less than 16 words of data being transferred during the burst cycle.

The memctrl block diagram (See FIG. 24) contains the major functional blocks of the dramwrt controller. The first step in servicing a request to move data from Sram to SDRAM is the prioritization of the level two master requests. This is done by the dramwrt_mux. Next the dramwrt_mux takes a Snapshot of the dram write address and applies configuration information to determine the correct dram, bank, row and column address to apply. The dramwrt_ldctrl sequencer immediately issues a read command to the Sram to which the Sram responds with both data and an acknowledge. The read data is stored within the dramwrt_data buffers by the dramwrt_ldctrl sequencer. The dramwrt_ldctrl sequencer passes the acknowledge to the level two master along with a size code indicating how much data was read during the Sram cycle allowing the update of pointers and counters. The dramwrt_seq has initiated an a bank activate command at this point. Once sufficient data has been read from Sram, the dramwrt_seq sequencer issues a write command to the dram starting the burst cycle and computing a checksum as the data passes by. In the typical case, all the required data will be read from Sram before the data is ready to be written to Sram, thus ensuring infrequent wait states on the SDRAM interface. ECC checkbits are also computed by the dramwrt_data block as the data moves out to the SDRAM interface. It is also possible to force ECC errors to any bit position within the data byte or checkbits. The Sram read cycle repeats until the original burst request has been completed at which point the dramwrt_mux prioritizes any remaining requests in preparation for the next burst cycle.

Since the ECC is a 8 bit ECC for a 64 bit word, writes not aligned to a 64 bit boundary will necessitate a read/modify/write cycle. When the dramwrt_ldctrl sequencer detects that a non-aligned write is required, it will generate a request for the read to the dramrd controller. The dramrd controller then returns the read data which is loaded into the write buffers. The dramwrt_ldctrl sequencer can then request the new data from the Sram, proceeding from this point in the same way as for an aligned operation.

Contiguous dram burst cycles are not guaranteed to the dramwrt controller as an algorithm is implemented in the dramif which ensures highest priority to refresh cycles followed by ping-pong access between dram writes and dram reads and then configuration and flash cycles.

Figure 26:
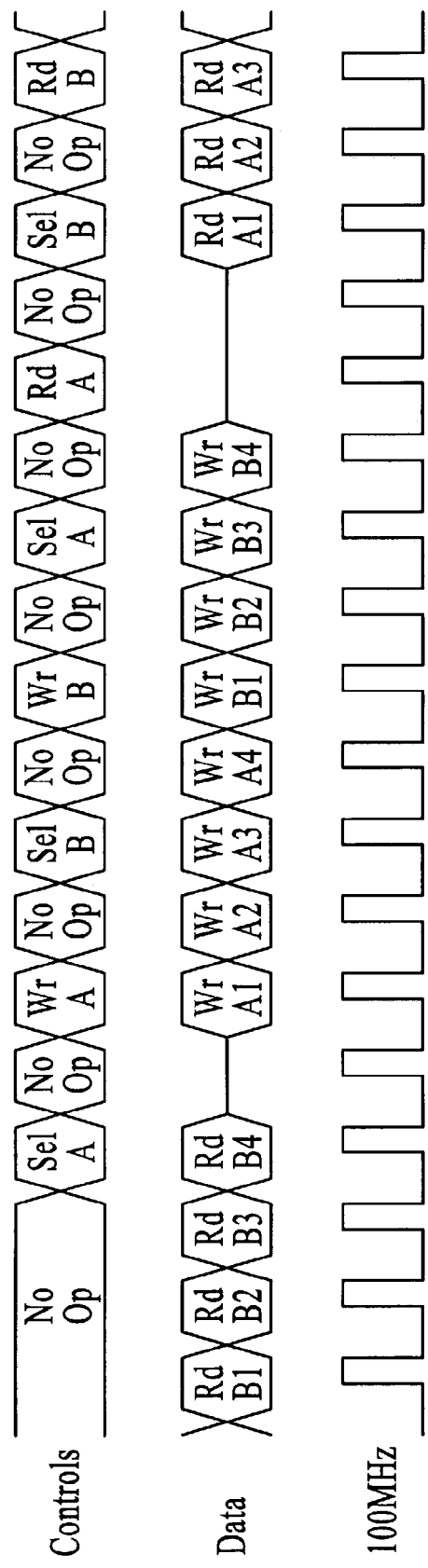
FIG. 26 is a timing diagram illustrating how data is written to SDRAM.

FIG. 26 is a timing diagram illustrating how data is written to SDRAM. The dram has been configured for a burst of four with a latency of two clock cycles. Bank A is first selected/activated followed by a write command two clock cycles later. The bank select/activate for bank B is next issued in preparation for issuing the second write command. As soon as the first 4 word burst to bank A completes we issue the write command for bank B and begin supplying data. Banks C and D follow if necessary.

Pci Master-Out Sequencer (Pmo).

Figure 27:
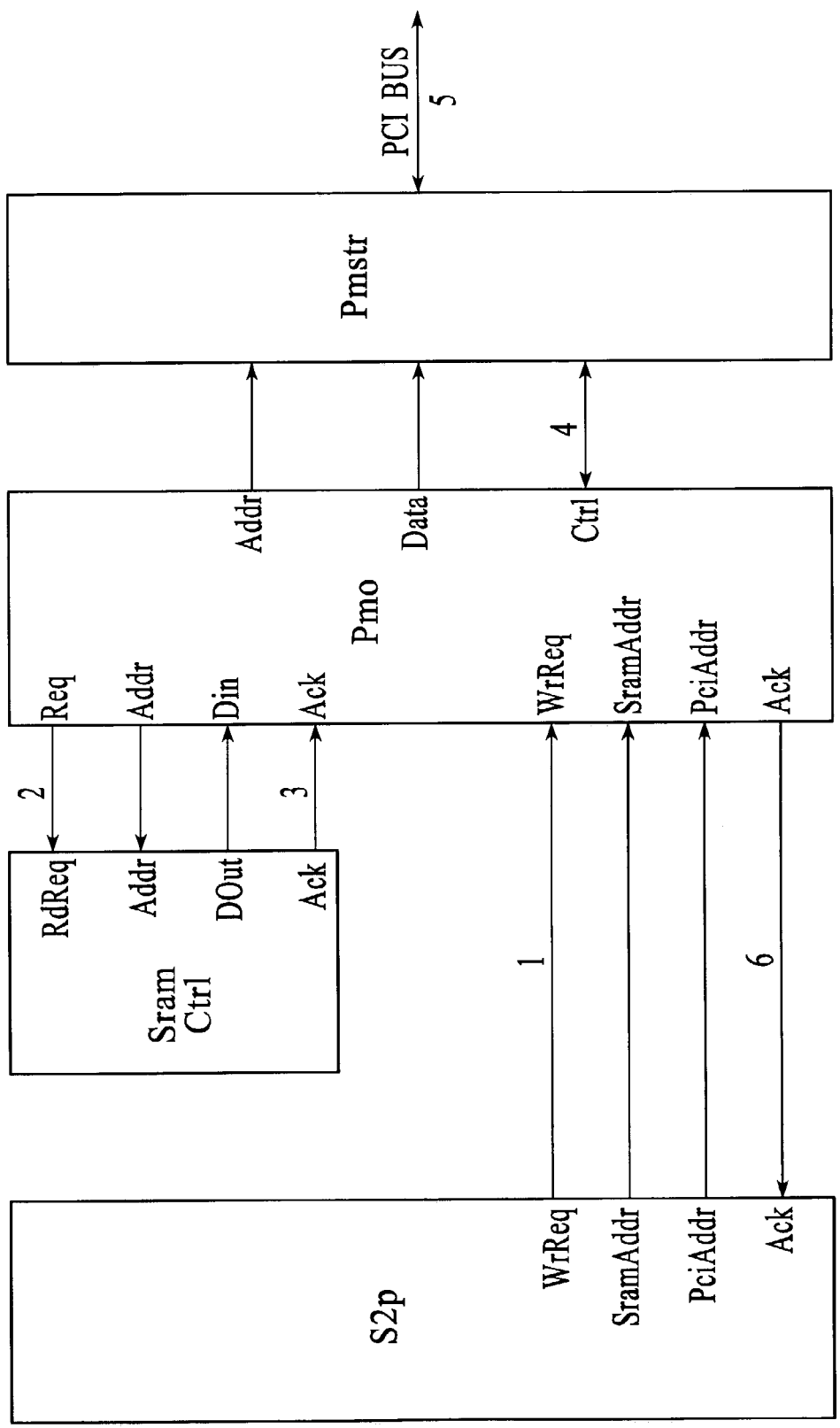
FIG. 27 is a diagram of a PCI master-out sequencer in accordance with the embodiment of FIG. 10.

The Pmo sequencer (See FIG. 27) acts only as a slave sequencer. Servicing requests issued by master sequencers, the Pmo sequencer moves data from an Sram based fifo to a Pci target, via the PciMstrIO module, in bursts of up to 256 bytes. The nature of the PCI bus dictates the use of the write line command to ensure optimal system performance. The write line command requires that the Pmo sequencer be capable of transferring a whole multiple (1×, 2×, 3×, . . . ) of cache lines of which the size is set through the Pci configuration registers. To accomplish this end, Pmo will automatically perform partial bursts until it has aligned the transfers on a cache line boundary at which time it will begin usage of the write line command. The Sram fifo depth, of 256 bytes, has been chosen in order to allow Pmo to accommodate cache line sizes up to 128 bytes. Provided the cache line size is less than 128 bytes, Pmo will perform multiple, contiguous cache line bursts until it has exhausted the supply of data.

Pmo receives requests from two separate sources; the dram to Pci (D2p) module and the Sram to Pci (S2p) module. An operation (See FIG. 27) first begins with prioritization of the requests where the S2p module is given highest priority. Next, the Pmo module takes a Snapshot of the Sram fifo address and uses this to generate read requests for the SramCtrl sequencer. The Pmo module then proceeds to arbitrate for ownership of the Pci bus via the PciMstrIO module. Once the Pmo holding registers have sufficient data and Pci bus mastership has been granted, the Pmo module begins transferring data to the Pci target. For each successful transfer, Pmo sends an acknowledge and encoded size to the master sequencer, allow it to update it's internal pointers, counters and status. Once the Pci burst transaction has terminated, Pmo parks on the Pci bus unless another initiator has requested ownership. Pmo again prioritizes the incoming requests and repeats the process.

Pci Master-In Sequencer (Pmi).

Figure 28:
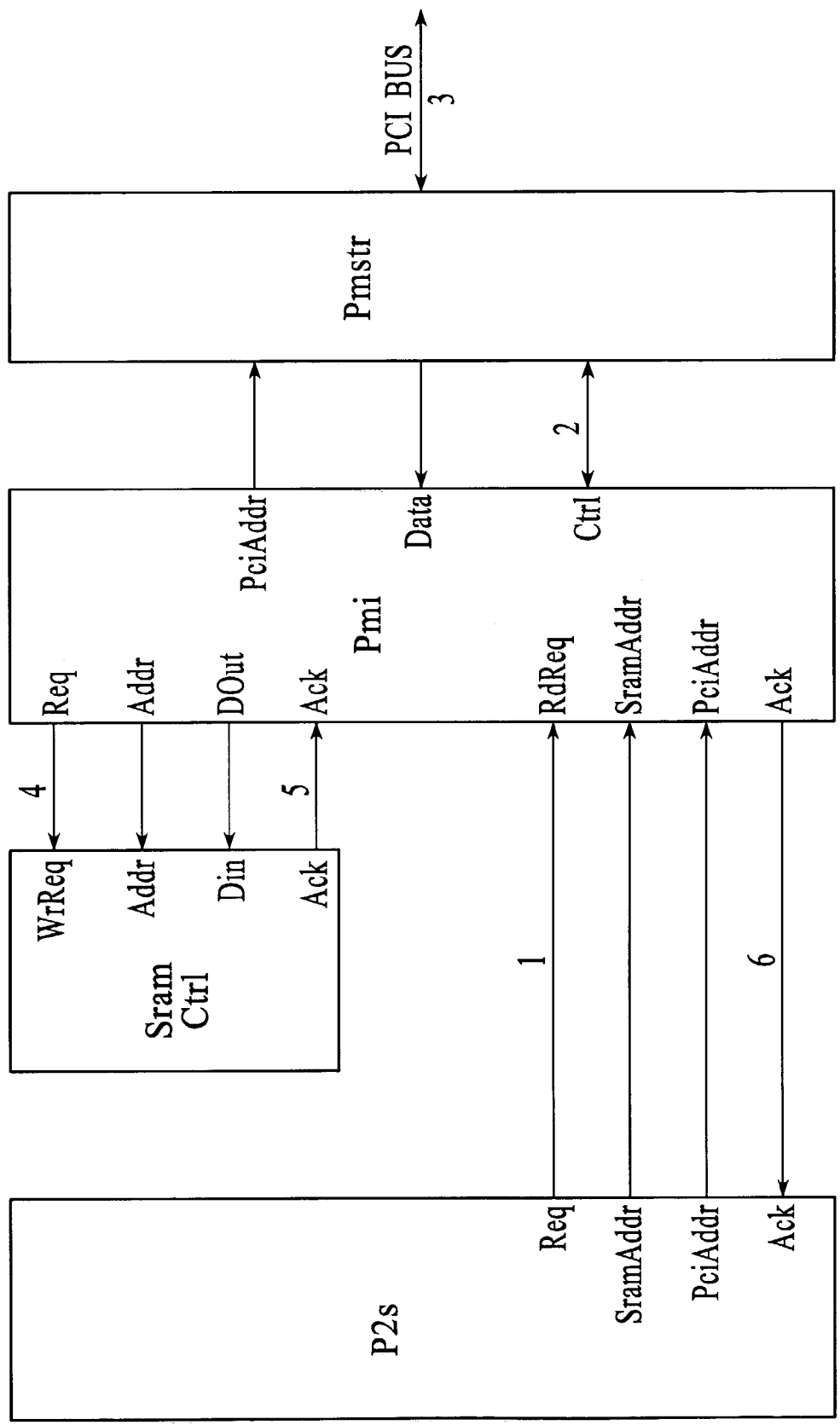
FIG. 28 is a diagram of a PCI master-in sequencer in accordance with the embodiment of FIG. 10.

The Pmi sequencer (See FIG. 28) acts only as a slave sequencer. Servicing requests issued by master sequencers, the Pmi sequencer moves data from a Pci target to an Sram based fifo, via the PciMstrIO module, in bursts of up to 256 bytes. The nature of the PCI bus dictates the use of the read multiple command to ensure optimal system performance. The read multiple command requires that the Pmi sequencer be capable of transferring a cache line or more of data. To accomplish this end, Pmi will automatically perform partial cache line bursts until it has aligned the transfers on a cache line boundary at which time it will begin usage of the read multiple command. The Sram fifo depth, of 256 bytes, has been chosen in order to allow Pmi to accommodate cache line sizes up to 128 bytes. Provided the cache line size is less than 128 bytes, Pmi will perform multiple, contiguous cache line bursts until it has filled the fifo.

Pmi receive requests from two separate sources; the Pci to dram (P2d) module and the Pci to Sram (P2s) module. An operation (See FIG. 28) first begins with prioritization of the requests where the P2s module is given highest priority. The Pmi module then proceeds to arbitrate for ownership of the Pci bus via the PciMstrIO module. Once the Pci bus mastership has been granted and the Pmi holding registers have sufficient data, the Pmi module begins transferring data to the Sram fifo. For each successful transfer, Pmi sends an acknowledge and encoded size to the master sequencer, allowing it to update it's internal pointers, counters and status. Once the Pci burst transaction has terminated, Pmi parks on the Pci bus unless another initiator has requested ownership. Pmi again prioritizes the incoming requests and repeats the process Dram to Pci Sequencer (D2p).

The D2p sequencer (See FIG. 29) acts is a master sequencer. Servicing channel requests issued by the Cpu, the D2p sequencer manages movement of data from dram to the Pci bus by issuing requests to both the Drd sequencer and the Pmo sequencer. Data transfer is accomplished using an Sram based fifo through which data is staged.

D2p can receive requests from any of the processor's thirty-two dma channels. Once a command request has been detected, D2p fetches a dma descriptor from an Sram location dedicated to the requesting channel which includes the dram address, Pci address, Pci endian and request size. D2p then issues a request to the D2s sequencer causing the Sram based fifo to fill with dram data. Once the fifo contains sufficient data for a Pci transaction, D2s issues a request to Pmo which in turn moves data from the fifo to a Pci target. The process repeats until the entire request has been satisfied at which time D2p writes ending status in to the Sram dma descriptor area and sets the channel done bit associated with that channel. D2p then monitors the dma channels for additional requests.

Figure 29:
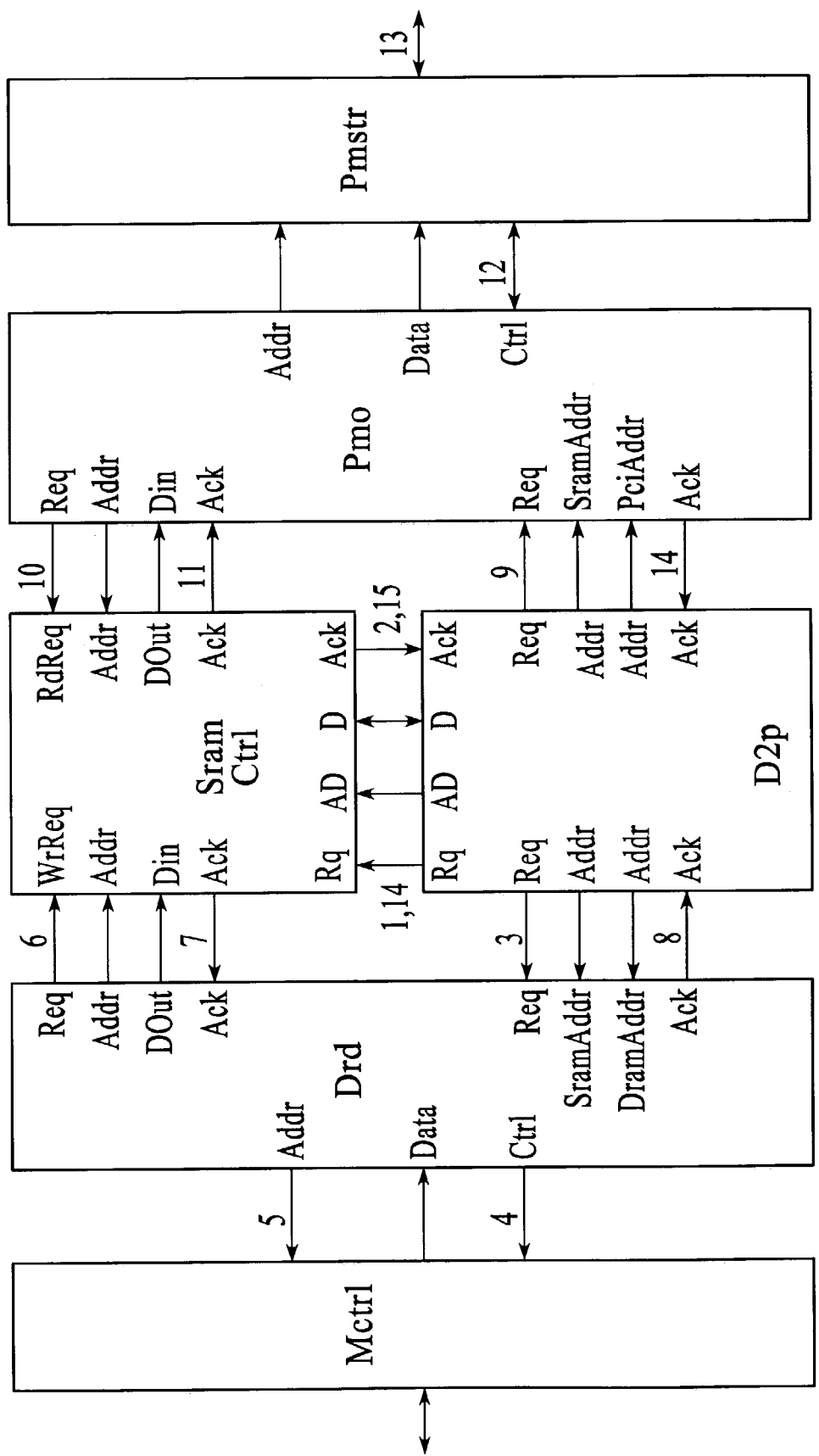
FIG. 29 is a diagram of a DRAM to PCI sequencer in accordance with the embodiment of FIG. 10.

FIG. 29 is an illustration showing the major blocks involved in the movement of data from dram to Pci target.

Pci to Dram Sequencer (P2d).

The P2d sequencer (See FIG. 30) acts as both a slave sequencer and a master sequencer. Servicing channel requests issued by the Cpu, the P2d sequencer manages movement of data from Pci bus to dram by issuing requests to both the Dwr sequencer and the Pmi sequencer. Data transfer is accomplished using an Sram based fifo through which data is staged.

Figure 30:
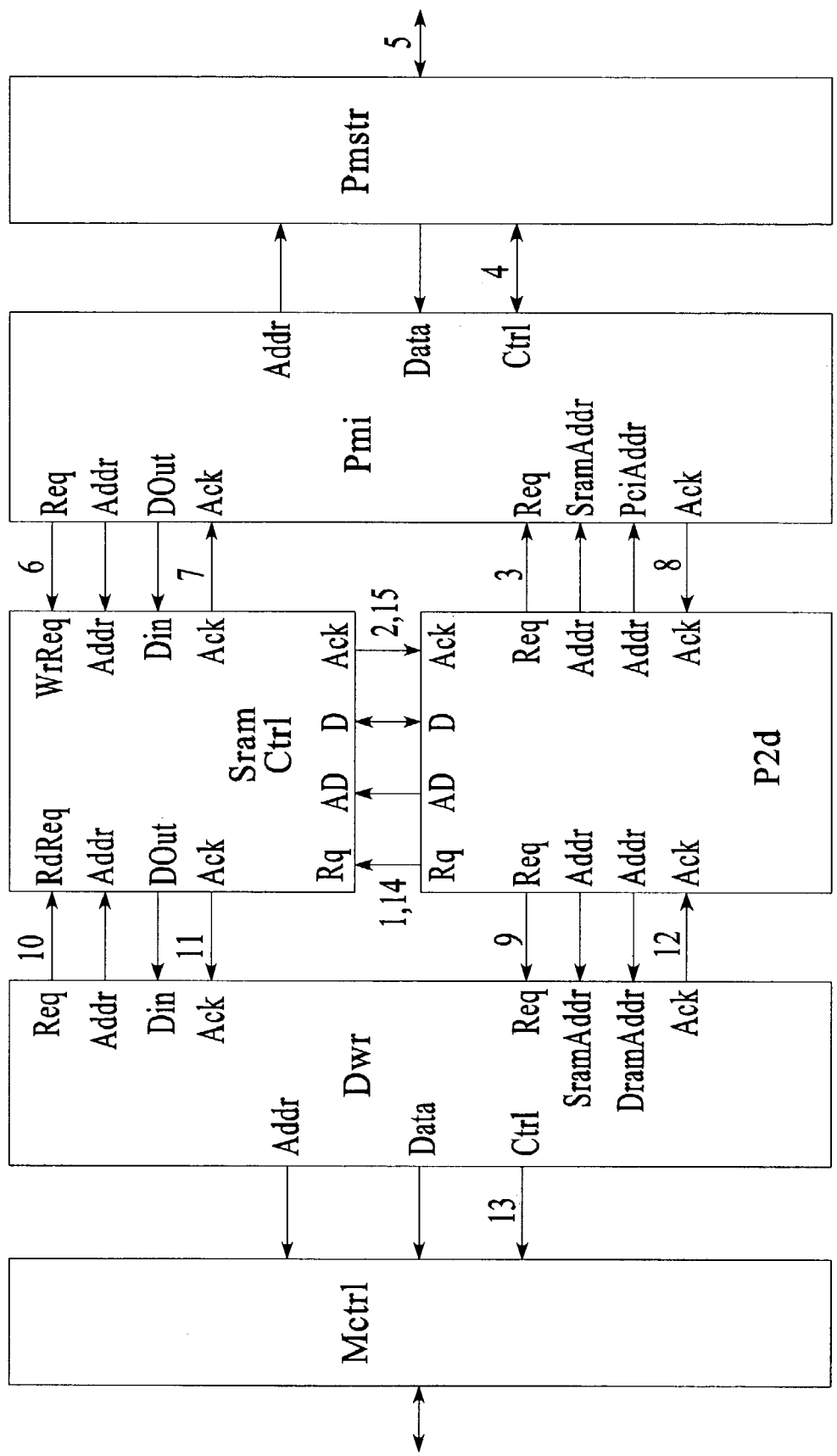
FIG. 30 is a diagram of a PCI to DRAM sequencer in accordance with the embodiment of FIG. 10.

P2d can receive requests from any of the processor's thirty-two dma channels. Once a command request has been detected, P2d, operating as a slave sequencer, fetches a dma descriptor from an Sram location dedicated to the requesting channel which includes the dram address, Pci address, Pci endian and request size. P2d then issues a request to Pmo which in turn moves data from the Pci target to the Sram fifo. Next, P2d issues a request to the Dwr sequencer causing the Sram based fifo contents to be written to the dram. The process repeats until the entire request has been satisfied at which time P2d writes ending status in to the Sram dma descriptor area and sets the channel done bit associated with that channel. P2d then monitors the dma channels for additional requests. FIG. 30 is an illustration showing the major blocks involved in the movement of data from a Pci target to dram.

Sram to Pci Sequencer (S2p).

Figure 31:
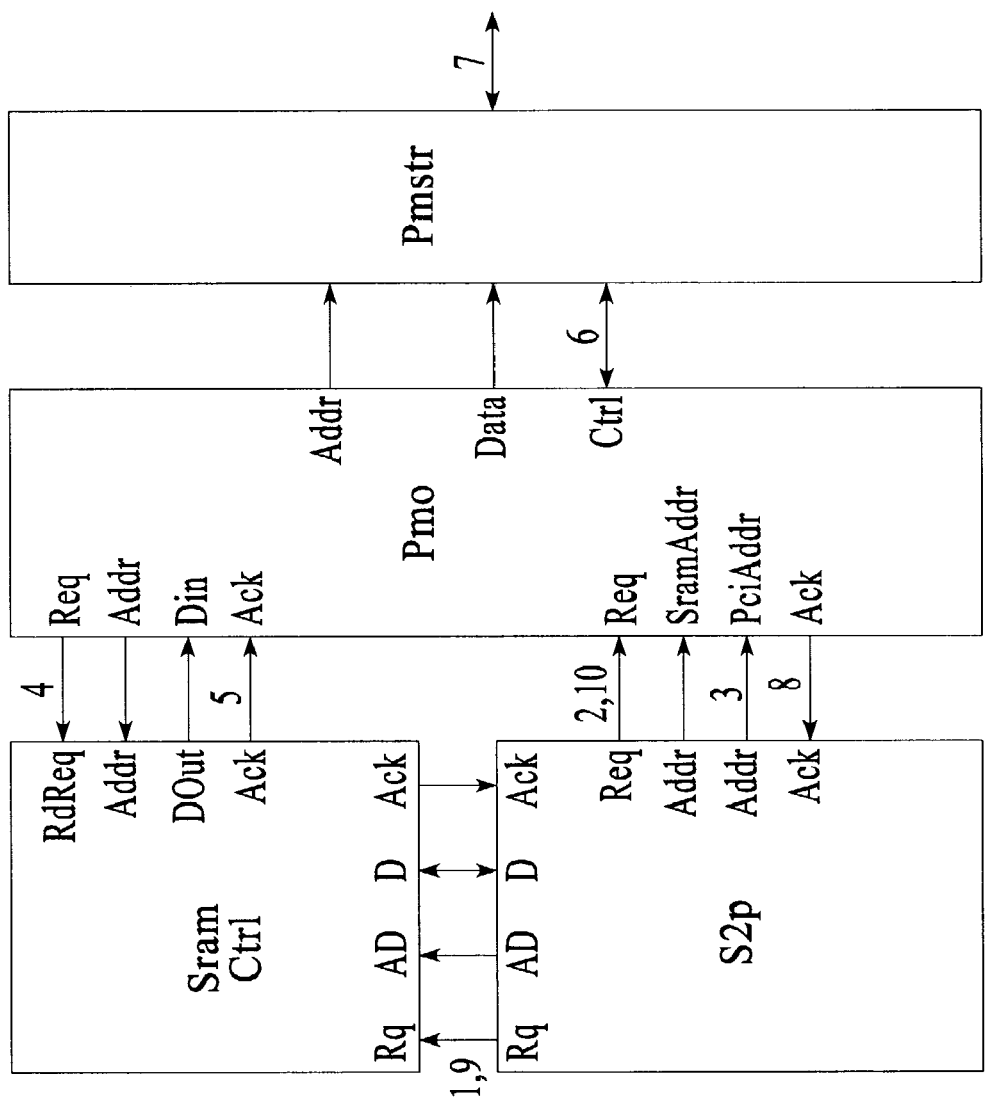
FIG. 31 is a diagram of a SRAM to PCI sequencer in accordance with the embodiment of FIG. 10.

The S2p sequencer (See FIG. 31) acts as both a slave sequencer and a master sequencer. Servicing channel requests issued by the Cpu, the S2p sequencer manages movement of data from Sram to the Pci bus by issuing requests to the Pmo sequencer S2p can receive requests from any of the processor's thirty-two dma channels. Once a command request has been detected, S2p, operating as a slave sequencer, fetches a dma descriptor from an Sram location dedicated to the requesting channel which includes the Sram address, Pci address, Pci endian and request size. S2p then issues a request to Pmo which in turn moves data from the Sram to a Pci target. The process repeats until the entire request has been satisfied at which time S2p writes ending status in to the Sram dma descriptor area and sets the channel done bit associated with that channel. S2p then monitors the dma channels for additional requests. FIG. 31 is an illustration showing the major blocks involved in the movement of data from Sram to Pci target.

Pci To Sram Sequencer (P2s).

The P2s sequencer (See FIG. 32) acts as both a slave sequencer and a master sequencer. Servicing channel requests issued by the Cpu, the P2s sequencer manages movement of data from Pci bus to Sram by issuing requests to the. Pmi sequencer.

Figure 32:
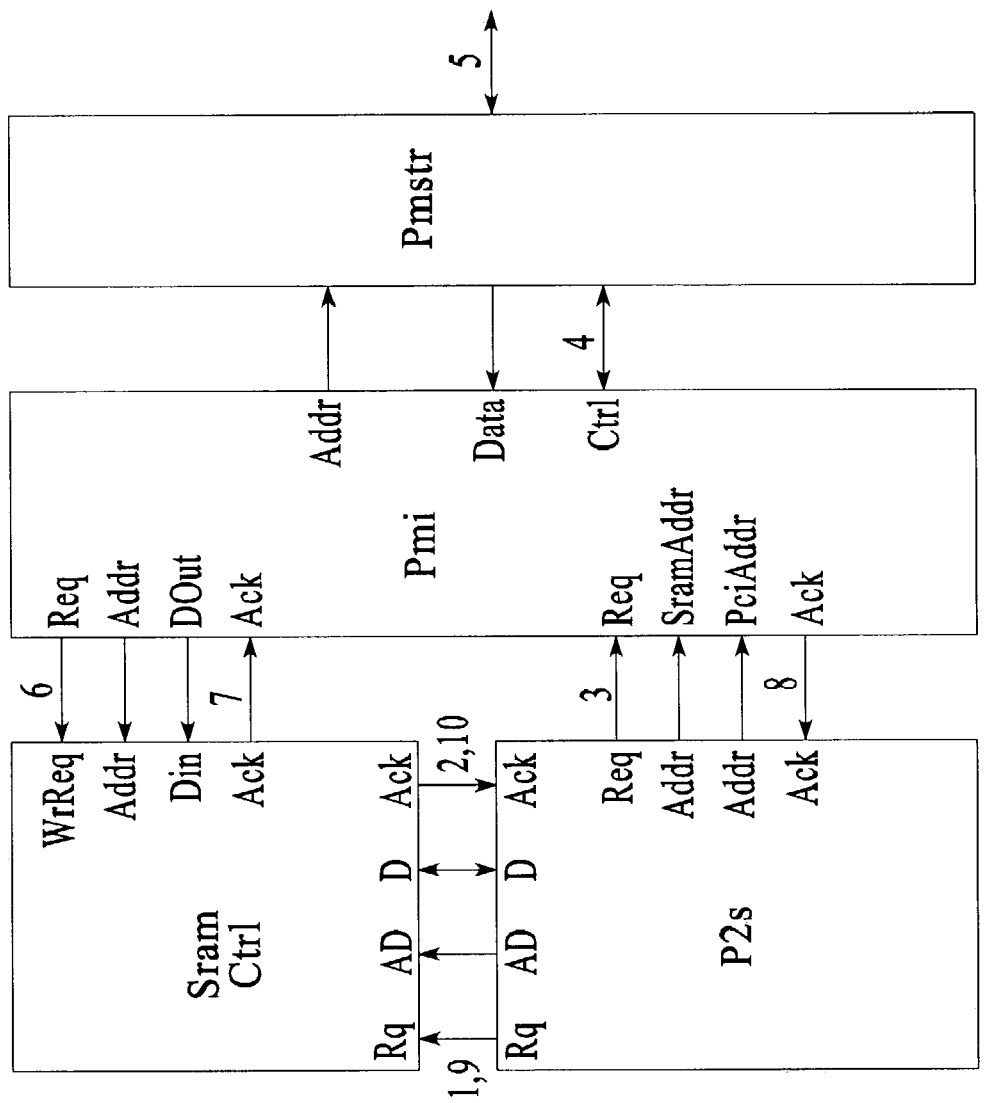
FIG. 32 is a diagram of a PCI to SRAM sequencer in accordance with the embodiment of FIG. 10.

P2s can receive requests from any of the processor's thirty-two dma channels. Once a command request has been detected, P2s, operating as a slave sequencer, fetches a dma descriptor from an Sram location dedicated to the requesting channel which includes the Sram address, Pci address, Pci endian and request size. P2s then issues a request to Pmo which in turn moves data from the Pci target to the Sram. The process repeats until the entire request has been satisfied at which time P2s writes ending status in to the dma descriptor area of Sram and sets the channel done bit associated with that channel. P2s then monitors the dma channels for additional requests. FIG. 32 is an illustration showing the major blocks involved in the movement of data from a Pci target to dram.

Dram to Sram Sequencer (D2s).

The D2s sequencer (See FIG. 33) acts as both a slave sequencer and a master sequencer. Servicing channel requests issued by the Cpu, the D2s sequencer manages movement of data from dram to Sram by issuing requests to the Drd sequencer.

Figure 33:
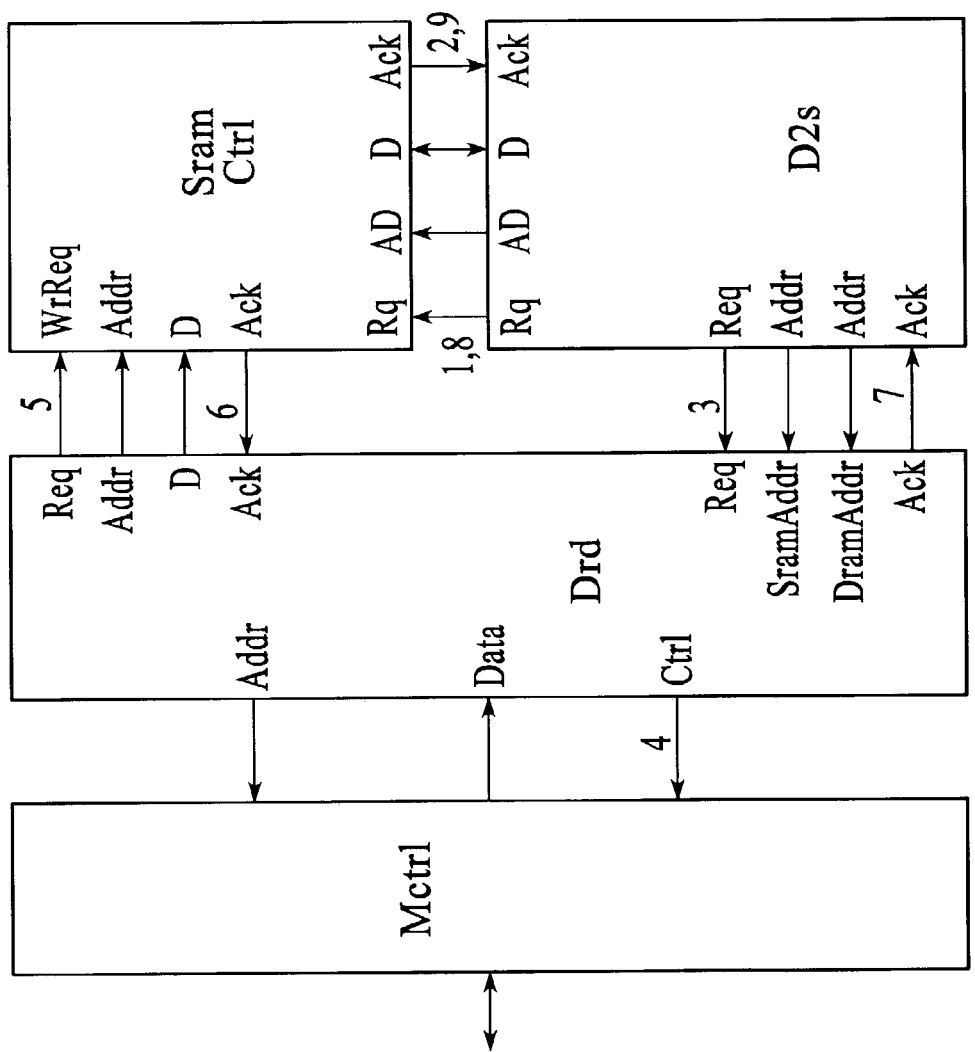
FIG. 33 is a diagram of a DRAM to SRAM sequencer in accordance with the embodiment of FIG. 10.

D2s can receive requests from any of the processor's thirty-two dma channels. Once a command request has been detected, D2s, operating as a slave sequencer, fetches a dma descriptor from an Sram location dedicated to the requesting channel which includes the dram address, Sram address and request size. D2s then issues a request to the Drd sequencer causing the transfer of data to the Sram. The process repeats until the entire request has been satisfied at which time D2s writes ending status in to the Sram dma descriptor area and sets the channel done bit associated with that channel. D2s then monitors the dma channels for additional requests. FIG. 33 is an illustration showing the major blocks involved in the movement of data from dram to Sram.

Sram to Dram Sequencer (S2d).

The S2d sequencer (See FIG. 34) acts as both a slave sequencer and a master sequencer. Servicing channel requests issued by the Cpu, the S2d sequencer manages movement of data from Sram to dram by issuing requests to the Dwr sequencer.

Figure 34:
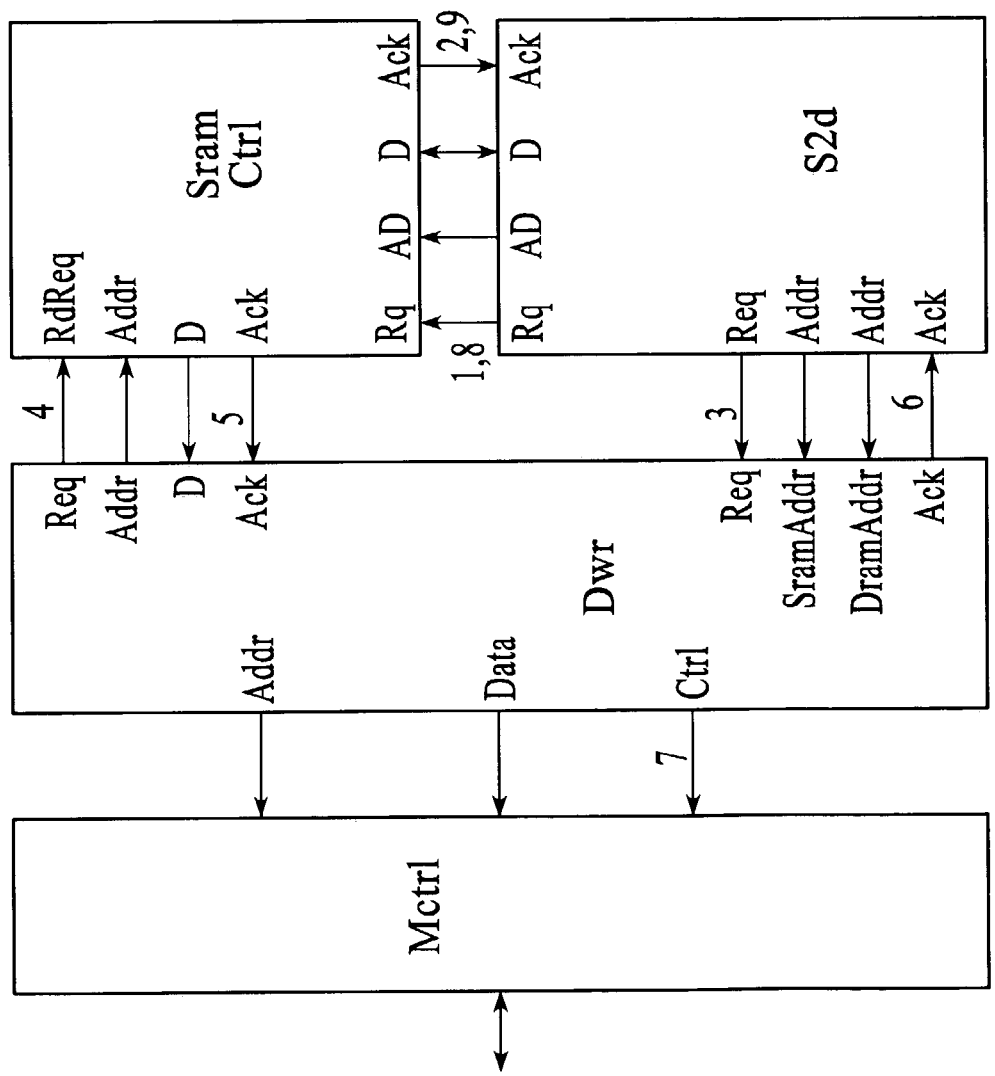
FIG. 34 is a diagram of a SRAM to DRAM sequencer in accordance with the embodiment of FIG. 10.

S2d can receive requests from any of the processor's thirty-two dma channels. Once a command request has been detected, S2d, operating as a slave sequencer, fetches a dma descriptor from an Sram location dedicated to the requesting channel which includes the dram address, Sram address, checksum reset and request size. S2d then issues a request to the Dwr sequencer causing the transfer of data to the dram. The process repeats until the entire request has been satisfied at which time S2d writes ending status in to the Sram dma descriptor area and sets the channel done bit associated with that channel. S2d then monitors the dma channels for additional requests. FIG. 34 is an illustration showing the major blocks involved in the movement of data from Sram to dram.

Pci Slave Input Sequencer (Psi).

The Psi sequencer (See FIG. 35) acts as both a slave sequencer and a master sequencer. Servicing requests issued by a Pci master, the Psi sequencer manages movement of data from Pci bus to Sram and Pci bus to dram via Sram by issuing requests to the SramCtrl and Dwr sequencers.

Psi manages write requests to configuration space, expansion rom, dram, Sram and memory mapped registers. Psi separates these Pci bus operations in to two categories with different action taken for each. Dram accesses result in Psi generating write request to an Sram buffer followed with a write request to the Dwr sequencer. Subsequent write or read dram operations are retry terminated until the buffer has been emptied. An event notification is set for the processor allowing message passing to occur through dram space.

All other Pci write transactions result in Psi posting the write information including Pci address, Pci byte marks and Pci data to a reserved location in Sram, then setting an event flag which the event processor monitors. Subsequent writes or reads of configuration, expansion rom, Sram or registers are terminated with retry until the processor clears the event flag. This allows Mojave to keep pipelining levels to a minimum for the posted write and give the processor ample time to modify data for subsequent Pci read operations.

Figure 35:
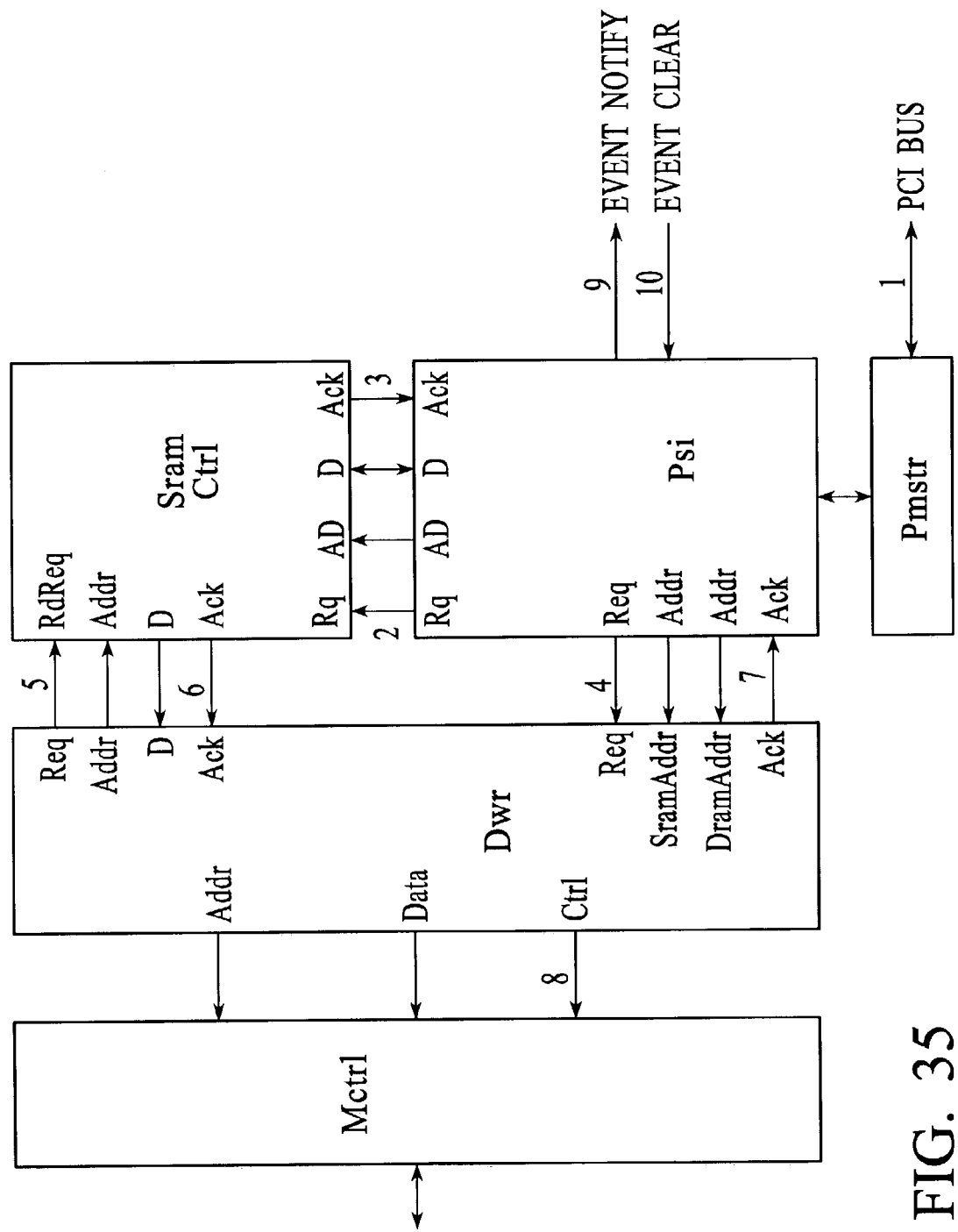
FIG. 35 is a diagram of a PCI slave input sequencer in accordance with the embodiment of FIG. 10.

FIG. 35 depicts the sequence of events when Psi is the target of a Pci write operation. Note that events 4 through 7 occur only when the write operation targets the dram.

Pci Slave Output Sequencer (Pso).

The Pso sequencer (See FIG. 36) acts as both a slave sequencer and a master sequencer. Servicing requests issued by a Pci master, the Pso sequencer manages movement of data to Pci bus form Sram and to Pci bus from dram via Sram by issuing requests to the SramCtrl and Drd sequencers.

Pso manages read requests to configuration space, expansion rom, dram, Sram and memory mapped registers. Pso separates these Pci bus operations in to two categories with different action taken for each. Dram accesses result in Pso generating read request to the Drd sequencer followed with a read request to Sram buffer. Subsequent write or read dram operations are retry terminated until the buffer has been emptied.

All other Pci read transactions result in Pso posting the read request information including Pci address and Pci byte marks to a reserved location in Sram, then setting an event flag which the event processor monitors. Subsequent writes or reads of configuration, expansion rom, Sram or registers are terminated with retry until the processor clears the event flag. This allows Mojave to use a microcoded response mechanism to return data for the request. The processor decodes the request information, formulates or fetches the requested data and stores it in Sram then clears the event flag allowing Pso to fetch the data and return it on the Pci bus.

Figure 36:
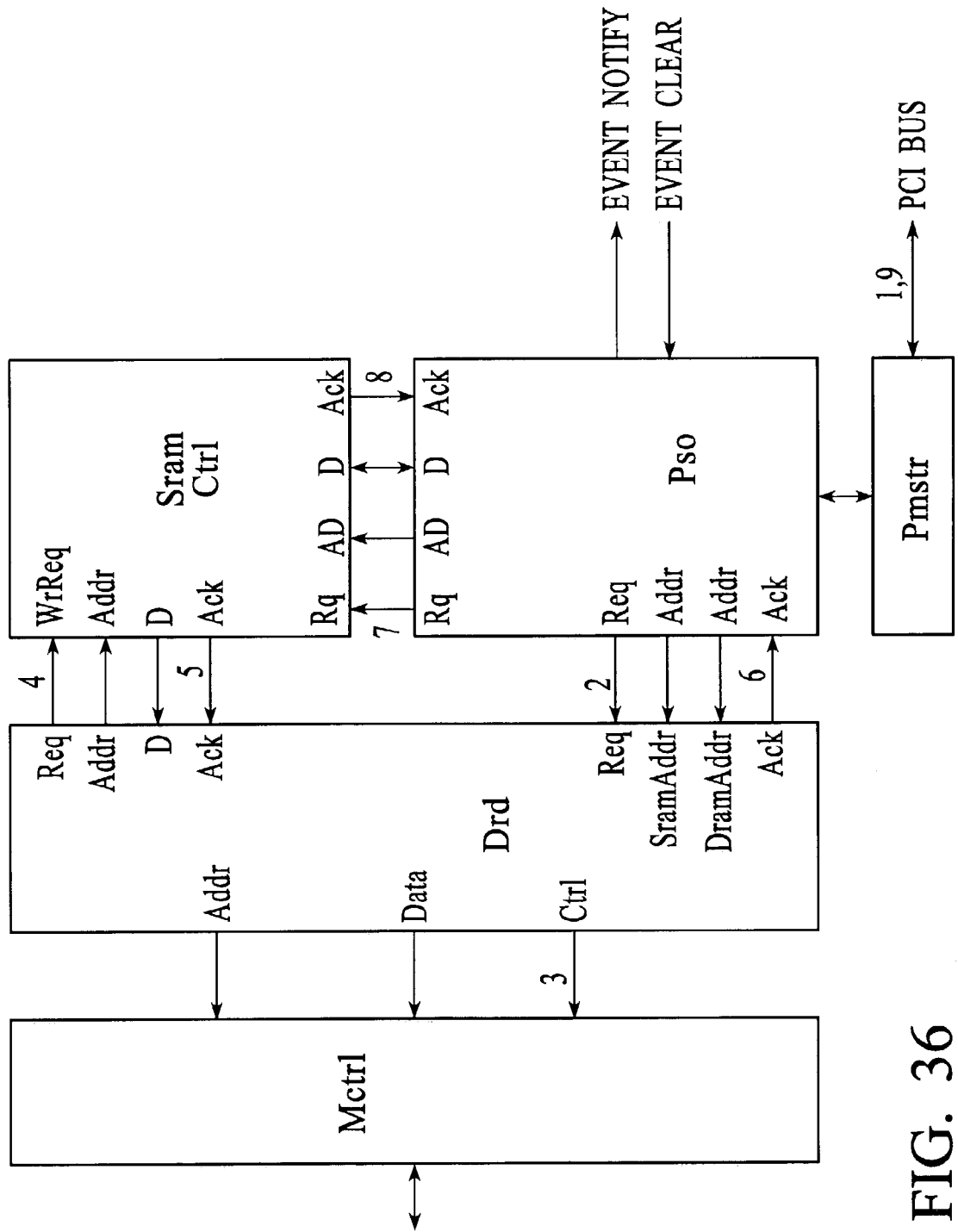
FIG. 36 is a diagram of a PCI slave output sequencer in accordance with the embodiment of FIG. 10.

FIG. 36 depicts the sequence of events when Pso is the target of a Pci read operation.

Frame Receive Sequencer (RcvX).

The receive sequencer (RcvSeq)(See FIG. 37) analyzes and manages incoming packets, stores the result in dram buffers or sram buffers, then notifies the processor through the receive queue (RcvQ) mechanism. The process begins when a buffer descriptor is available at the output of the FreeQ (1). RcvSeq issues a request to the Qmg (2) which responds by supplying the buffer descriptor to RcvSeq (3). RcvSeq then waits for a receive packet (4). The Mac, network, transport and session information is analyzed as each byte is received (4) and stored in the assembly register (AssyReg). When sixteen bytes of information is available, RcvSeq requests a write of the data to the Sram (5). In normal mode, when sufficient data has been stored in the Sram based receive fifo, a Dram write request is issued to Dwr (8). The process continues until the entire packet has been received at which point RcvSeq stores the results of the packet analysis in the beginning of the receive buffer. Once the buffer and status have both been stored, RcvSeq issues a write-queue request to Qmg (12) using a QId based on the priority level of the incoming packet detected by RcvSeq. Qmg responds by storing a buffer descriptor (15) and, in normal mode, a status vector provided by RcvSeq (13). When QHashEn is set, RcvSeq will merge the CtxHash with the receive descriptor. The process then repeats. If RcvSeq detects the arrival of a packet before a free buffer is available, it ignores the packet and sets the PktMissed status bit for the next received packet.

Figure 37:
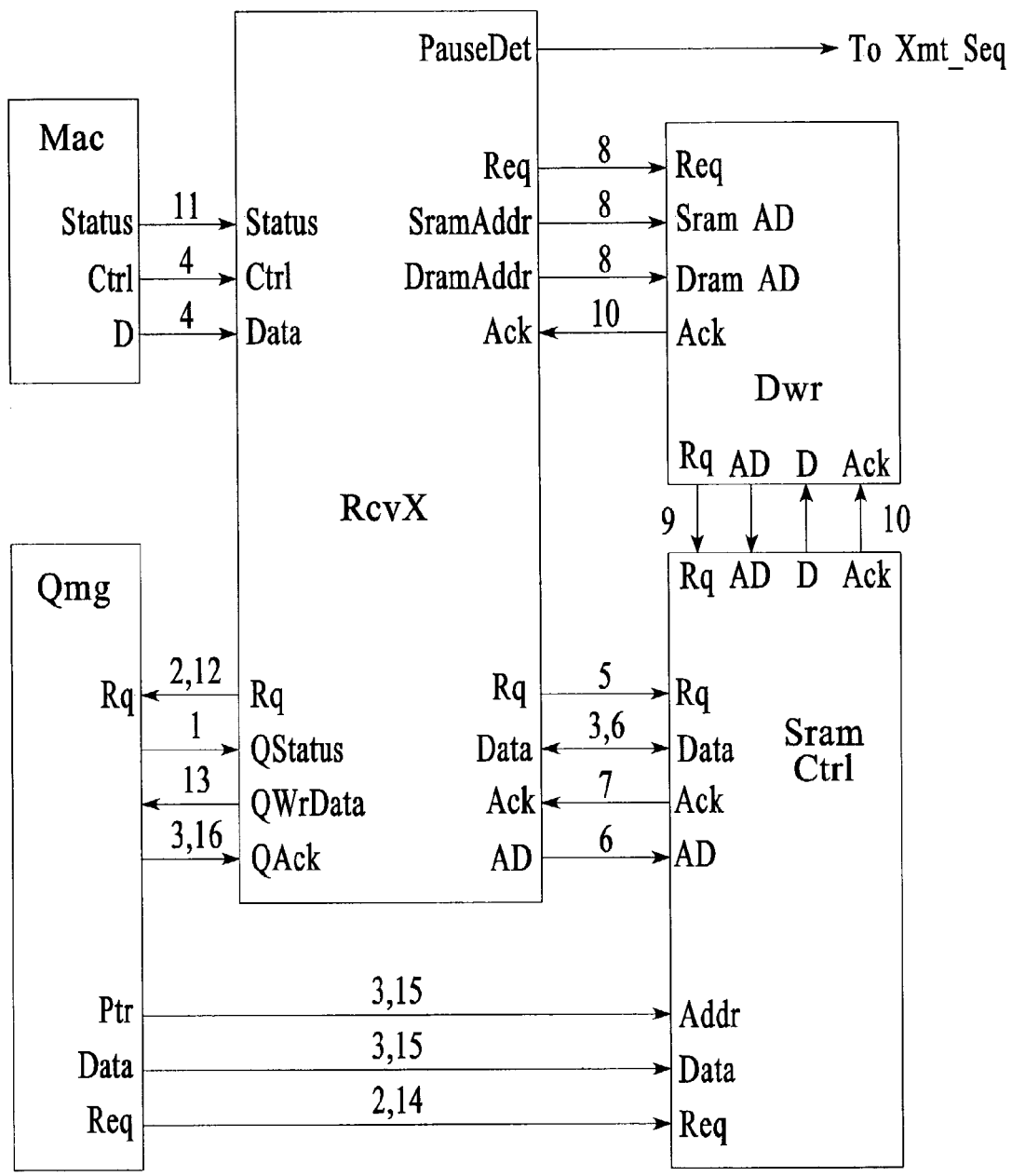
FIG. 37 is a diagram of a frame receive sequencer in accordance with the embodiment of FIG. 10.

FIG. 37 depicts the sequence of events for successful reception of a packet. FIG. 39 is a definition of the receive buffer. FIG. 40 is a definition of the receive buffer descriptor as stored on the RcvQ. FIG. 41 is a diagram that illustrates a receive vector.

Receive Priorities.

The receive sequencer (See FIG. 37) analyzes the vlan priorities of the incoming packets, and stores the receive descriptor in one of it's receive queues according to the value written to the PriLevels bits of the RcvCfg register as represented in FIG. 38. Rev. A of Mojave has a bug which limits receive queues to 0 and 1.

Frame Transmit Sequencer (XmtX).

The transmit sequencer (XmtSeq)(See FIG. 42) manages outgoing packets, using buffer descriptors retrieved from, in order of priority, the urgent descriptor register (XmtUrgDscr) followed by the transmit queues (XmtQ) priority 3 down to priority 0, then storing the descriptor for the freed buffer in the free buffer queue (FreeQ). The process begins when a buffer descriptor is available at, for example, the output of XmtQ2 (1). XmtSeq issues a request to the Qmg (2) which responds by supplying the buffer descriptor to XmtSeq (4). XmtSeq then issues a read request to the Drd (5) sequencer. Next, XmtSeq issues a read request to SramCtrl (6) then instructs the Mac (10) to begin frame transmission. Once the frame transmission has completed, XmtSeq stores the buffer descriptor on the FreeQ (12) thereby recycling the buffer. If XmtSeq detects a data-late condition or a collision, the packet is retransmitted automatically.

Figure 42:
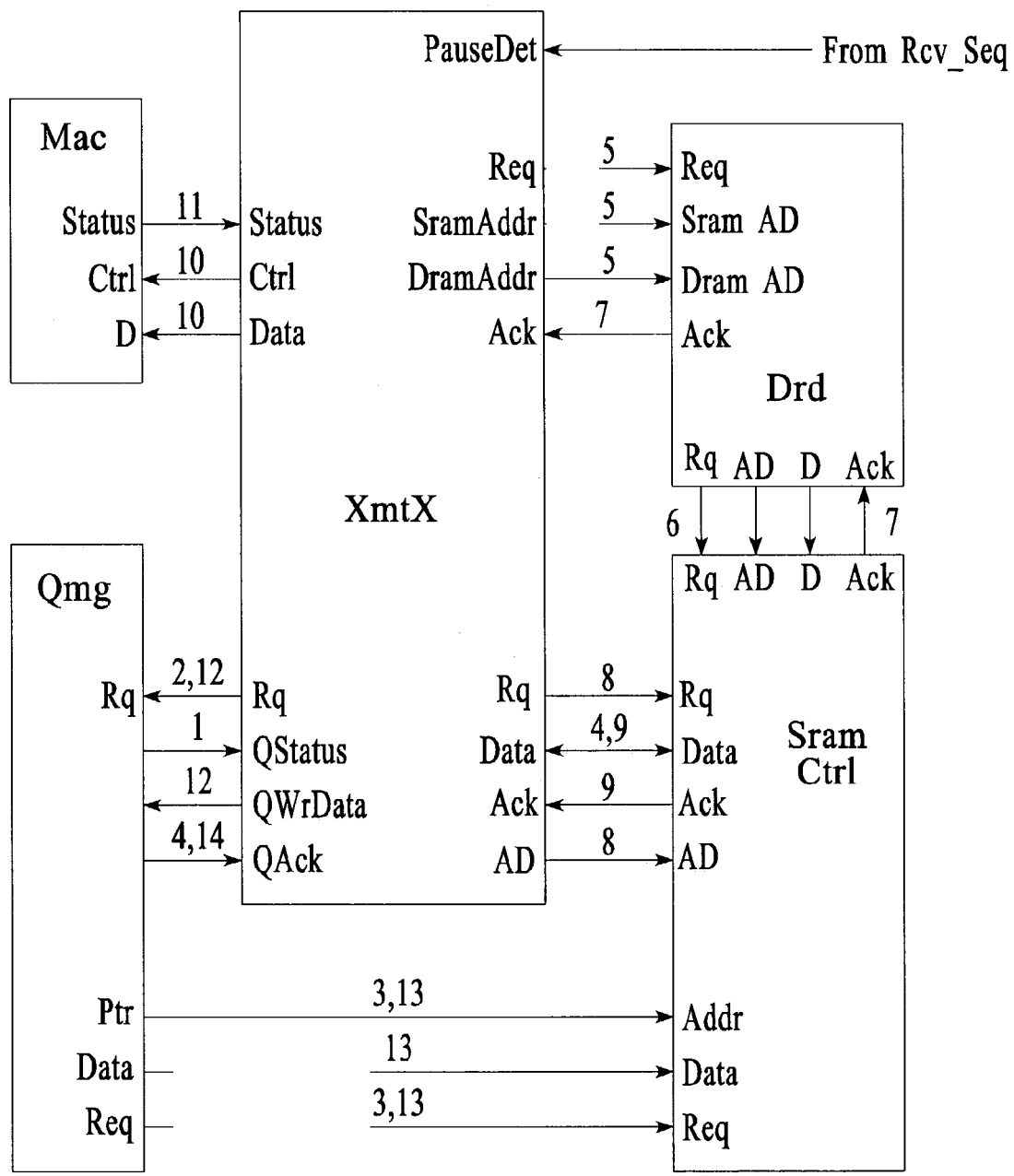
FIG. 42 is a diagram showing a sequence of events for successful transmission of a packet in accordance with the embodiment of FIG. 10.

FIG. 42 depicts the sequence of events for successful transmission of a packet. FIG. 43 is a diagram of the transmit descriptor. FIG. 44 is a diagram of the merge descriptor. FIG. 45 is a diagram of the transmit beffer format. FIG. 46 is a diagram of the transmit vector.

Queue Manager (Qmg).

Mojave includes special hardware assist for the implementation of message and pointer queues. The hardware assist is called the queue manager (Qmg) (See FIG. 47) and manages the movement of queue entries between Cpu and Sram, between Xcv sequencers and Sram as well as between Sram and Dram. Queues comprise three distinct entities; the queue head (QHd), the queue tail (QTl) and the queue body (QBdy). QHd resides in 64 bytes of scratch ram and provides the area to which entries will be written (pushed). QTl resides in 64 bytes of scratch ram and contains queue locations from which entries will be read (popped). QBdy resides in dram and contains locations for expansion of the queue in order to minimize the Sram space requirements. The QBdy size depends upon the queue being accessed and the initialization parameters presented during queue initialization.

Qmg (See FIG. 47) accepts operation requests from both Cpu, XcvSeqs and DmaSeqs. Executing these operations at a frequency of 100 Mhz. Valid Cpu operations include initialize queue (InitQ), write queue (WrQ) and read queue (RdQ). Valid dma requests include read queue (RdQ), read body (RdBdy) and write body (WrBdy). Qmg working in unison with Q2d and D2q generate requests to the Dwr and Drd sequencers to control the movement of data between the QHd, QTl and QBdy.

There are a total of 32 queues. The first 8 are dedicated to a specific function as shown in FIG. 48.

Figure 47:
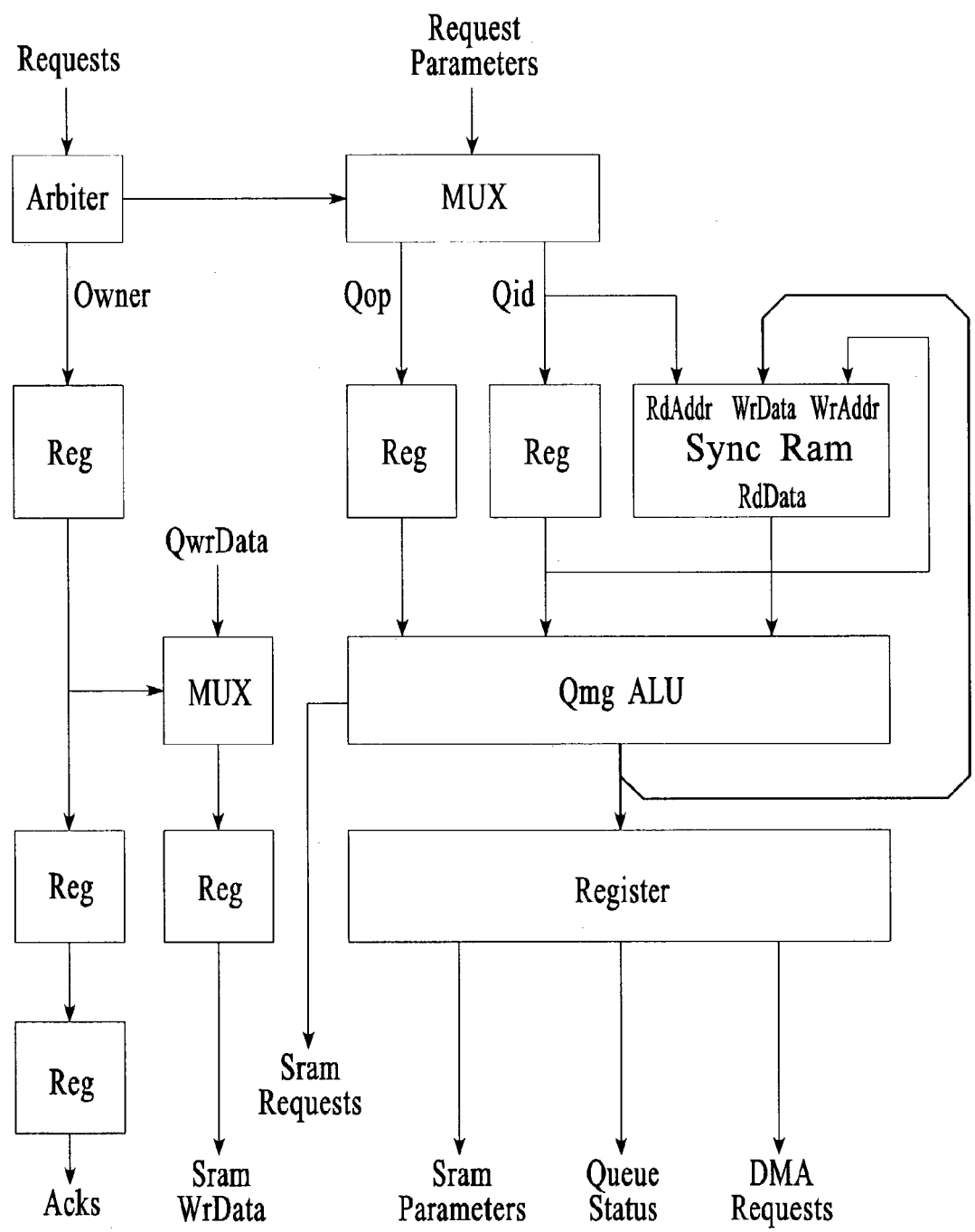
FIG. 47 is a diagram of a queue manager in accordance with the embodiment of FIG. 10.

FIG. 47 shows the major functions of Qmg. The arbiter selects the next operation to be performed. The dual-ported Sram holds the queue variables HdWrAddr, HdRdAddr, TlWrAddr, TlRdAddr, BdyWrAddr, BdyRdAddr and QSz. Qmg accepts an operation request, fetches the queue variables from the queue ram (Qram), modifies the variables based on the current state and the requested operation then updates the variables and issues a read or write request to the Sram controller. The Sram controller services the requests by writing the tail or reading the head and returning an acknowledge.

Dma Operations.

DMA operations are accomplished by seven dma sequencers (DmaSeq). Commands are sent to these sequencers via hardware queues. The queue Ids are fixed in hardware and are as shown in FIG. 49.

Microcode will initiate a DMA by writing a command to the appropriate queue. The DMA sequencer will read a command from the queue, and fetch the descriptor block from Sram. It will then do the DMA. At the end of the DMA, if the DMA chain bit is not set, the DMA sequencer will terminate the DMA.

For DMAs that complete without error, the DMA Context byte (bits 31:24 of the command) will be written to the termination queue indicated by bits 20:16 of the command. Each entry in the termination queue is 32 bits, but only the least significant 8 bits (7:0) are used and wriiten with the DMA Context.

For DMAs that complete with error, the termination queue will not be written. Instead a bit in the DMA Error Register will be set. This is a 32 bit register and the least significant 5 bits of the DMA context will be used to decide which bit should be written in the following manner:

DMA Error Register [1<<DMA command [28:24]]=1;

If the Dummy DMA bit is set, no DMA is performed but the DMA context is written directly to the DMA termination queue.

If the DMA chain bit is set and the DMA completes without error, the DMA descriptor block is updated, but no other termination information is written. If the DMA chain bit is set and the DMA completes with an error, the DMA descriptor block is updated, and the error is propogated to subsequent DMA commands until the sequencer finds one that does not have the chain bit, when the DMA Error Register will be written as above, without writing to the termination queue.

The format of the P2d or P2s descriptor is shown in FIG. 50.

The format of the S2p or D2p descriptor is shown in FIG. 51.

The format of the S2d, D2d or D2s descriptor is shown in FIG. 52.

The format of the ending status of any dma is as shown in FIG. 53.

Figure 54:
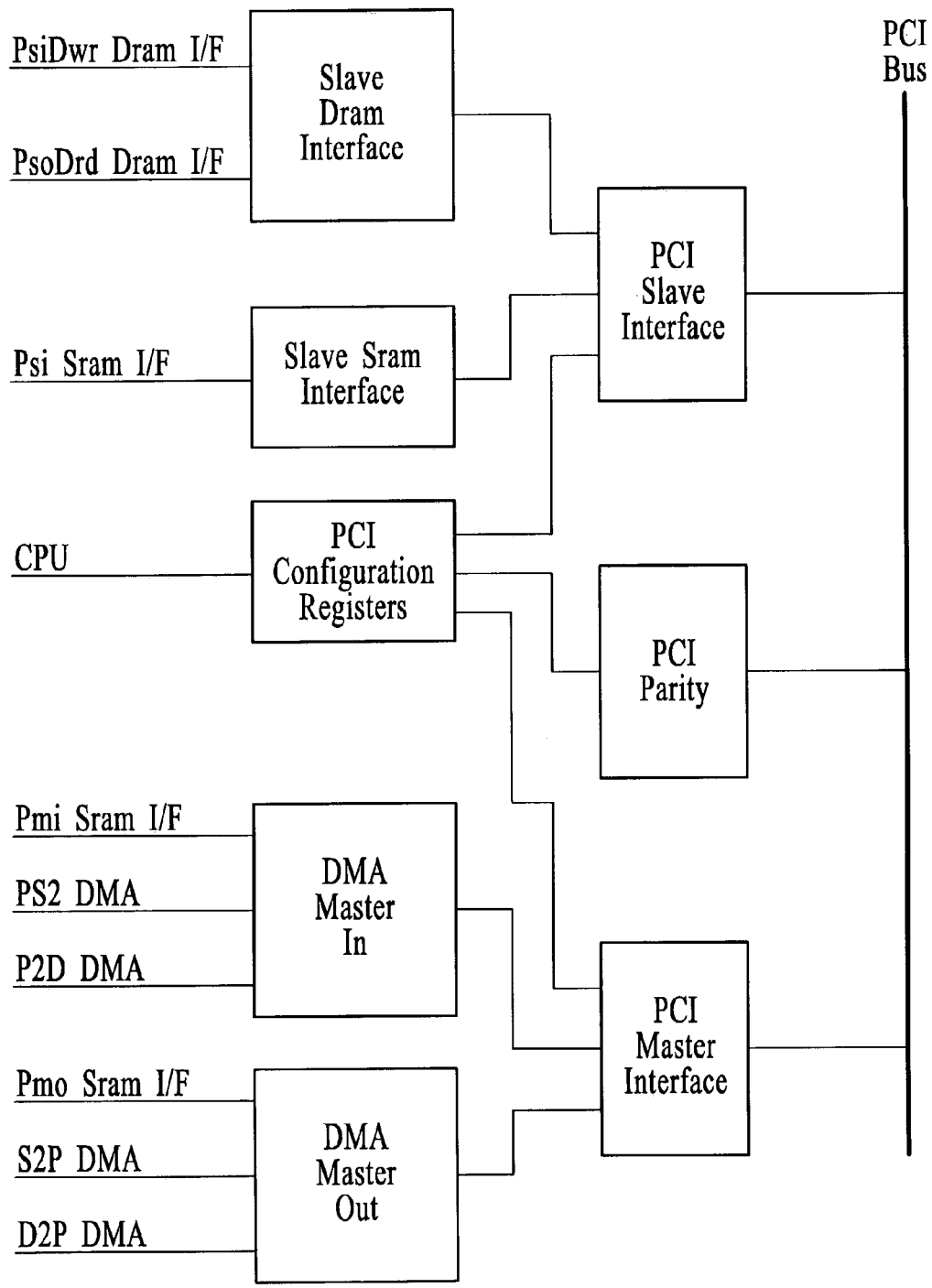
FIG. 54 is a diagram of PCI logic blocks in accordance with the embodiment of FIG. 10.

FIG. 54 shows the major blocks of PCI logic and their relationships. The blocks of FIG. 54 are as follows:

Slave Dram Interface: This block controls the interface to Dram when Dram is being accessed directly by the host or by another PCI master.

Slave Sram Interface: This block controls the the access to Sram for PCI slave accesses to read Sram, or to read or write Dram.

Pci Configuration Registers: This block contains the configuration registers that control the PCI space.

DMA Master In: This block does PCI master transfers on behalf of the P2D and P2S DMA sequencers. There is synchronization logic to synchronize between the PCI bus and the SRAM which are being clcoked by different clocks. It has 256 bytes of buffering to minimize latencies caused by this synchronization.

DMA Master Out: This block does PCI master transfers on behalf of the D2P and S2P DMA sequencers. There is synchronization logic to synchronize between the PCI bus and the SRAM which are being clcoked by different clocks. It has 256 bytes of buffering to minimize latencies caused by this synchronization.

PCI Slave Interface: This block has the state machine for PCI slave accesses to Mojave, from the host or from another PCI master.

PCI Parity: This block generates and checks parity on the PCI bus.

PCI Master Interface: This block has the state machine for PCI master accesses to host memory or to another PCI slave, done on behalf of the DMA sequencers.

What is claimed is:

1. A system, comprising:
   (a) fast-path receive circuitry that is in control of a first plurality of TCP/IP connections, a first TCP/IP packet associated with one of the first plurality of TCP/IP connections being received onto the fast-path circuitry from a network, the fast-path receive circuitry comprising:
      an SRAM that stores a control block (CB) for each TCP/IP connection of a first set of the first plurality of TCP/IP connections;
      a DRAM that stores a CB for each TCP/IP connection of a second set of the first plurality of TCP/IP connections, the DRAM storing a CB associated with the first TCP/IP packet received onto the fast-path receive circuitry;
      a content addressable memory (CAM); and
      a first processor that executes a receive state machine, the first processor obtaining from the CAM information to determine whether the CB associated with the first TCP/IP packet is stored in the SRAM or is stored in the DRAM, the first processor using the information obtained from the CAM to access the CB;
      wherein the fast-path receive circuitry uses a plurality of hash buckets to identify control blocks (CBs) associated with a plurality of incoming TCP/IP packets, some of the plurality of hash buckets being cached in the SRAM, others of the hash buckets being stored in DRAM; and
   (b) a processor that executes a protocol processing stack, the protocol processing stack being in control of a second plurality of TCP/IP connections, wherein TCP/IP packets associated with the second plurality of TCP/IP connections are received onto the fast-path circuitry from the network, the protocol processing stack performing TCP protocol processing on the TCP/IP packets associated with the second plurality of TCP/IP connections, and wherein other TCP/IP packets associated with the first plurality of TCP/IP connections are received onto the fast-path circuitry from the network, the protocol stack performing substantially no TCP protocol processing on the other TCP/IP packets associated with the second plurality of TCP/IP connections.

2. The system of claim 1, wherein the first processor accesses the CB associated with the first TCP/IP packet by causing the CB associated with the first TCP/IP racket to be copied from the DRAM into the SRAM.

3. The system of claim 1, wherein the fast-path receive circuitry generates a hash for the first TCP/IP packet, and wherein the fast-path receive circuitry pushes the hash onto a queue, the first processor popping the queue and thereby obtaining the hash, the first processor then using the hash to identify the control block (CB) associated with the first TCP/IP packet.

4. The system of claim 1, wherein the SRAM includes a plurality of control block (CB) slots, and wherein the CAM contains a CAM entry for each of the CB slots in the SRAM.

5. The system of claim 1, wherein the control block (CB) associated with the first TCP/IP packet contains TCP state information.

6. The system of claim 1, wherein the control block (CB) associated with the first TCP/IP packet is a communication control block (CCB).

7. The system of claim 1, wherein the control block (CB) associated with the first TCP/IP packet is a transmit control block (TCB), the TCB comprising: TCP state information, a TCP source port address, a TCP destination port address, an P source address, and an P destination address.

8. The system of claim 1, wherein the fast-path receive circuitry further comprises:
a second processor that executes the receive state machine, the first processor and the second processor together performing TCP protocol processing and IP protocol processing on the first TCP/IP packet.

9. The system of claim 8, wherein one of the first and second processors performs initial processing on the first TCP/IP packet using the receive state machine and then stops processing the first TCP/IP packet and stores state information relating to a state of the receive state machine, and wherein the other the first and second processors retrieves the state information and uses the retrieved state information to perform subsequent processing on the first TCP/IP packet using the receive state machine.

10. The system of claim 1, wherein the first TCP/IP packet has an associated hash bucket, wherein if the associated hash bucket is stored in DRAM, then the associated hash bucket is copied into the SRAM, the associated hash bucket having a hash bucket entry, the first processor checking the hash bucket entry to determine whether TCP and IP fields of the hash bucket entry match TCP and IP fields of the first TCP/IP packet.

11. The system of claim 1, wherein the fast-path receive circuitry further comprises:
a plurality of lock bits, there being one lock bit for each of the first plurality of TCP/IP connections controlled by the fast-path receive circuitry, a lock bit indicating whether a control block (CB) associated with the lock bit has been locked by a processor context;
a lock table CAM; and
a lock table, wherein the lock table and the lock table CAM are used to identify a processor context that is waiting to gain control of the control block (CB) associated with the first TCP/IP racket.

12. The system of claim 11, wherein the lock table contains a plurality of entries, each entry identifying one of a plurality of processor contexts.

13. The system of claim 1, wherein each CB of the second set of the first plurality of TCP/IP connections is also stored in the SRAM.

14. The system of claim 1, further comprising a host CPU, the fast-path receive circuitry (a) and the processor (b) being part of a network interface device, the network interface being coupled to the host CPU.

15. The system of claim 1, wherein the fast-path receive circuitry (a) is part of a network interface device, and wherein the processor (b) is a host CPU, the network interface device being coupled to the host CPU.

16. A system, comprising:
a first processor that executes a protocol processing stack; and
fast-path receive circuitry that receives an incoming TCP/IP packet and performs substantially all TCP and IP protocol processing on the TCP/IP packet, the TCP/IP packet containing a header portion and a data portion, the data portion being transferred into a destination identified by the first processor, the data portion being transferred without the header portion being transferred into the destination and without the protocol processing stack doing any TCP protocol processing on the TCP/IP packet, the fast-path receive circuitry comprising:
an SRAM that stores a first plurality of control blocks (CB);
a DRAM that stores a second plurality of control blocks (CB);
a content addressable memory (CAM); and
a second processor that executes a receive state machine, the second processor using the CAM to determine whether a control block (CB) associated with the incoming TCP/IP packet is stored in the SRAM, wherein if the control block is not stored in the SRAM but rather is stored in the DRAM, then the second processor causes the control block (CB) associated with the incoming TCP/IP packet to be copied into the SRAM;
wherein the fast-path receive circuitry uses a plurality of hash buckets to identify control blocks (CBs) associated with incoming TCP/IP packets, some of the plurality of hash buckets being cached in the SRAM, others of the hash buckets being stored in DRAM.

17. The system of claim 16, wherein the incoming TCP/IP packet is associated with a TCP/IP connection, wherein control of the TCP/IP connection is passed from the first processor to the fast-path receive circuitry.

18. The system of claim 17, wherein control of the TCP/IP connection is passed to the fast-path receive circuitry by passing control of an associated control block (CB) to the fast-path receive circuitry.

19. A method, comprising:
receiving a TCP/IP packet onto a network interface device;
generating a hash from the TCP/IP packet and pushing the hash onto a queue, the queue being located on the network interface device;
popping the queue to retrieve the hash and using the hash to identify a hash bucket;
determining that the hash bucket identified by the hash is stored in a DRAM and copying the hash bucket from the DRAM and into an SRAM, the DRAM and the SRAM both being part of the network interface device;
searching a plurality of hash entries in the identified hash bucket and determining from one of the hash entries a control block number;
using a content addressable memory (CAM) to determine that a control block (CB) associated with the control block number is located in the DRAM, the CAM being part of the network interface device;
copying the control block (CB) from the DRAM and into the SRAM; and
using the control block (CB) to fast-path process the TCP/IP packet on the network interface device, the network interface device transferring a data portion of the TCP/IP packet into a destination, the destination having been identified by a processor, the processor executing a protocol processing stack, the network interface device transferring the data portion into the destination identified by the processor without the protocol processing stack of the processor performing any TCP protocol processing on the TCP/IP packet.

20. The method of claim 19, wherein the processor is a CPU of a host computer, the network interface device being coupled to the host computer, the destination being located in a memory of the host computer.

21. The method of claim 19, wherein the processor is a part of the network interface device.

* * * * *

UNITED STATES PATENT AND TRADEMARK OFFICE
CERTIFICATE OF CORRECTION

PATENT NO.        : 7,496,689 B2
APPLICATION NO.   : 10/420364
DATED             : February 24, 2009
INVENTOR(S)       : Colin C. Sharp et al.

It is certified that error appears in the above-identified patent and that said Letters Patent is hereby corrected as shown below:

In column 28, line 45, change "racket" to "packet".

In column 28, line 67, change "P source address" to "IP source address".

In column 28, line 67, change "P destination address" to "IP destination address".

In column 29, line 35, change "racket" to "packet".

Signed and Sealed this

Fifth Day of May, 2009

JOHN DOLL
*Acting Director of the United States Patent and Trademark Office*